US012767439B2

(12) United States Patent
Iwata et al.

(10) Patent No.: US 12,767,439 B2
(45) Date of Patent: Oct. 20, 2026

(54) TRANSPORT VEHICLE

(71) Applicant: Daifuku Co., Ltd., Osaka (JP)

(72) Inventors: Masashige Iwata, Hinocho (JP); Kazunari Kimura, Hinocho (JP); Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 617 days.

(21) Appl. No.: 18/283,846

(22) PCT Filed: Feb. 4, 2022

(86) PCT No.: PCT/JP2022/004508
§ 371 (c)(1),
(2) Date: Sep. 25, 2023

(87) PCT Pub. No.: WO2022/201904
PCT Pub. Date: Sep. 29, 2022

(65) Prior Publication Data
US 2026/0250067 A1 Aug. 27, 2026

(30) Foreign Application Priority Data
Mar. 26, 2021 (JP) ................................ 2021-053476

(51) Int. Cl.
*B65G 1/04* (2006.01)
*B65G 60/00* (2006.01)

(52) U.S. Cl.
CPC ........... *B65G 1/0435* (2013.01); *B65G 60/00* (2013.01); *B65G 2201/0235* (2013.01); *B65G 2203/0233* (2013.01)

(58) Field of Classification Search
None
See application file for complete search history.

(56) References Cited

U.S. PATENT DOCUMENTS

| | | | | |
|---|---|---|---|---|
| 9,014,844 | B2 * | 4/2015 | Casey | B65G 57/302 700/228 |
| 2020/0165082 | A1 | 5/2020 | Ueda et al. | |

FOREIGN PATENT DOCUMENTS

| | | | | | |
|---|---|---|---|---|---|
| CN | 1868833 | A | * | 11/2006 | B65G 1/0407 |
| CN | 107531413 | A | * | 1/2018 | B65G 54/02 |
| CN | 109230576 | A | * | 1/2019 | B65G 60/00 |
| CN | 209192819 | U | * | 8/2019 | |
| EP | 3653538 | A1 | * | 5/2020 | B65G 1/04 |
| EP | 4299475 | A1 | * | 1/2024 | B65G 1/0492 |
| JP | 49124781 | A | | 11/1974 | |
| JP | 2013206970 | A | * | 10/2013 | H10P 72/7602 |

(Continued)

*Primary Examiner* — Terrell H Matthews
(74) *Attorney, Agent, or Firm* — The Webb Law Firm

(57) ABSTRACT

A transport vehicle of the present invention includes; a container group support section that supports a container group, which includes containers in a stacked state, in a predetermined stacking region; a lifting device-that lifts a container in the container group supported by the container group support section; and a transfer device that transfers a container. The lifting device includes: a first lifting mechanism that lifts a container, which is at a desired height in the container group stacked in the stacking region, relative to the container adjacent therebelow; and a second lifting mechanism that lifts a container, which is below the container lifted by the first lifting mechanism, relative to the container therebelow.

10 Claims, 26 Drawing Sheets

(56) References Cited

FOREIGN PATENT DOCUMENTS

| | | | | | |
|---|---|---|---|---|---|
| JP | 2018049943 | A | * | 3/2018 | .......... H10P 72/3221 |
| JP | 201918983 | A | | 2/2019 | |
| JP | 2020070154 | A | * | 5/2020 | |
| WO | WO-2019017292 | A1 | * | 1/2019 | ............... B65G 1/04 |
| WO | WO-2020196144 | A1 | * | 10/2020 | ........... B65G 1/0421 |

* cited by examiner

TRANSPORT VEHICLE

CROSS REFERENCE TO RELATED APPLICATION

This application is the United States national phase of International Patent Application No. PCT/JP2022/004508 filed Feb. 4, 2022, and claims priority to Japanese Patent Application No. 2021-053476 filed Mar. 26, 2021, the disclosures of which are hereby incorporated by reference in their entireties.

BACKGROUND OF THE INVENTION

Field of the Invention

The present invention relates to a transport vehicle that transports containers that can be stacked in the up-down direction.

Description of Related Art

An example of such a transport vehicle is disclosed in JP 2019-18983A (Patent Document 1). The reference numerals in parentheses in the following description of the background art are those used in Patent Document 1.

A transport vehicle (2) disclosed in Patent Document 1 includes a travel body (21). The travel body (21) includes a support section (23) for supporting a plurality of stacked containers (W), a lifting device (25) for lifting one or more of the stacked containers (W) in place, and a transfer device (24) for transferring a container (W) to or from the support section (23).

In the transport vehicle (2) disclosed in Patent Document 1, the number of stacked containers (W) can be increased and decreased by the containers (W) being retrieved from and loaded to the support section (23) by the transfer device (24). Also, the lifting device (25) can lift any container (W) among the stacked containers (W). For this reason, when retrieving a container (W) with the transfer device (24), one container (W) that is to be retrieved can be selected from among the stacked containers (W), and the selected container (W) can be retrieved. Also, when loading a container (W) with the transfer device (24), the level at which the loading target container (W) is to be loaded can be selected, and the loading target container (W) can be loaded at the selected level.

However, with the configuration of the transport vehicle disclosed in Patent Document 1, the containers (W) can only be transferred one at a time, and the transfer of a plurality of containers (W) to or from the support section (23) in parallel is not envisioned.

Patent Document

Patent Document 1: JP 2019-18983A

SUMMARY OF THE INVENTION

In view of the foregoing actual situation, it is desirable to realize a transport vehicle that can perform a plurality of transfer operations on a plurality of stacked containers in parallel.

A transport vehicle according to an aspect is configured to transport containers configured to be stackable in an up-down direction, the transport vehicle including:

a travel body configured to travel;

a container group support section provided in the travel body and configured to support a container group, which includes a plurality of containers in a stacked state, in a predetermined stacking region;

a lifting device provided in the travel body and configured to lift a container in the container group supported by the container group support section; and a transfer device provided in the travel body and configured to transfer a container, wherein the transfer device includes:

- a first holding section configured to hold a container;
- a second holding section disposed below the first holding section and configured to hold a container;
- a first transfer mechanism configured to transfer a container between the first holding section and the stacking region; and
- a second transfer mechanism configured to transfer a container between the second holding section and the stacking region, and the lifting device includes:

- a first lifting mechanism configured to lift a container, which is at a desired height in the container group stacked in the stacking region, relative to an adjacent container below the container lifted by the first lifting mechanism; and
- a second lifting mechanism configured to lift a container, which is below the container lifted by the first lifting mechanism, relative to an adjacent container below the container lifted by the second lifting mechanism.

According to this configuration, a container can be transferred to the stacking region by the first transfer mechanism, and a container can be transferred to the stacking region by the second transfer mechanism. Also, space in the up-down direction can be provided in the stacked container group both below the container lifted by the first lifting mechanism and below the container lifted by the second lifting mechanism. Accordingly, these two regions of space can be used in order for the transfer of a container by the first transfer mechanism and the transfer of a container by the second transfer mechanism in the stacked container group to be performed in parallel. In this manner, according to this configuration, a plurality of transfer operations can be performed on a plurality of stacked containers in parallel.

Further features and advantages of the technology according to the present disclosure will become clearer from the following description of exemplary and non-limiting embodiments described with reference to the drawings.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

Best Mode for Carrying out the Invention

A transport vehicle is for transporting containers that can be stacked in the up-down direction. Hereinafter, an embodiment of the transport vehicle will be described by way of an example of the case where the transport vehicle is provided in a transport facility for transporting containers.

Figure 1:
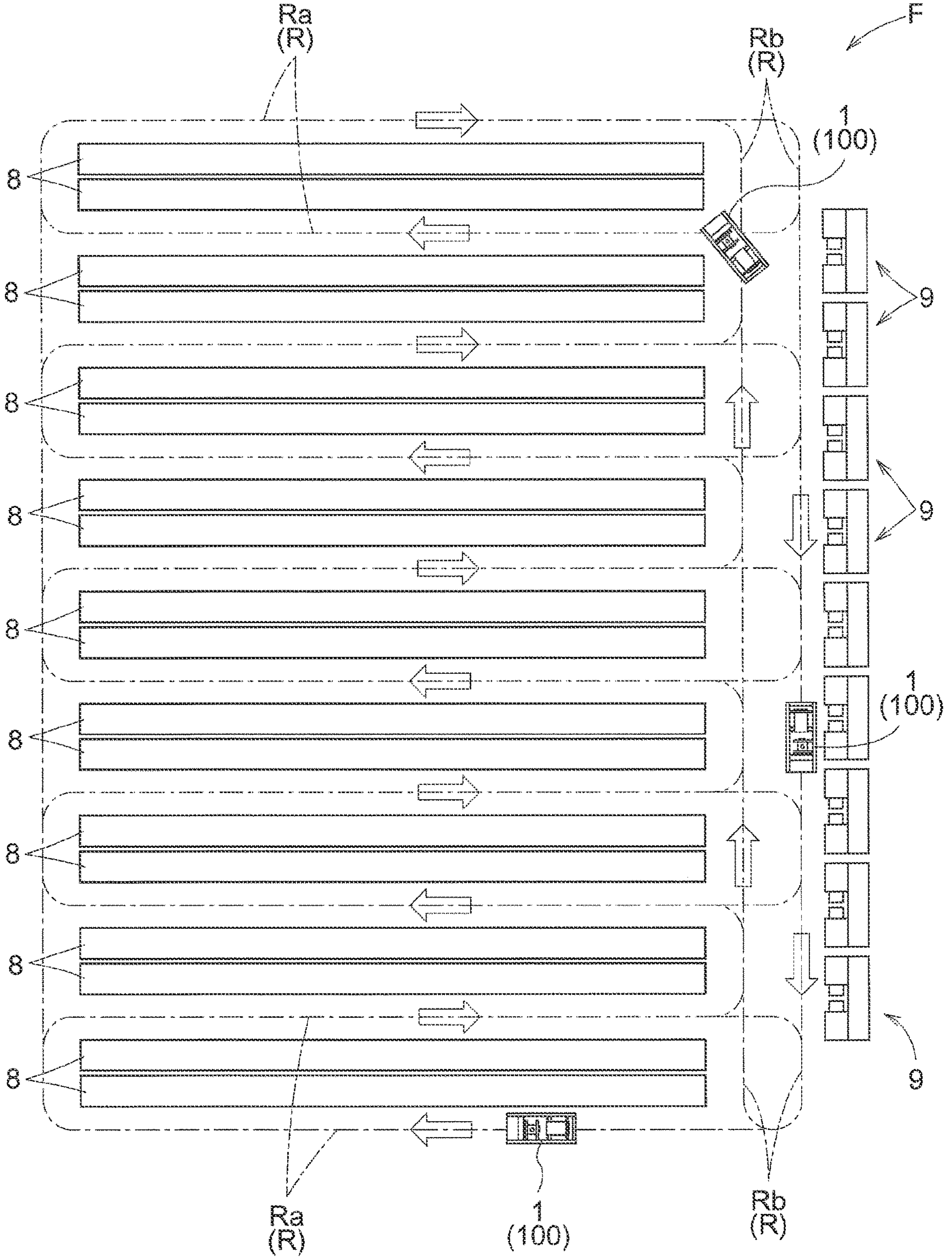
FIG. 1 is a plan view of a transport facility that includes transport vehicles.

As shown in FIG. 1, a transport facility F includes a container rack 8 for storing containers 70 (see FIG. 3), and a carry-in and carry out section 9 for carrying in and carrying out the containers 70. The transport vehicle 100 transports the containers 70 carried in by the carry-in and carry out section 9 to the container rack 8, and transports the containers 70 stored in the container rack 8 to the carry-in and carry-out section 9 in order to be carried out.

In the present embodiment, a plurality of container racks 8 are arranged parallel to each other with a predetermined gap therebetween. Each of the container racks 8 has at least an opening on the front side, and the containers 70 are introduced and taken out on the front side. Portions of a travel route R of the transport vehicle 100 are set so as to extend between pairs of adjacent container racks 8 whose front sides face each other. Also, the container racks 8 at the outermost ends among the container racks 8 provided in the transport facility F are arranged with their front sides facing outward, and portions of the travel route R are set so as to also extend in the regions along the front sides of the container racks 8 at the outermost ends. Also, a plurality of the carry-in and carry out sections 9 are provided in the transport facility F, and portions of the travel route R are set so as to also extend in regions passing by the carry-in and carry out sections 9.

The travel route R includes shelf routes Ra that extend in the extending direction of the container racks 8 along the front sides of the container racks 8, and an outer route Rb that intersects the shelf routes Ra at a position outside the regions where the container racks 8 are arranged. The shelf routes Ra are set in correspondence with the container racks 8. In the present embodiment, the shelf routes Ra correspond to portions of the travel route R set in the region between a pair of adjacent container racks 8 whose front sides face each other, and portions of the travel route R set in a region extending along the front side of a container rack 8 whose front side faces outward. Also, the outer route Rb is set so as to connect the shelf routes Ra to each other. Moreover, the outer route Rb is set so as to pass by the carry-in and carry out sections 9. In the present embodiment, the outer route Rb corresponds to the portion of the travel route R excluding the shelf routes Ra.

Container Rack

Figure 2:
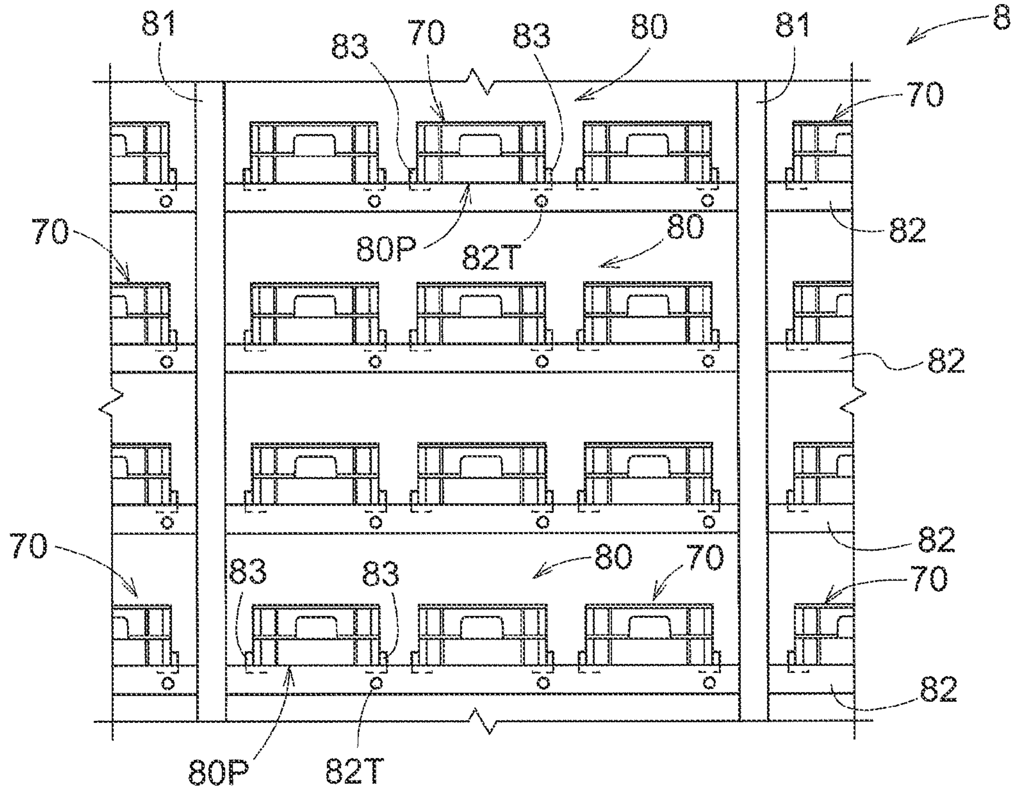
FIG. 2 is a front view of a container rack.

As shown in FIG. 2, each of the container racks 8 includes a plurality of shelves 80 that are for storing the containers 70 and are arranged next to each other in the up-down direction. In the present embodiment, each of the container racks 8 is constituted by a combination of a plurality of support members 81 and a plurality of beam members 82. The beam members 82 are arranged with gaps therebetween in the up-down direction. Placement members 83 for placement of the containers 70 are coupled to the beam members 82. In this example, the containers 70 are stored on the shelves 80 by being placed on pairs of placement members 83. A plurality of pairs of placement members 83 are arranged in each of the shelves 80, and a plurality of containers 70 can be stored on each of the shelves 80. In this example, the openings of the container racks 8 correspond to the regions that are between the pairs of support members 81 adjacent in the width direction (left-right direction) in the front view shown in FIG. 2, and between the pairs of beam members 82 adjacent in the up-down direction.

In the present embodiment, a target 82T serving as a target for storing a container 70 is provided at each reference position 80P for storing containers 70 on the shelves 80. In this example, the targets 82T are provided on the beam members 82. One target 82T is provided for each pair of placement members 83. In the illustrated example, the targets 82T are constituted by holes formed in the beam members 82.

Container

Figure 3:
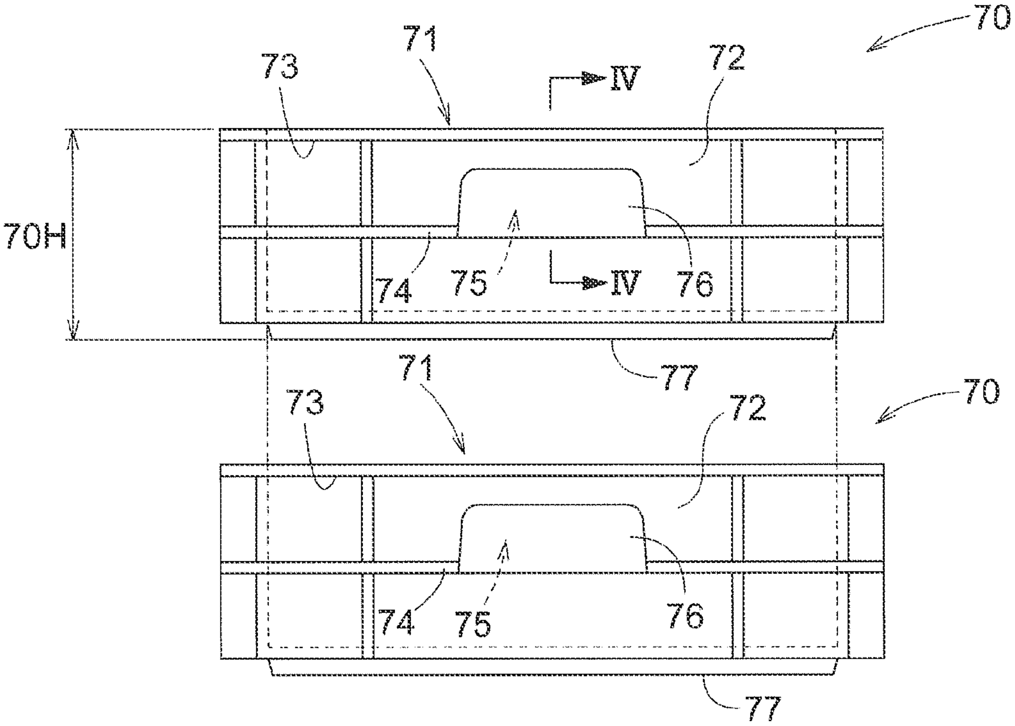
FIG. 3 is a front view of a container.

As shown in FIG. 3, each of the containers 70 is shaped as a box having an opening 71 that faces upward and a peripheral wall portion 72 that surrounds the inner space of the container 70. In this example, the outer shape of the container 70 as viewed in the up-down direction is rectangular. Articles can be stored in the inner space surrounded by the peripheral wall portion 72, that is to say the interior of the container 70. Examples of the articles include various products such as foodstuffs and daily necessities, as well as components and uncompleted parts used in factory production lines and the like.

The containers 70 are configured so as to be able to be stacked together with other containers 70 while storing articles. In other words, the containers 70 can be stacked in the up-down direction (see FIG. 5 as well). In this example, each of the containers 70 has a fitting portion 77 that protrudes downward from the bottom portion. Two containers 70 are stacked in the up-down direction by fitting the fitting portion 77 of one of the containers 70 into the opening 71 of the other container 70 from above.

Figure 4:
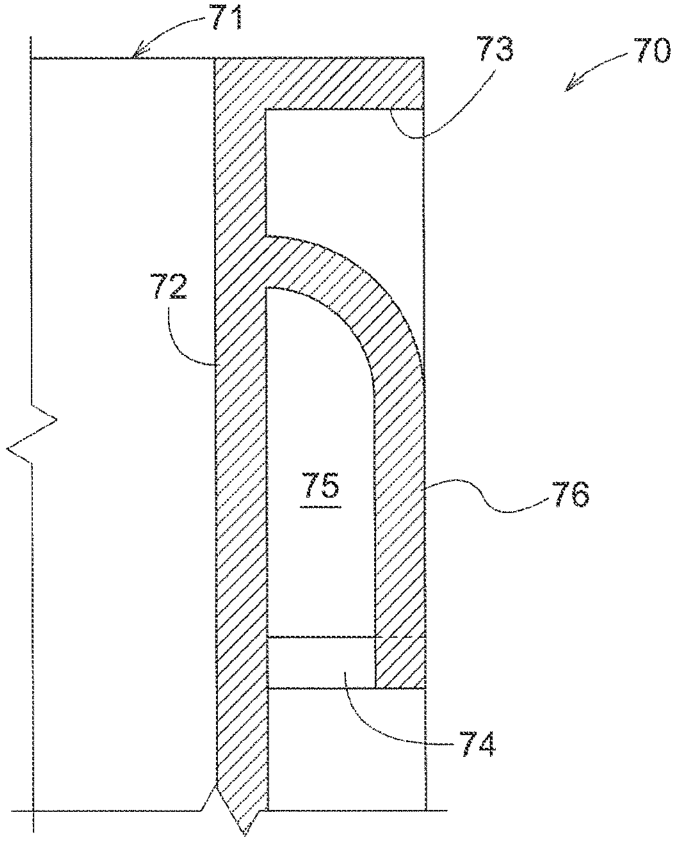
FIG. 4 is a cross-sectional view taken along IV-IV in FIG. 3.

As shown in FIGS. 3 and 4, in the present embodiment, the container 70 has a plurality of ribs that protrude outward from the peripheral wall portion 72. One of the ribs is a lifting rib 73 for being lifted by a lifting device 3, which will be described later. In this example, the lifting rib 73 is formed on the upper portion of the peripheral wall portion 72. Also, the lifting rib 73 extends entirely around the portion of the peripheral wall portion 72 that surrounds the opening portion 71. One of the ribs is a transfer rib 74 for being lifted during a transfer operation performed by the transfer device 4, which will be described later. In this example, the transfer rib 74 is formed below the lifting rib 73.

In the present embodiment, the container 70 has a recession 75. The recession 75 is formed in the surface of the container 70 on which the transfer rib 74 is provided. In this example, the container 70 has an engagement wall 76 that protrudes outward from the peripheral wall portion 72 and then extends downward between the lifting rib 73 and the transfer rib 74 in the up-down direction, and the recession 75 is formed between the engagement wall 76 and the peripheral wall portion 72. In other words, the recession 75 is a space surrounded by the peripheral wall portion 72 and the engagement wall 76. The engagement wall 76 is a portion for engaging with a first engagement section 41Bb or a second engagement section 42Bb during a transfer operation performed by the transfer device 4, as will be described later.

As shown in FIG. 3, a container height 70H is the height of one container 70. The container height 70H is the size in the up-down direction from the upper end to the lower end of the container 70, and corresponds to the distance in the up-down direction from the opening 71 to the lower end of the fitting portion 77 in the present embodiment. When a plurality of containers 70 (e.g., two containers 70) are stacked, the fitting portion 77 of the upper container 70 is fitted at a position inside the lower container 70. For this reason, the total height of the two stacked containers 70 is shorter than the sum of the heights of the two containers 70 (70H×2), more specifically shorter by an amount corresponding to the height of the fitting portion 77.

Transport Vehicle

Figure 5:
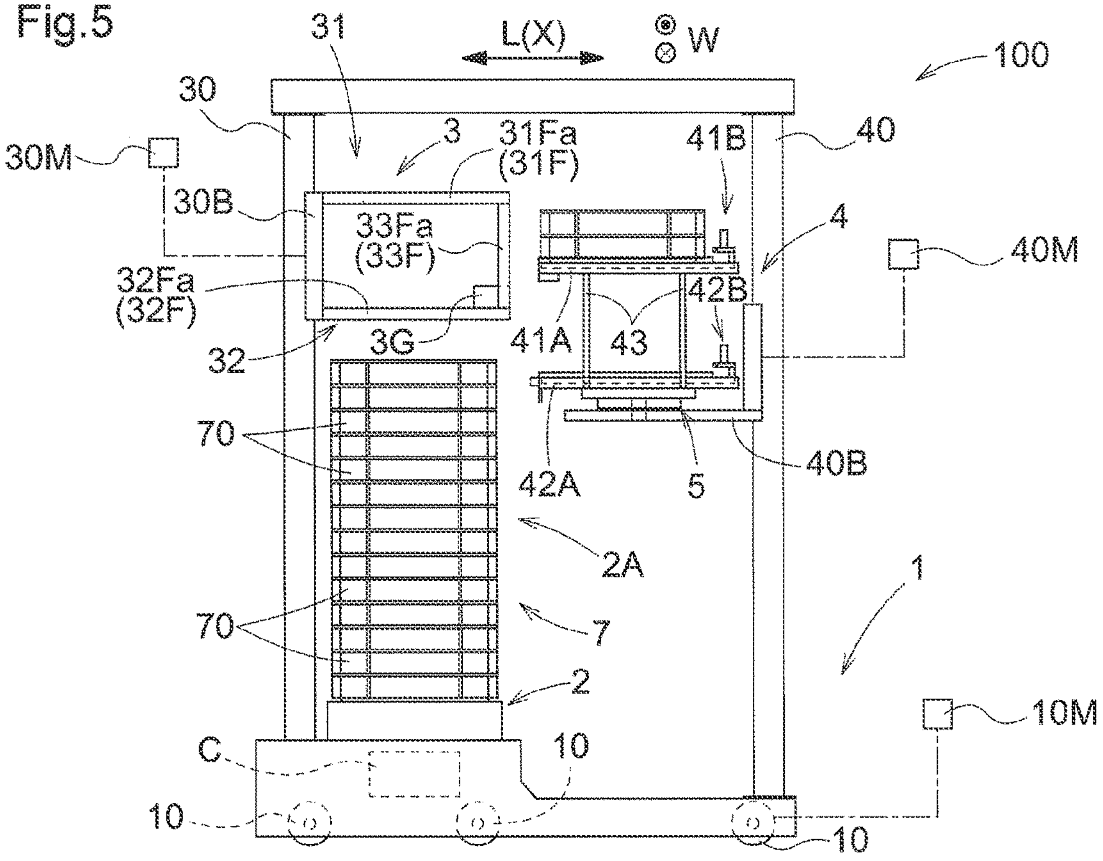
FIG. 5 is a view of a transport vehicle along a width direction of the vehicle body.

As shown in FIG. 5, each of the transport vehicles 100 includes a travel body 1 that can travel, a container group support section 2 for supporting a container group 7 formed by a stack of containers 70 in a predetermined stacking region 2A, a lifting device 3 for lifting the containers 70 in the container group 7 supported by the container group support section 2, and a transfer device 4 for transferring the containers 70. The container group support section 2, the lifting device 3, and the transfer device 4 are provided in the travel body 1. A vehicle longitudinal direction L is the direction along the traveling direction of the travel body 1, and the container group support section 2 and the transfer device 4 are arranged next to each other in the vehicle longitudinal direction L on the travel body 1. Note that hereinafter, a vehicle width direction W is the direction orthogonal to the vehicle longitudinal direction L in a vertical view.

In the present embodiment, the transport vehicle 100 includes a control device C. The control device C controls functional units of the transport vehicle 100. In this example, the control device C controls the travel body 1, the container group support section 2, the lifting device 3, the transfer device 4, and a later-described turning device 5. Operations for transporting and transferring the containers 70 are realized by the control device C controlling the functional units. The control device C includes a processor such as a microcomputer, as well as peripheral circuits such as a memory, for example. Various functions are realized through cooperation between such hardware and a program executed on a processor of a computer or the like.

Travel Body

The travel body 1 is capable of traveling along a predetermined travel route R (see FIG. 1). In the present embodiment, the travel body 1 travels along the shelf routes Ra and the outer route Rb. When traveling along the shelf routes Ra, the travel body 1 travels along the container racks 8, or more specifically travels along the front sides of the container racks 8. In the present embodiment, the travel body 1 travels on the floor surface.

The travel body 1 includes a plurality of travel wheels 10 and a travel drive section 10M that drives at least one of the travel wheels 10. The travel drive section 10M includes a motor (not shown). The travel body 1 is given driving force in the traveling direction due to the travel wheels 10 being driven by the travel drive section 10M.

Container Group Support Section

The container group support section 2 is provided in the travel body 1. The container group support section 2 is capable of supporting a container group 7 formed by a stack of containers 70. A stacking region 2A for placement of the container group 7 is defined above the container group support section 2. The stacking region 2A is a three-dimensional virtual region that extends upward from the container group support section 2. In this example, the container group support section 2 is configured as a conveyor capable of moving the container group 7 while the container group 7 is placed thereon. In this example, the container group support section 2 is capable of moving the container group 7 along the vehicle width direction W. The conveyor constituting the container group support section 2 may be a known conveyor such as a roller conveyor, a chain conveyor, or a belt conveyor.

The container group 7, in which a plurality of containers 70 are stacked, is carried in to the carry-in and carry out section 9 (see FIG. 1). The container group support section 2 receives the container group 7 from the carry-in and carry out section 9 or delivers the container group 7 to the carry-in and carry out section 9 while the travel body 1 is adjacent to the carry-in and carry out section 9. In other words, the container group support section 2 transfers the container group 7 to and from the carry-in and carry out section 9. Although not illustrated in detail, in this example, the carry-in and carry out section 9 is adjacent to a picking area where the task of taking out articles from the containers 70 is performed. When the container group 7 is transferred from the container group support section 2 to the carry-in and carry out section 9, one or more articles are taken out from the container 70 in the picking area adjacent to the carry-in and carry out section 9. After some or all of the articles stored in a container 70 are taken out, the container 70 is transferred from the carry-in and carry out section 9 to the container group support section 2 (transport vehicle 100), and transported back to one of the container racks 8. However, the carry-in and carry-out section 9 does not need to be adjacent to the picking area, and may be adjacent to another facility or work area. As another example, the carry-in and carry out section 9 may be configured to receive the container group 7 from the container group support section 2 and transport the container group 7 out from the transport facility F.

Lifting Device

The lifting device 3 is provided in the travel body 1. The lifting device 3 lifts the containers 70 in the container group 7 supported by the container group support section 2, or in other words, the containers 70 in the container group 7 arranged in the stacking region 2A.

The lifting device 3 includes a lifting mast 30 standing upright on the travel body 1, a lifting elevation body 30B connected to the lifting mast 30, and a lifting elevation body drive section 30M for raising and lowering the lifting elevation body 30B along the lifting mast 30. Although not illustrated in detail, the lifting elevation body drive unit 30M includes an endless body (e.g., a belt) coupled to the lifting elevation body 30B, a rotating body around which the endless body is wound, and a motor that drives the rotating body to rotate.

Figure 25:
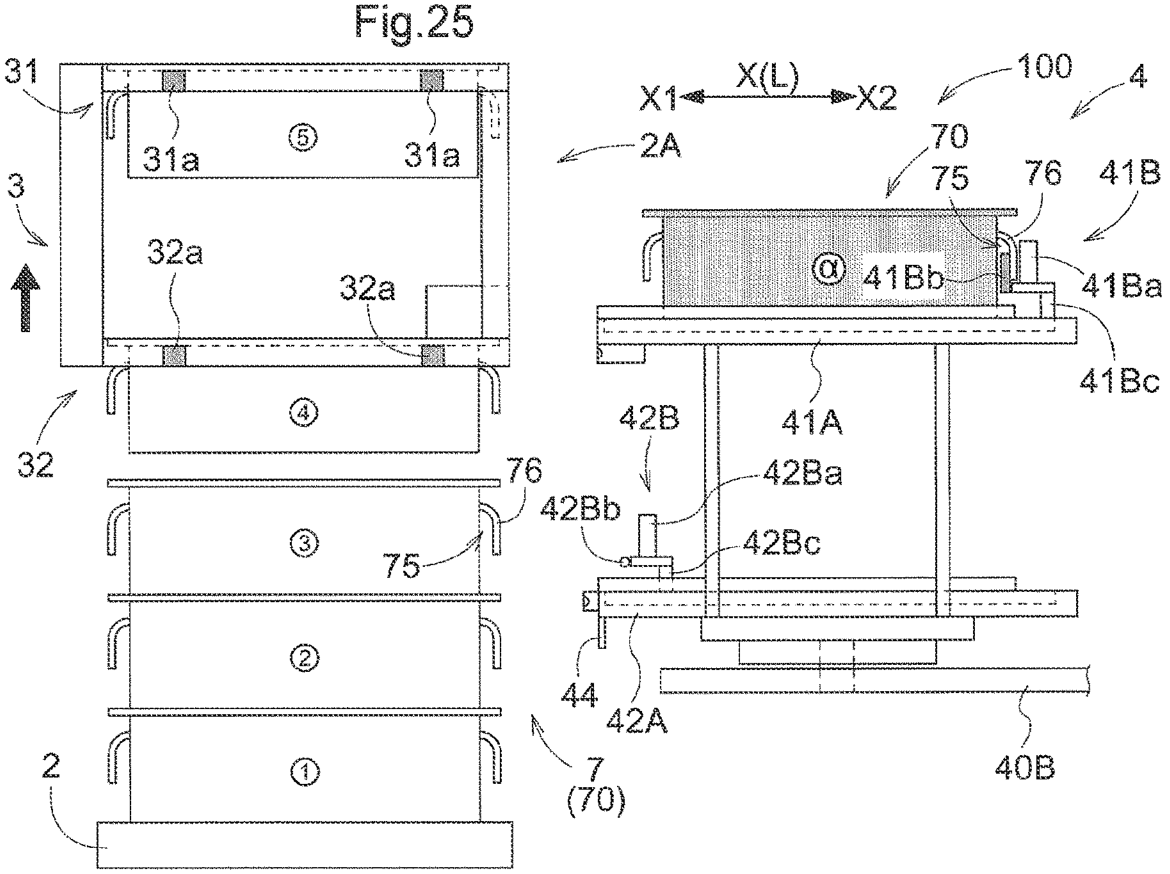
FIG. 25 is an illustrative diagram of a case where containers are retrieved from and loaded to a stacking region in parallel.

The lifting device 3 includes a first lifting mechanism 31 by which a container 70 at a desired height in the container group 7 stacked in the stacking region 2A is lifted from the container 70 adjacent below, and a second lifting mechanism 32 by which the container 70 below the container 70 lifted by the first lifting mechanism 31 is lifted from the adjacent container 70 therebelow. Also, in the present embodiment, the first lifting mechanism 31 and the second lifting mechanism 32 are arranged apart from each other in the up-down direction. As a result, as shown in FIG. 25 for example, a space can be formed in the up-down direction between the container 70 lifted by the first lifting mechanism 31 and the container 70 lifted by the second lifting mechanism 32. A space can also be formed in the up-down direction below the container 70 lifted by the second lifting mechanism 32.

In the present embodiment, the lifting device 3 includes a first frame section 31F and a second frame section 32F that protrude in the vehicle longitudinal direction L from the lifting elevation body 30B toward the stacking region 2A, and a connecting frame section 33F that connects the first frame section 31F and the second frame section 32F. The first frame section 31F and the second frame section 32F are arranged with a space therebetween in the up-down direction. The first frame section 31F is arranged above the second frame section 32F. The connecting frame section 33F connects the first frame section 31F and the second frame section 32F in the up-down direction. With this configuration, the first frame section 31F and the second frame section 32F do not move relative to each other, and the distance between the first frame section 31F and the second frame section 32F in the up-down direction is always constant. The first frame section 31F, the second frame section 32F, and the connecting frame section 33F integrally ascend and descend as the lifting elevation body 30B ascends and descends.

Figure 6:
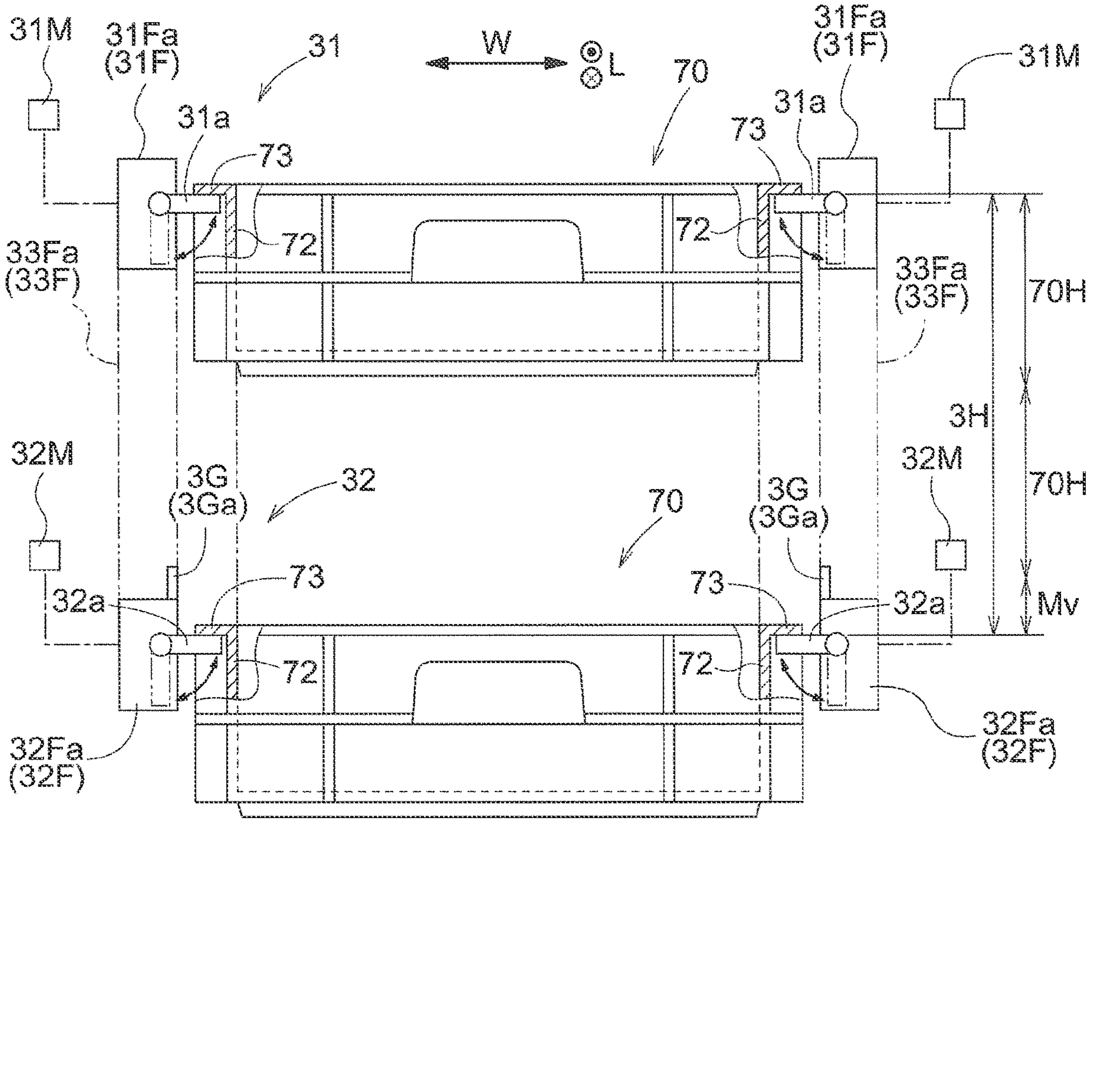
FIG. 6 is a view of a lifting device along a front-rear direction of the vehicle body.

As shown in FIG. 6, the first frame section 31F includes a pair of first frame members 31Fa spaced apart in the vehicle width direction W. The pair of first frame members 31Fa are arranged in correspondence with the width (the length in the vehicle width direction W) of the containers 70 arranged in the stacking region 2A. In other words, the spacing between the pair of first frame members 31Fa in the vehicle width direction W corresponds to the width of the containers 70. In this example, the spacing between the pair of first frame members 31Fa in the vehicle width direction W is larger than the width of the container 70 by a predetermined dimension that corresponds to a dimension of first lifting and holding sections 31*a*, which will be described later.

Similarly, the second frame section 32F includes a pair of second frame members 32Fa spaced apart in the vehicle width direction W. The pair of second frame members 32Fa are arranged in correspondence with the width of the containers 70 arranged in the stacking region 2A. In other words, the spacing between the pair of second frame members 32Fa in the vehicle width direction W corresponds to the width of the container 70. In this example, the spacing between the pair of second frame members 32Fa in the vehicle width direction W is larger than the width of the containers 70 by a predetermined dimension that corresponds to a dimension of second lifting and holding sections 32*a*, which will be described later.

Also, the connecting frame section 33F includes a pair of connecting frame members 33Fa. The pair of connecting frame members 33Fa each connect a pair of one first frame member 31Fa and one second frame member 32Fa that are aligned in the up-down direction.

In the present embodiment, the first lifting mechanism 31 includes first lifting and holding sections 31*a* for holding a container 70. Also, the first lifting mechanism 31 includes first lifting drive sections 31M for changing the orientation of the first lifting and holding sections 31*a* between a holding orientation for holding a container 70 and a non-holding orientation for not holding a container 70.

In the present embodiment, the first lifting and holding sections 31*a* are able to rotate about an axis along the vehicle longitudinal direction L. While in the holding orientation, the first lifting and holding sections 31*a* are each at a position overlapping the lifting rib 73 of the container 70 in the stacking region 2A in a vertical view, whereas while in the non-holding orientation, the first lifting and holding sections 31*a* have each withdrawn outward in the vehicle width direction W from the position overlapping the lifting rib 73 in a vertical view. In FIG. 6, the first lifting and holding sections 31*a* in the holding orientation are indicated by solid lines, and the first lifting and holding sections 31*a* in the non-holding orientation are indicated by imaginary lines. As can be seen, while in the holding orientation, the first lifting and holding sections 31*a* face the lifting rib 73 from below. As the first frame section 31F rises in this state, the container 70 is lifted.

In the present embodiment, the first lifting mechanism 31 includes the above-described first frame section 31F, and the first lifting and holding sections 31*a* are supported by the first frame section 31F. Specifically, the first lifting and holding sections 31*a* are supported by the pair of first frame members 31Fa spaced apart in the vehicle width direction W. In this manner, the first lifting mechanism 31 includes the pair of first lifting and holding sections 31*a* spaced apart in the vehicle width direction W. The spacing between the pair of first lifting and holding sections 31*a* in the vehicle width direction W corresponds to the width of the containers 70 arranged in the stacking region 2A.

In the present embodiment, the second lifting mechanism 32 includes second lifting and holding sections 32*a* that are arranged below the first lifting and holding sections 31*a* and are for holding a container 70. The second lifting mechanism 32 includes second lifting drive sections 32M for changing the orientation of the second lifting and holding sections 32*a* between a holding orientation for holding a container 70 and a non-holding orientation for not holding a container 70.

In the present embodiment, the second lifting and holding sections 32*a* are able to rotate about an axis along the vehicle longitudinal direction L. While in the holding orientation, the second lifting and holding sections 32*a* are each at a position overlapping the lifting rib 73 of the container 70 in the stacking region 2A in a vertical view, whereas while in the non-holding orientation, the second lifting and holding sections 32*a* have each withdrawn outward in the vehicle width direction W from the position overlapping the lifting rib 73 in a vertical view. In FIG. 6, the second lifting and holding sections 32*a* in the holding orientation are indicated by solid lines, and the second lifting and holding sections 32*a* in the non-holding orientation are indicated by imaginary lines. As can be seen, while in the holding orientation, the second lifting and holding sections 32*a* face the lifting rib 73 from below. As the second frame section 32F rises in this state, the container 70 is lifted.

In the present embodiment, the second lifting mechanism 32 includes the above-described second frame section 32F, and the second lifting and holding sections 32*a* are supported by the second frame section 32F. Specifically, the second lifting and holding sections 32*a* are supported by the pair of second frame members 32Fa spaced apart in the vehicle width direction W. In this manner, the second lifting mechanism 32 includes the pair of second lifting and holding sections 32*a* spaced apart in the vehicle width direction W. The spacing between the pair of second lifting and holding sections 32*a* in the vehicle width direction W corresponds to the width of the containers 70 arranged in the stacking region 2A.

As shown in FIG. 6, when a container 70 is lifted by the first lifting mechanism 31 and a container 70 is lifted by the second lifting mechanism 32, a space through which another container 70 can be transferred is formed in the up-down direction between the lifted containers 70. Accordingly, another container 70 can be transferred to the space by the transfer device 4 (see FIG. 5). In other words, the transfer device 4 can stack another container 70 on top of the container 70 lifted by the second lifting mechanism 32.

In the present embodiment, as shown in FIGS. 5 and 6, the second lifting mechanism 32 includes a guide section 3G that guides the container 70 transferred by the transfer device 4. In this example, the guide section 3G includes a pair of guide members 3Ga spaced apart in the vehicle width direction W. The spacing between the pair of guide members 3Ga in the vehicle width direction W corresponds to the width of the containers 70. In the illustrated example, the pair of second frame members 32Fa each include a guide member 3Ga. The guide members 3Ga are each shaped as a plate that rises upward from the second frame member 32Fa, and the container 70 is guided by the plate surface that faces inward in the vehicle width direction W.

As will be described later, the transfer operation performed by the transfer device 4 for moving a container 70 includes an operation of moving the container 70 in the horizontal direction to a target location and an operation of moving the container 70 in the up-down direction. In the present embodiment, an interval 3H between the first lifting and holding section 31*a* and the second lifting and holding section 32*a* in the up-down direction is set in accordance with the sum of the height of N containers 70 (N is an integer of 2 or more) and a vertical movement amount Mv of a target container 70 that is to be transferred in the transfer operation performed by the transfer device 4 (a second transfer mechanism 42B, which will be described later in detail). Here, N is set in advance, and is set to "2" in this example. In other words, the interval 3H between the first lifting and holding section 31*a* and the second lifting and holding section 32*a* in the up-down direction is set in accordance with the sum of two container heights 70H and the vertical movement amount Mv of the container 70 during the transfer operation (3H=70H×2+Mv). Also, a predetermined clearance may be added in consideration of structural error, control error, and the like. Note that the vertical movement amount Mv will be described later.

Transfer Device

As shown in FIG. 5, the transfer device 4 is provided in the travel body 1. The transfer device 4 is for transferring a container 70 to a target transfer location. The transfer device 4 is for performing a loading operation for transferring a container 70 to a target transfer location, and a retrieving operation for transferring a container 70 away from a target transfer location. In the present embodiment, the target transfer location may be any of the stacking regions 2A and the shelves 80 of the container racks 8.

Here, a transfer direction X is the movement direction of the container 70 transferred by the transfer device 4. Also, a loading side X1 is one side in the transfer direction X, and a retrieving side X2 is the other side in the transfer direction X. In this example, the transfer direction X is a direction along the horizontal direction. The loading side X1 in the transfer direction is the side toward which a container 70 moves along the transfer direction X when the container 70 is loaded. The retrieving side X2 in the transfer direction is the side toward which a container 70 moves along the transfer direction X when the container 70 is retrieved.

Figure 7:
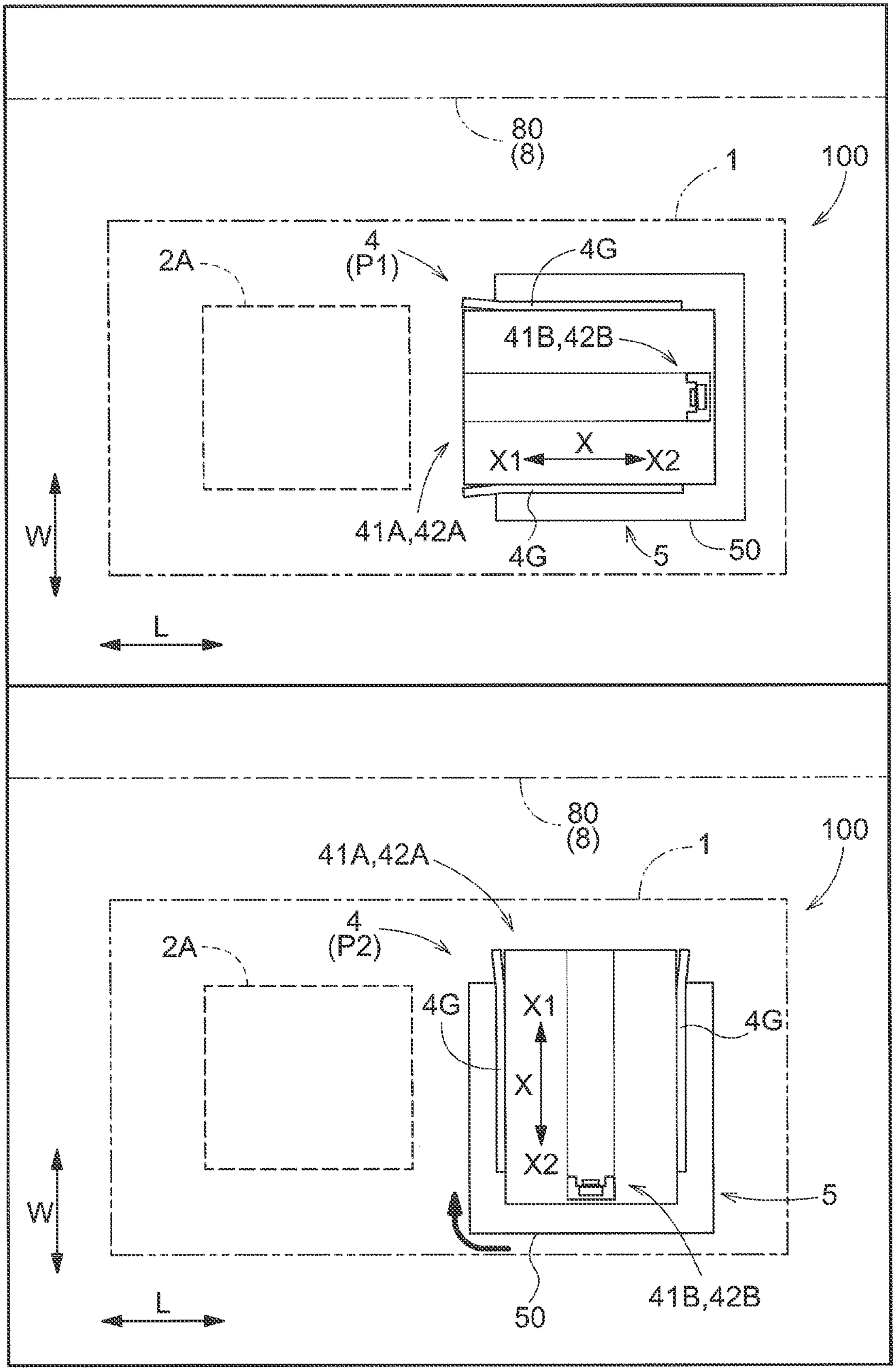
FIG. 7 is a plan view showing a first orientation and a second orientation of a transfer device.

In the present embodiment, the transport vehicle 100 includes a turning device 5 that turns the transfer device 4 about an axis extending in the up-down direction. As shown in FIG. 7, the turning device 5 is for turning the transfer device 4 (specifically, a part of the transfer device 4) about an axis extending in the up-down direction so as to change the orientation of the transfer device 4 between a first orientation P1 in which the transfer direction X faces the stacking region 2A, and a second orientation P2 in which the transfer direction X faces the container rack 8. In this way, in the present embodiment, the transfer direction X can be changed in the horizontal plane by the turning device 5.

Figure 8:
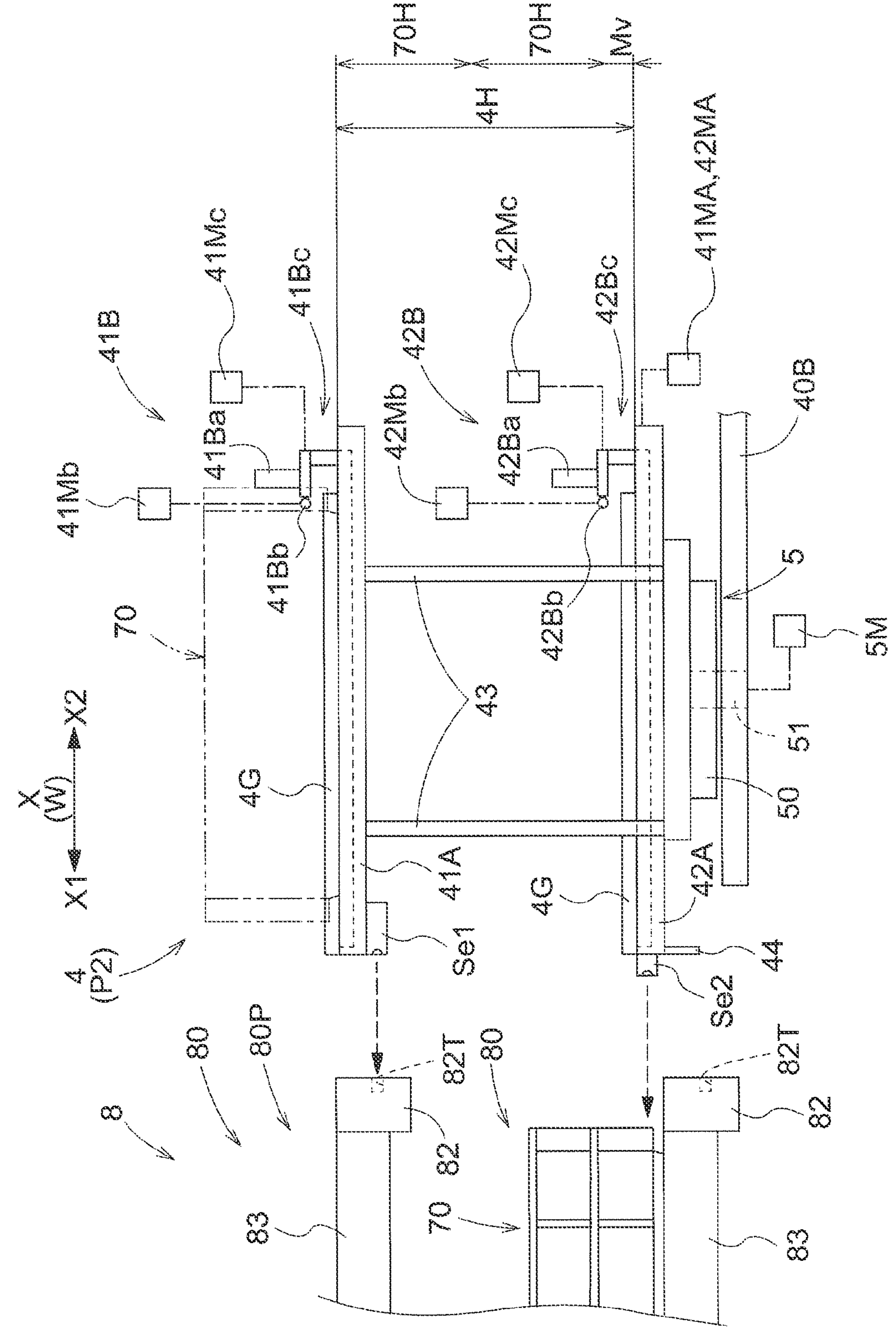
FIG. 8 is a diagram showing the transfer device viewed from a direction orthogonal to a transfer direction.
Figure 10:
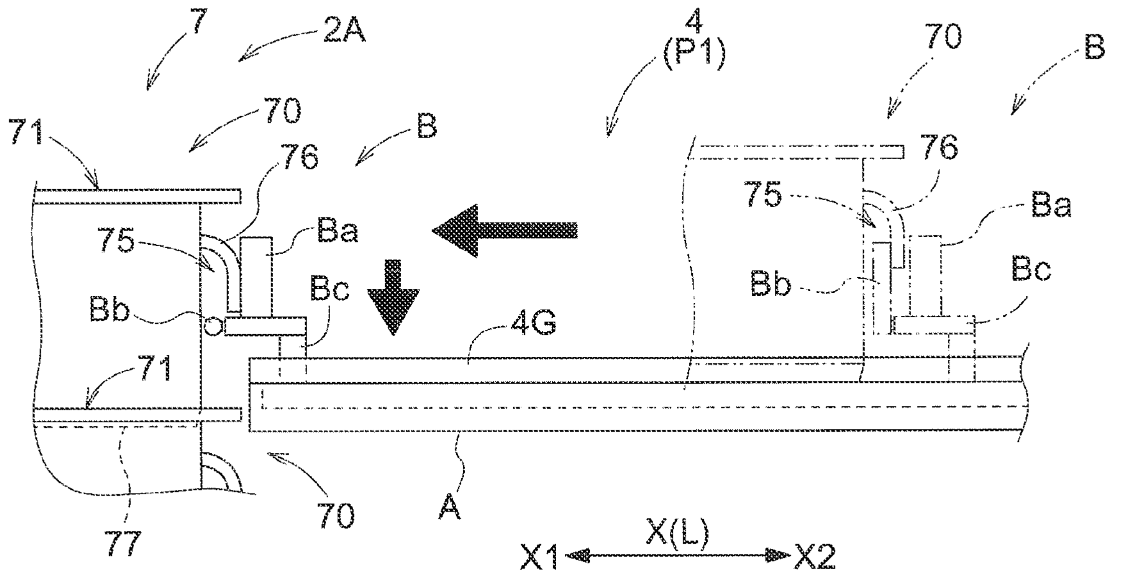
FIG. 10 is a diagram showing a loading operation performed by the transfer device.
Figure 11:
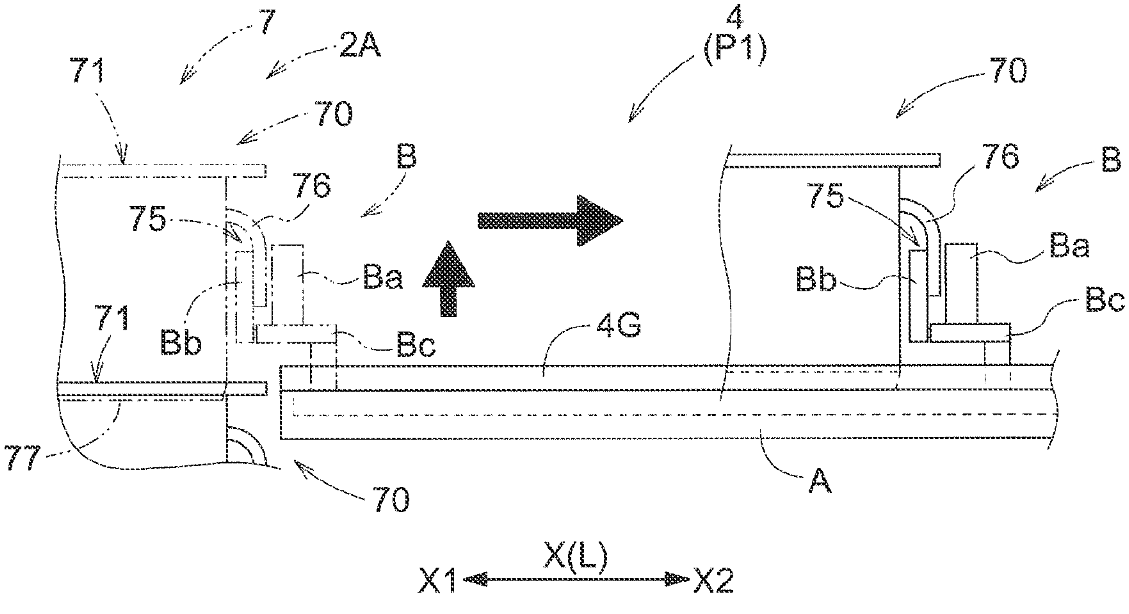
FIG. 11 is a diagram showing a retrieving operation performed by the transfer device.

In the present embodiment, the transfer device 4 changes in orientation in accordance with the position of the target transfer location. Specifically, the transfer device 4 changes to the first orientation P1 when the target transfer location is the stacking region 2A, and changes to the second orientation P2 when the target transfer location is the container rack 8 (shelf 80). As shown in FIG. 8, in this example, the turning device 5 is attached to a turning base 50 that supports the transfer device 4 (specifically, a part of the transfer device 4), a turning shaft 51 that supports the turning base 50 so as to be able to rotate relative to a transfer elevation body 40B, which will be described later, and a turning drive section 5M that drives the turning shaft 51. Note that FIG. 8 shows the case where the transfer device 4 is in the second orientation P2, and FIGS. 10 and 11 show cases where the transfer device 4 is in the first orientation P1. In FIGS. 10 and 11, for better visibility, the lifting device 3 actually lifting the container 70 is not illustrated.

As shown in FIG. 5, the transfer device 4 includes a transfer mast 40 standing upright from the travel body 1, a transfer elevation body 40B connected to the transfer mast 40, and a transfer elevation body drive section 40M that raises and lowers the transfer elevation body 40B along the transfer mast 40. Although not illustrated in detail, the transfer elevation body drive section 40M includes an endless body (e.g., a belt) coupled to the transfer elevation body 40B, a rotating body around which the endless body is wound, and a motor that drives the rotating body to rotate.

As shown in FIG. 8, the transfer device 4 includes a first holding section 41A that holds a container 70, a second holding section 42A that is arranged below the first holding section 41A and holds a container 70, a first transfer mechanism 41B that transfers a container 70 between the first holding section 41A and the target transfer location, and a second transfer mechanism 42B that transfers a container 70 between the second holding section 42A and the target transfer location.

As previously described, examples of the target transfer location include the stacking regions 2A and the shelves 80 of the container racks 8. In other words, the first transfer mechanism 41B transfers a container 70 between the first holding section 41A and a stacking region 2A or a shelf 80. Also, the second transfer mechanism 42B transfers a container 70 between the second holding section 42A and a stacking region 2A or a shelf 80. In the present embodiment, the first transfer mechanism 41B transfers the container 70 between the first holding section 41A and the stacking region 2A while in the first orientation P1 (e.g., see FIGS. 10 and 11), and transfers the container 70 between the first holding section 41A and the shelf 80 while in the second orientation P2 (e.g., see FIG. 8). Similarly, the second transfer mechanism 42B transfers the container 70 between the second holding section 42A and the stacking region 2A while in the first orientation P1 (e.g., see FIGS. 10 and 11), and transfers the container 70 between the second holding section 42A and the shelf 80 while in the second orientation P2 (e.g., see FIG. 8).

As shown in FIG. 8, in the present embodiment, the transfer device 4 includes holder connecting sections 43 that connect the first holding section 41A and the second holding section 42A in the up-down direction. The holder connecting sections 43 connect the first holding section 41A and the second holding section 42A so that the gap therebetween in the up-down direction is constant.

In the present embodiment, the transfer device 4 includes a first holder drive section 41MA that moves the first holding section 41A along the transfer direction X, and a second holder drive section 42MA that moves the second holding section 42A along the transfer direction X. The first holder drive section 41MA is for moving the first holding section 41A relative to the transfer elevation body 40B along the transfer direction X. The second holder drive section 42MA is for moving the second holding section 42A relative to the transfer elevation body 40B along the transfer direction X. As described above, in the present embodiment, the first holding section 41A and the second holding section 42A are connected by the holder connecting sections 43. For this reason, the first holding section 41A and the second holding section 42A integrally move along the transfer direction X. In this example, the first holder drive section 41MA that drives the first holding section 41A and the second holder drive section 42MA that drives the second holding section 42A are configured to be driven by the same drive source.

In the present embodiment, the first transfer mechanism 41B includes a first pushing section 41Ba for pushing a container 70 toward the loading side X1 in the transfer direction when loading the container 70, and a first engagement section 41Bb for engaging with a container 70 when retrieving the container 70. The first pushing section 41Ba and the first engagement section 41Bb are each capable of moving relative to the first holding section 41A along the transfer direction X.

In the present embodiment, the first transfer mechanism 41B includes a first support member 41Bc that is supported by the first holding section 41A and supports the first pushing section 41Ba and the first engagement section 41Bb, and a first transfer drive section 41Mc that moves the first support member 41Bc relative to the first holding section 41A along the transfer direction X. In the present example, due to the first support member 41Bc being driven by the first transfer drive section 41Mc, the first pushing section 41Ba and the first engagement section 41Bb move relative to the first holding section 41A along in the transfer direction X.

In the present embodiment, the first pushing section 41Ba and the first engagement section 41Bb are configured to move integrally along the transfer direction X. Also, the range in which the first pushing section 41Ba and the first engagement section 41Bb can move along the transfer direction X is larger than the range in which the first holding section 41A can move along the transfer direction X. In the present embodiment, when a container 70 is to be transferred to the target transfer location (the stacking region 2A or the shelf 80), the first holding section 41A is moved close to the target transfer location, and the container 70 is transferred using the first pushing section 41Ba or the first engagement section 41Bb. Accordingly, the distance between the first holding section 41A and the target transfer location can be reduced during the transfer operation, and the container 70 can be stably transferred by the first transfer mechanism 41B.

In the present embodiment, the second transfer mechanism 42B includes a second pushing section 42Ba for pushing a container 70 toward the loading side X1 in the transfer direction when loading the container 70, and a second engagement section 42Bb for engaging with a container 70 when retrieving the container 70. The second pushing section 42Ba and the second engagement section 42Bb are each capable of moving relative to the second holding section 42A along the transfer direction X.

In the present embodiment, the second transfer mechanism 42B includes a second support member 42Bc that is supported by the second holding section 42A and supports the second pushing section 42Ba and the second engagement section 42Bb, and a second transfer drive section 42Mc that moves the second support member 42Bc relative to the second holding section 42A along the transfer direction X. In the present example, due to the second support member 42Bc being driven by the second transfer drive section 42Mc, the second pushing section 42Ba and the second engagement section 42Bb move relative to the second holding section 42A along in the transfer direction X.

In the present embodiment, the second pushing section 42Ba and the second engagement section 42Bb are configured to move integrally along the transfer direction X. Also, the range in which the second pushing section 42Ba and the second engagement section 42Bb can move along the transfer direction X is larger than the range in which the second holding section 42A can move along the transfer direction X. In the present embodiment, when a container 70 is to be transferred to the target transfer location (the stacking region 2A or the shelf 80), the second holding section 42A is moved close to the target transfer location, and the container 70 is transferred using the second pushing section 42Ba or the second engagement section 42Bb. Accordingly, the distance between the second holding section 42A and the target transfer location can be reduced during the transfer operation, and the container 70 can be stably transferred by the second transfer mechanism 42B.

In the present embodiment, the first transfer mechanism 41B includes a first engagement drive section 41Mb that drives the first engagement section 41Bb. In the present example, the first engagement drive section 41Mb drives the first engagement section 41Bb to rotate about a rotation axis along the transfer direction X. Also, the second transfer mechanism 42B includes a second engagement drive section 42Mb that drives the second engagement section 42Bb. In this example, the second engagement drive section 42Mb drives the second engagement section 42Bb to rotate about a rotation axis along the transfer direction X.

Figure 9:
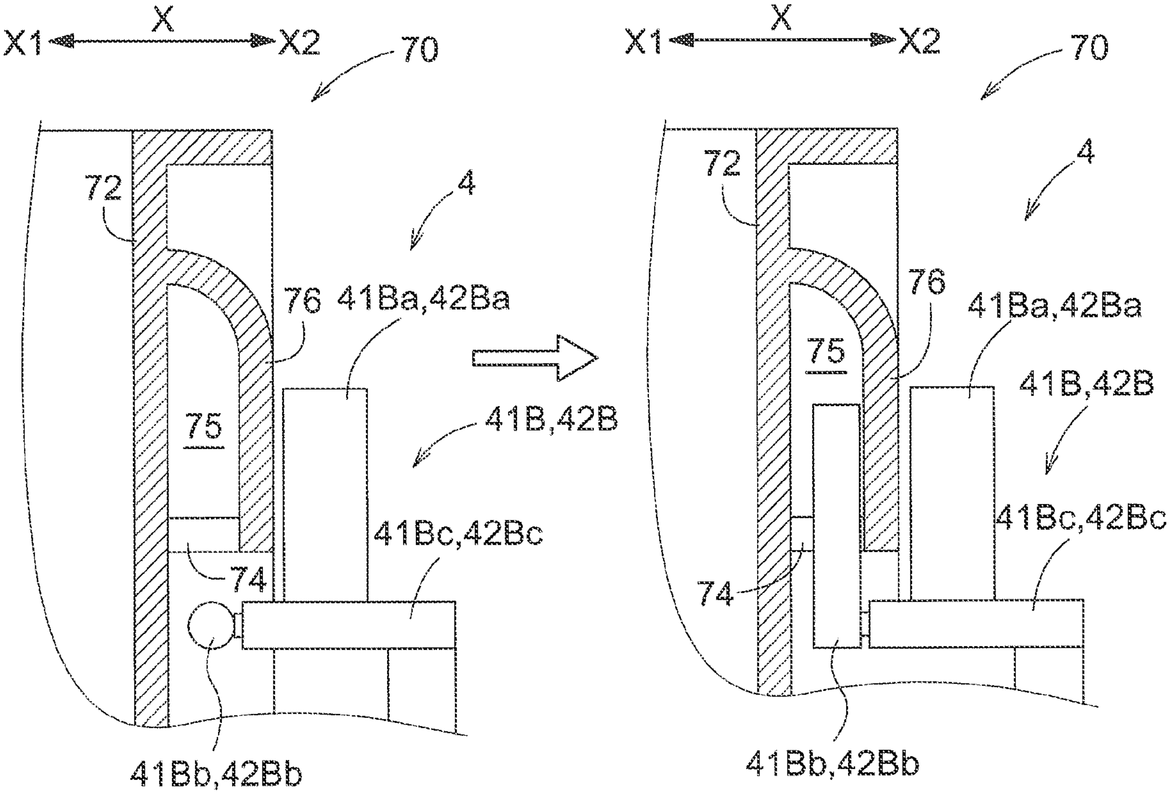
FIG. 9 is a diagram showing an engaged orientation and a disengaged orientation of an engagement section.

As shown in FIG. 9, due to being driven to rotate by the first engagement drive section 41Mb, the first engagement section 41Bb can change in orientation between an engaged orientation of being inserted into the recession 75 of the container 70, and a disengaged orientation of being outside the recession 75. While in the engaged orientation, the first engagement section 41Bb is disposed between the peripheral wall portion 72 and the engagement wall 76 in the transfer direction X, inside the recession 75. Similarly, due to being driven to rotate by the second engagement drive section 42Mb, the second engagement section 42Bb can change in orientation between an engaged orientation of being inserted into the recession 75 of the container 70, and a disengaged orientation of being outside the recession 75. While in the engaged orientation, the second engagement section 42Bb is disposed between the peripheral wall portion 72 and the engagement wall 76 in the transfer direction X, inside the recession 75.

Next, transfer operations performed by the transfer device 4 to transfer a container 70 will be described with reference to FIGS. 10 and 11. Note that the container 70 is shown in a simplified manner in FIGS. 10 and 11.

FIGS. 10 and 11 show operations when the transfer device 4 transfers the container 70 to the stacking region 2A as the target transfer location. FIG. 10 shows operations for container 70 loading performed by the transfer device 4, and FIG. 11 shows operations for container 70 retrieval performed by the transfer device 4. The transfer device 4 operates in substantially the same manner also in the case where a shelf 80 of a container rack 8 is the target transfer location. Also, operations for the transfer of the container 70 by the first transfer mechanism 41B and operations for the transfer of the container 70 by the second transfer mechanism 42B are similar. In view of this, the transfer operations performed by the transfer devices 41B and 42B will be collectively described with reference to FIGS. 10 and 11. Therefore, in the following description, the first holding section 41A and the second holding section 42A will be collectively referred to as the "holding section A", the first transfer mechanism 41B and the second transfer mechanism 42B will be collectively referred to as the "transfer mechanism B", the first pushing section 41Ba and the second pushing section 42Ba will be collectively referred to as the "pushing section Ba", the first engagement section 41Bb and the second engagement section 42Bb will be collectively referred to as the "engagement section Bb", and the first support member 41Bc and the second support member 42Bc will be collectively referred to as the "support member Bc". Note that in FIGS. 10 and 11, no particular distinction is made between the illustrations of the first transfer mechanism 41B and the second transfer mechanism 42B, and later-described sensors Se1 and Se2 and a restriction section 44 are not shown.

As shown in FIG. 10, when the transfer mechanism B performs the loading operation, the pushing section Ba pushes the container 70 toward the loading side X1 in the transfer direction. In the present embodiment, in the loading operation, the pushing section Ba pushes the container 70 toward the loading side X1 in the transfer direction while in contact with the engagement wall 76 of the container 70 from the retrieving side X2 in the transfer direction. Accordingly, the loading target container 70 held by the holding section A moves from the holding section A to the stacking region 2A.

In the present embodiment, when the transfer mechanism B loads the container 70 to the stacking region 2A, the holding section A moves in the up-down direction. Specifically, at the start of the loading operation, the holding section A is disposed at a loading operation start height set such that the lower end portion (lower surface) of the loading target container 70 is higher than the upper end portion (upper surface) of the other containers 70 in the stacking region 2A that is the loading destination. Here, the loading operation start height is a height at which the lower surface of the fitting portion 77 of the loading target container 70 is a predetermined amount higher than the upper surface of the opening 71 of the other container 70 in the stacking region 2A. After the loading target container 70 enters the stacking region 2A, the holding section A descends to a loading operation completion height set lower than the loading operation start height, and stacks the loading target container 70 on another container 70 arranged in the stacking region 2A. In this way, due to the holding section A moving in the up-down direction, the fitting portion 77 of the loading target container 70 can be moved downward toward the opening 71 of the other container 70 arranged in the stacking region 2A and appropriately fitted therein. Such movement of the holding section A in the up-down direction is realized by the raising and lowering of the transfer elevation body 40B (see FIG. 5).

As shown in FIG. 11, when the transfer mechanism B performs the retrieving operation, the container 70 is pulled toward the retrieving side X2 in the transfer direction by the engagement section Bb. In the present embodiment, when the retrieving operation is performed, the engagement section Bb enters the engaged orientation and pulls the container 70 toward the retrieving side X2 in the transfer direction while in contact with the engagement wall 76 of the container 70 from the loading side X1 in the transfer direction. Accordingly, the retrieval target container 70 arranged in the stacking region 2A moves from the stacking region 2A to the holding section A.

In the present embodiment, when the transfer mechanism B retrieves the container 70 from the stacking region 2A, the holding section A moves in the up-down direction. Specifically, when the retrieving operation starts, the engagement section Bb, which is in the disengaged orientation, and the support member Bc are arranged at a retrieving operation start height set lower than the transfer rib 74 and the engagement wall 76. Next, the engagement section Bb enters the engaged orientation, and thereafter the holding section A rises to a retrieving operation completion height set higher than the retrieving operation start height, and lifts the portion of the container 70 that is engaged with the engagement section Bb. In this example, as shown in FIG. 9, the support member Bc (first support member 41Bc, second support member 42Bc) supporting the engagement section Bb (first engagement section 41Bb, second engagement section 42Bb) comes into contact with the transfer rib 74 of the container 70 from below and lifts the container 70. At this time, the engagement section Bb (first engagement section 41Bb, second engagement section 42Bb) does not contribute to the lifting of the container 70. Due to a portion of the container 70 being lifted by the support member Bc (first support member 41Bc, second support member 42Bc), the retrieval target container 70 becomes inclined upward toward the retrieving side X2 in the transfer direction (e.g., see FIG. 29). Here, the retrieving operation completion height is such that the end portion, on the retrieving side X2 in the transfer direction, of the lower surface of the fitting portion 77 of the retrieval target container 70 is located a predetermined amount higher than the upper surface of the opening 71 of the other container 70 located adjacent to the lower side of the retrieval target container 70. Accordingly, the end portion, on the retrieving side X2 in the transfer direction, of the fitting portion 77 of the retrieval target container 70 can be moved out of the opening 71 of the other container 70 immediately below, and the containers 70 can be appropriately unfitted from each other. Thereafter, the engagement section Bb and the support member Bc move toward the retrieving side X2 in the transfer direction relative to the holding section A, and thus the retrieval target container 70 moves from the stacking region 2A to the holding section A. Such movement of the holding section A in the up-down direction is realized by the raising and lowering of the transfer elevation body 40B (see FIG. 5).

As described above, the transfer device 4 transfers the container 70 to and from the stacking region 2A by moving the container 70 not only in the transfer direction X but also in the up-down direction. Accordingly, it is possible to appropriately performing fitting and unfitting of the containers 70 while performing the transfer operation. Meanwhile, when the transfer device 4 performs the transfer operation with respect to the shelf 80 of the container rack 8, the fitting of the containers 70 to each other is irrelevant, and thus the container 70 may be moved in only the transfer direction X and does not need to be moved in the up-down direction.

In the present embodiment, the holding section A includes transferer-side guide sections 4G that guide the transferred container 70 in the transfer direction X. The transferer-side guide sections 4G are provided at both end portions of the holding section A in the direction orthogonal to the transfer direction X, and guide both side surfaces (both surfaces facing outward in the direction orthogonal to the transfer direction X) of the transferred container 70. The transferer-side guide sections 4G are provided for both the first holding section 41A and the second holding section 42A (see FIG. 8).

As shown in FIG. 8, an interval 4H between the first holding section 41A and the second holding section 42A in the up-down direction is greater than or equal to the sum of the height of N containers 70 (N is an integer of 2 or more) and the vertical movement amount Mv of the target container 70 that is to be transferred in the transfer operation performed by the transfer device 4 (specifically the second transfer mechanism 42B). In the present embodiment, N is set to 2, and the interval 4H between the first holding section 41A and the second holding section 42A in the up-down direction is greater than or equal to the sum of the height of two containers 70H and the vertical movement amount Mv of the transfer target container 70 in the transfer operation performed by the second transfer mechanism 42B (4H=70H×2+Mv). Accordingly, in the present embodiment, the interval 3H (see FIG. 6) between the first lifting and holding section 31*a* and the second lifting and holding section 32*a* in the up-down direction and the interval 4H between the first holding section 41A and the second holding section 42A in the up-down direction are equivalent to each other.

As described above, the vertical movement amount Mv of the transfer target container 70 in the transfer operation performed by the second transfer mechanism 42B is taken into consideration when determining the interval 4H between the first holding section 41A and the second holding section 42A in the up-down direction. As described above, in the present embodiment, the fitting portion 77 is formed in the bottom portion of the container 70, and the fitting portion 77 is fitted into the opening 71 of a container 70 located below. Accordingly, the second transfer mechanism 42B needs to move the container 70 up and down by an amount greater than or equal to the vertical size of the fitting portion 77 both when the container 70 is loaded and when the container 70 is retrieved. In other words, in the present embodiment, the vertical movement amount Mv is set larger than the vertical size of the fitting portion 77 of the container 70. Accordingly, when one container 70 is lifted by the second lifting mechanism 32 and another container 70 is to be transferred by the second transfer mechanism 42B to the space below the lifted container 70, the containers 70 in the stacking region 2A can be appropriately fitted together and unfitted from each other (see FIG. 29). Also, a predetermined clearance may be added to the interval 4H in the up-down direction in consideration of structural error, control error, and the like.

Figure 29:
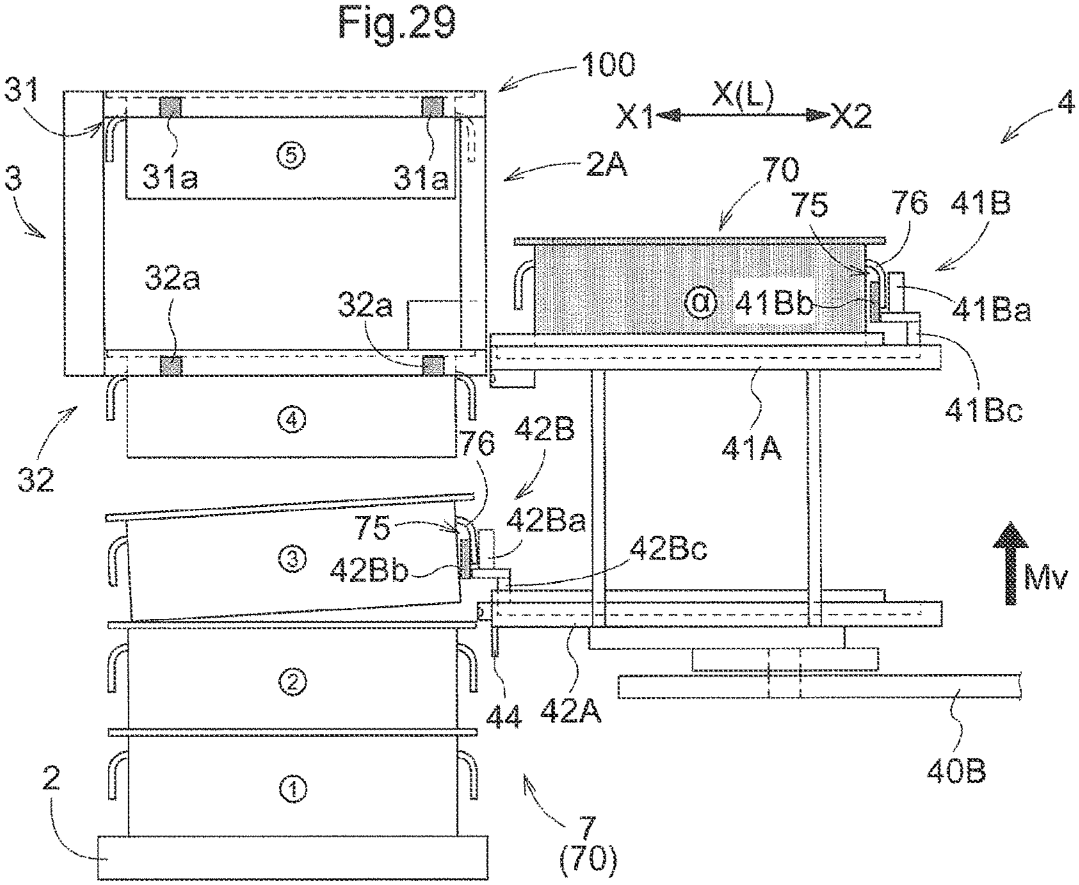
FIG. 29 is an illustrative diagram of a case where containers are retrieved from and loaded to a stacking region in parallel.
Figure 30:
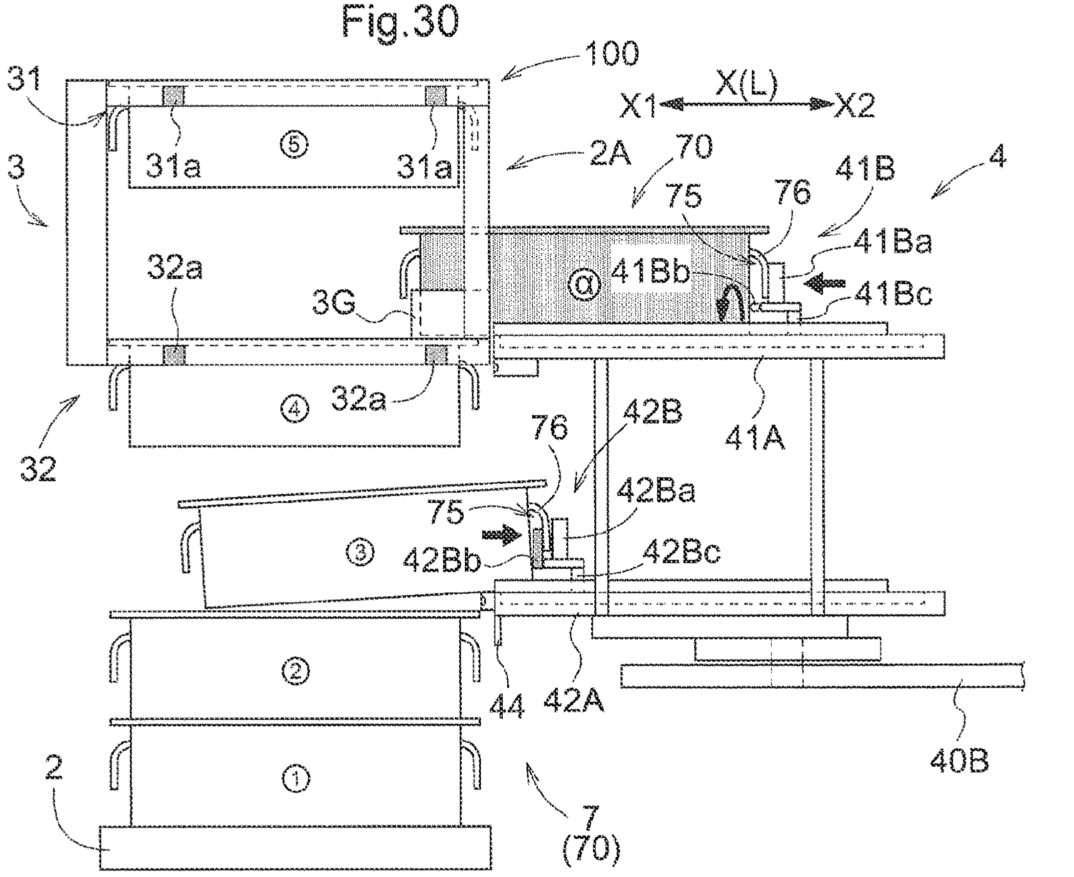
FIG. 30 is an illustrative diagram of a case where containers are retrieved from and loaded to a stacking region in parallel.

In the present embodiment, as shown in FIGS. 29 and 30, the interval 4H between the first holding section 41A and the second holding section 42A in the up-down direction (see FIG. 8) is set such that, while the second holding section 42A is at the height at which the adjacent container 70 below the container 70 lifted by the second lifting mechanism 32 is to be transferred to the second holding section 42A (is to be retrieved) by the second transfer mechanism 42B, the first holding section 41A is at the height at which the container 70 held by the first holding section 41A is to be transferred (loaded) by the first transfer mechanism 41B onto the container 70 lifted by the second lifting mechanism 32. Accordingly, the retrieval and the loading of containers 70 in the stacking region 2A can be performed in parallel (see FIGS. 30 and 31).

Figure 31:
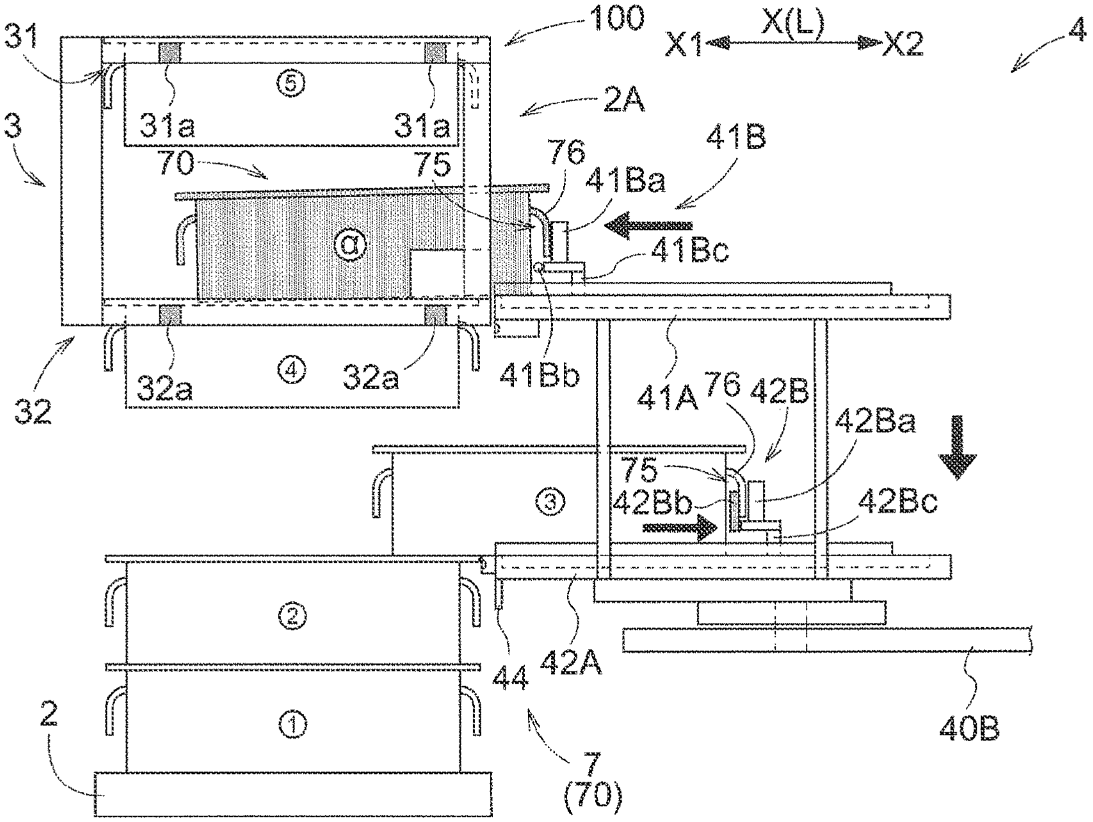
FIG. 31 is an illustrative diagram of a case where containers are retrieved from and loaded to a stacking region in parallel.

As shown in FIG. 8, in the present embodiment, the transfer device 4 includes a restriction section 44. As shown in FIGS. 30 and 31, when the second transfer mechanism 42B retrieves the retrieval target container 70, the restriction section 44 is arranged so as to face the second holding section 42A side of the adjacent container 70 below the retrieval target container 70 and restrict movement of the adjacent container 70 below the retrieval target container 70 toward the second holding section 42A. In the illustrated example, the container 70 at the third level from the bottom in the stacking region 2A is the retrieval target container 70, and the container 70 at the second level from the bottom is the target container 70 to be restricted by the restriction section 44. With such a configuration, during the retrieving operation, if the retrieval target container 70 moving toward the second holding section 42A interferes with the container 70 adjacent therebelow (i.e., the adjacent container 70), and the adjacent container 70 is subjected to force acting toward the second holding section 42A, it is possible to suppress the case where the adjacent container 70 and the containers 70 stacked below the adjacent container 70 move or fall toward the second holding section 42A.

As shown in FIG. 8, in the present embodiment, the restriction section 44 is attached to the second holding section 42A, and is arranged below the second engagement section 42Bb. In the illustrated example, the restriction section 44 is attached to the end portion of the second holding section 42A located on the loading side X1 in the transfer direction. The second engagement section 42Bb is supported by the second support member 42Bc, and is configured to move integrally with the second support member 42Bc along the transfer direction X. Also, the second support member 42Bc moves relative to the second holding section 42A. In other words, in the present embodiment, the second engagement section 42Bb supported by the second support member 42Bc and the restriction section 44 attached to the second holding section 42A are configured to undergo relative movement along the transfer direction X. With such a configuration, when the second transfer mechanism 42B performs the retrieving operation, the second engagement section 42Bb can be moved toward the second holding section 42A, and the restriction section 44 can be kept at a position facing the adjacent container 70 below the retrieval target container 70 from the second holding section 42A side. For this reason, the retrieval target container 70 can be appropriately retrieved while also appropriately suppressing the case where the adjacent container 70 below the retrieval target container 70 and the containers 70 stacked therebelow fall toward the second holding section 42A (see FIGS. 30 and 31). Note that when the second engagement section 42Bb moves toward the retrieving side X2 in the transfer direction, the restriction section 44 may be stopped in place, or may move toward the loading side X1 in the transfer direction, which is opposite to the movement direction of the second engagement section 42Bb, or may move toward the retrieving side X2 in the transfer direction at a lower speed than the second engagement section 42Bb.

As shown in FIG. 8, in the present embodiment, the transfer device 4 includes a reference position detection sensor Se1 for detecting a reference position 80P (see FIG. 2) for storing a container 70 on a shelf 80, and a storage container detection sensor Se2 for detecting a container 70 stored on a shelf 80.

As described above with reference to FIG. 2, the target 82T is provided at the reference position 80P on the shelf 80. In the present embodiment, the reference position detection sensor Se1 is for detecting the positional relationship between the transfer device 4, which includes the reference position detection sensor Se1, and the reference position 80P of the shelf 80 by detecting the target 82T. Then, based on the result of detection of the target 82T by the reference position detection sensor Se1, the travel body 1, the turning device 5, and the transfer elevation body drive section 40M of the transfer device 4 can be controlled so as to operate in order to correct the position of the transfer device 4 and thus enable a container 70 to be appropriately transferred to or from the shelf 80. In this example, the reference position detection sensor Se1 is constituted by a camera. The positional relationship between the transfer device 4 and the target 82T provided on the beam member 82 can be detected by image recognition performed by the reference position detection sensor Se1 constituted as a camera. Also, in this example, the reference position detection sensor Se1 also functions as a ranging sensor that detects the distance to a target. When the transfer device 4 transfers a container 70 to or from the target transfer location, the reference position detection sensor Se1 detects the distance to the target transfer location. This makes it possible to perform the transfer operation with high certainty.

When the transfer device 4 is to perform the loading operation for transferring a container 70 to a shelf 80, the storage container detection sensor Se2 detects the presence or absence of a container 70 on the transfer target shelf 80. If the storage container detection sensor Se2 detects that there is no container 70 on the target shelf 80 that is the loading destination, the transfer device 4 loads the container 70 to that shelf 80. If the storage container detection sensor Se2 detects that there is a container 70 on the target shelf 80 that is the loading destination, the target container 70 may be transferred to another empty shelf 80, or the transfer may be stopped. In this example, the storage container detection sensor Se2 may also be configured as a ranging sensor that detects the distance to a target. Accordingly, the distance between the transfer device 4 and the target transfer location can be measured while performing the transfer operation. In the present embodiment, the storage container detection sensor Se2 is configured as an optical sensor that projects light toward a target. However, there is no limitation to this configuration, and the storage container detection sensor Se2 may be configured using a well-known means such as an ultrasonic sensor or a camera.

The reference position detection sensor Se1 is provided for either the set of the first holding section 41A and the first transfer mechanism 41B or the set of the second holding section 42A and the second transfer mechanism 42B. Also, the storage container detection sensor Se2 is provided for the other set out of the set of the first holding section 41A and the first transfer mechanism 41B and the set of the second holding section 42A and the second transfer mechanism 42B, that is to say, the storage container detection sensor Se2 is provided for the set for which the reference position detection sensor Se1 is not provided. In the present embodiment, the reference position detection sensor Se1 is provided for the set of the first holding section 41A and the first transfer mechanism 41B. In this example, the reference position detection sensor Se1 is provided in the first holding section 41A. Note that the reference position detection sensor Se1 may be provided in the first transfer mechanism 41B. Also, in the present embodiment, the storage container detection sensor Se2 is provided for the set of the second holding section 42A and the second transfer mechanism 42B. In this example, the storage container detection sensor Se2 is provided in the second holding section 42A. Note that the storage container detection sensor Se2 may be provided in the second transfer mechanism 42B.

Transfer Operation

Hereinafter, transfer operations for transfer of a container 70 by the transfer device 4 will be described with reference to FIGS. 12 to 34. Note that only the elements necessary for describing the transfer operations are shown in FIGS. 12 to 34, and are shown in a simplified manner.

Retrieving Operation For Retrieving Container From Shelf

In the present embodiment, the transfer device 4 can retrieve a container 70 from a shelf 80 of a container rack 8. Operations for retrieving the container 70 from the shelf 80 will be described below with reference to FIGS. 12 to 17. In FIGS. 12 to 17, the first engagement section 41Bb and the second engagement section 42Bb are shown in gray when in the engaged orientation, and the first engagement section 41Bb and the second engagement section 42Bb are shown in white when in the disengaged orientation. Here, the case where the first transfer mechanism 41B retrieves the container 70 stored on the shelf 80 will be described as an example. Note that this description similarly applies to the retrieving operation performed by the second transfer mechanism 42B.

Figure 12:
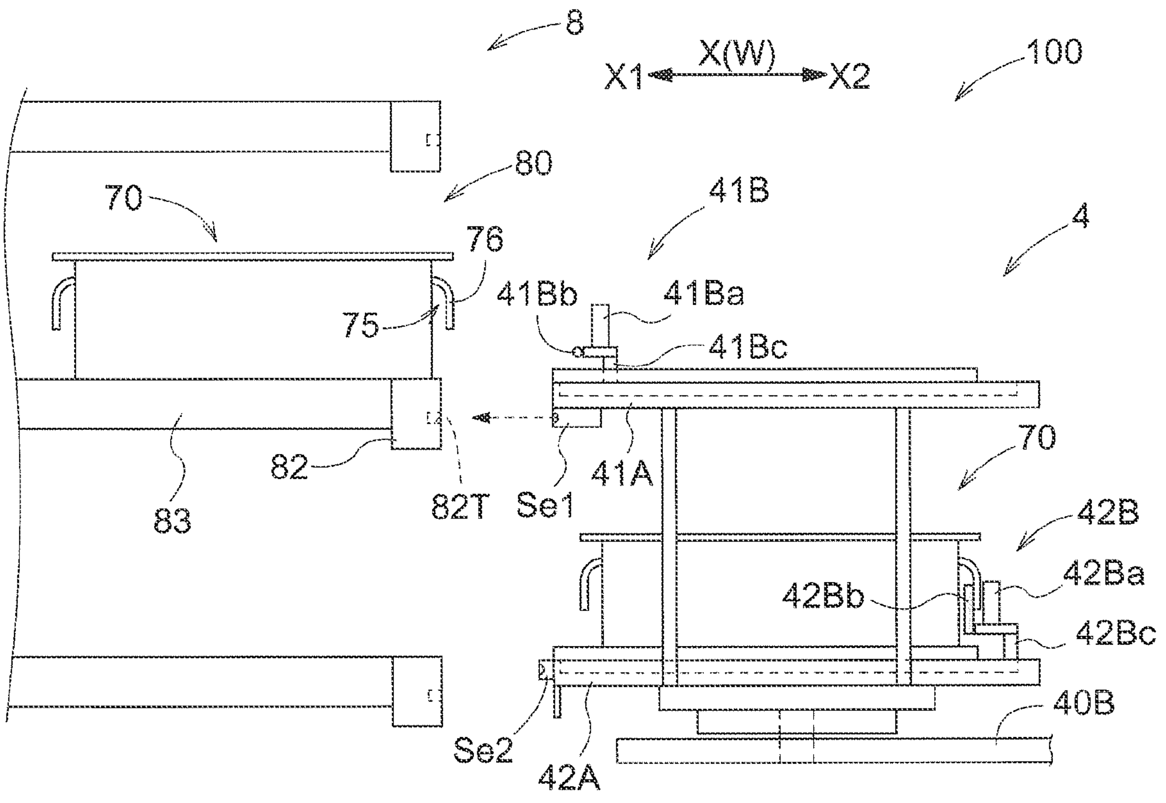
FIG. 12 is an illustrative diagram showing an operation of retrieving a container from a shelf.

As shown in FIG. 12, the control device C (see FIG. 5) positions the first transfer mechanism 41B at an appropriate position relative to the reference position 80P of the shelf 80 based on the result of detection of the target 82T by the reference position detection sensor Se1. Note that the transport vehicle 100 may include an angle sensor that detects the angle of the first transfer mechanism 41B in the horizontal plane. In this case, the angle sensor detects the angle of the first transfer mechanism 41B relative to the shelf 80. Then, based on the detection result of the angle sensor, the control device C adjusts the angle of the first transfer mechanism 41B to an appropriate angle relative to the shelf 80. The control device C adjusts the position and the angle of the first transfer mechanism 41B by controlling the travel body 1, the turning device 5, and the transfer elevation body drive section 40M of the transfer device 4. Then, when the first transfer mechanism 41B is in an appropriate positional relationship with the shelf 80, the control device C causes the first transfer mechanism 41B to retrieve the container 70 stored on the shelf 80.

Figure 13:
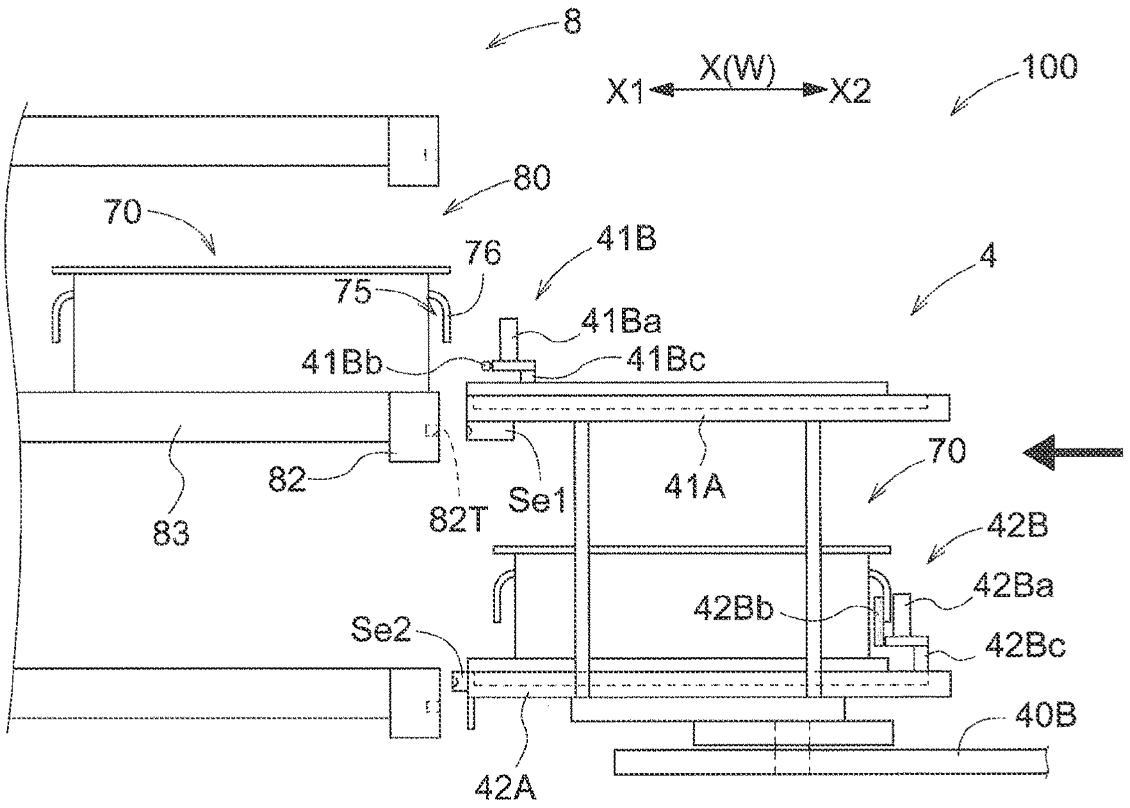
FIG. 13 is an illustrative diagram showing an operation of retrieving a container from a shelf.

As shown in FIG. 13, the control device C moves the first holding section 41A and the second holding section 42A toward the loading side X1 in the transfer direction relative to the transfer elevation body 40B. Accordingly, the first holding section 41A, the second holding section 42A, the first transfer mechanism 41B, and the second transfer mechanism 42B approach the shelf 80. At this time, the distance to the shelf 80 during the approach is detected by the reference position detection sensor Se1 that also functions as a ranging sensor. Accordingly, the first holding section 41A, the second holding section 42A, the first transfer mechanism 41B, and the second transfer mechanism 42B can be brought to an appropriate close distance for performing the transfer operation with respect to the shelf 80.

Figure 14:
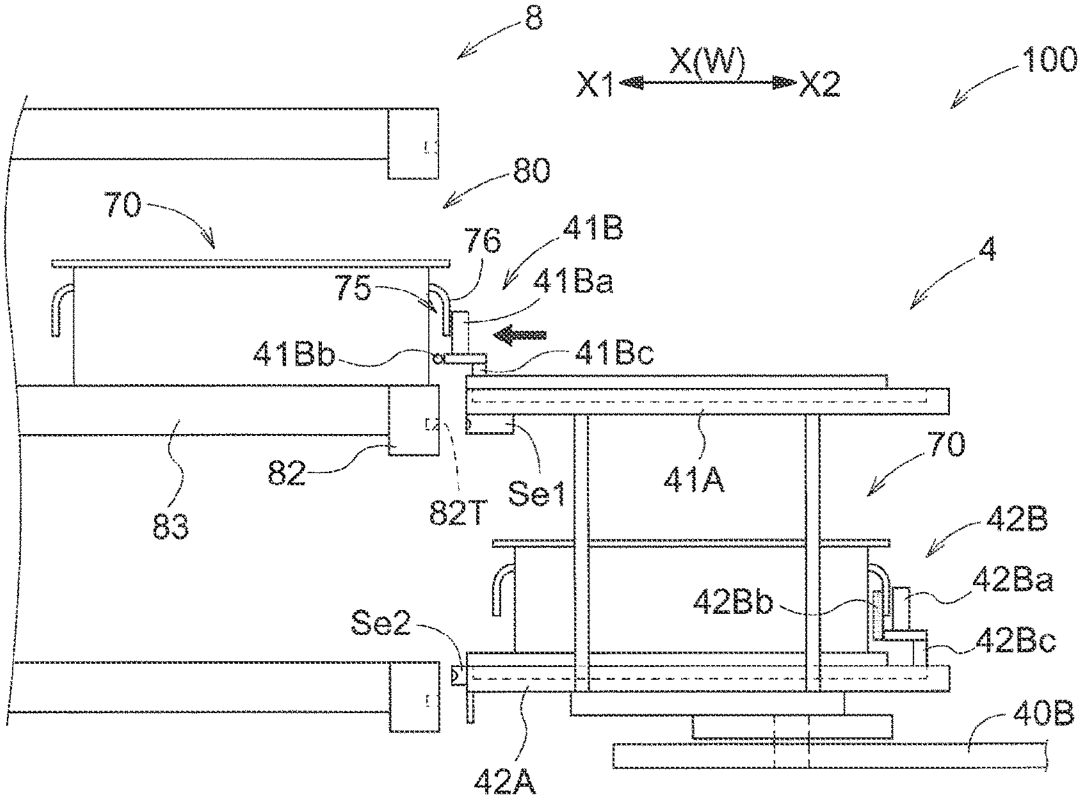
FIG. 14 is an illustrative diagram showing an operation of retrieving a container from a shelf.

Next, as shown in FIG. 14, the control device C moves the first engagement section 41Bb toward the loading side X1 in the transfer direction relative to the first holding section 41A. Accordingly, the first engagement section 41Bb is arranged at a position that is below the recession 75 in the container 70 and overlapping the recession 75 in a vertical view (hereinafter, this is position is referred to as "immediately below the recession 75"). At this time, the first engagement section 41Bb is in the disengaged orientation.

Figure 15:
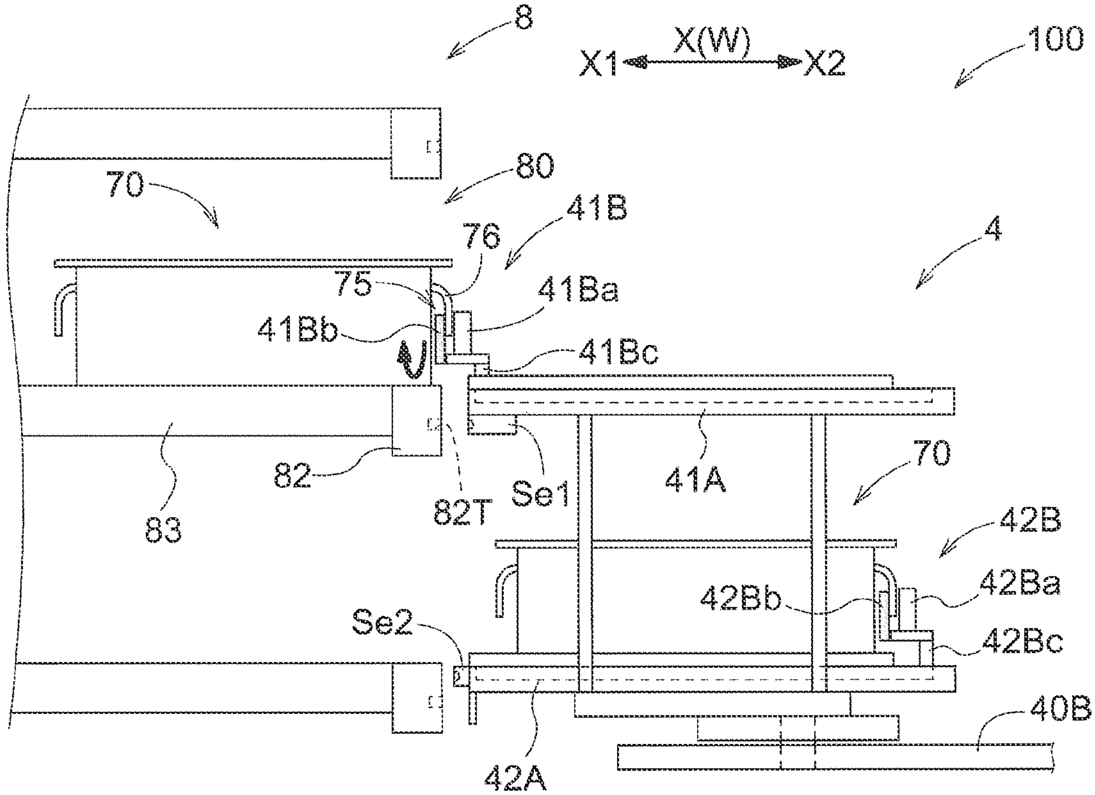
FIG. 15 is an illustrative diagram showing an operation of retrieving a container from a shelf.

As shown in FIG. 15, while the first engagement section 41Bb is arranged immediately below the recession 75, the control device C then sets the first engagement section 41Bb to the engaged orientation. Accordingly, the first engagement section 41Bb is inserted into the recession 75, and the first engagement section 41Bb is arranged facing the engagement wall 76 from the loading side X1 in the transfer direction.

Figure 16:
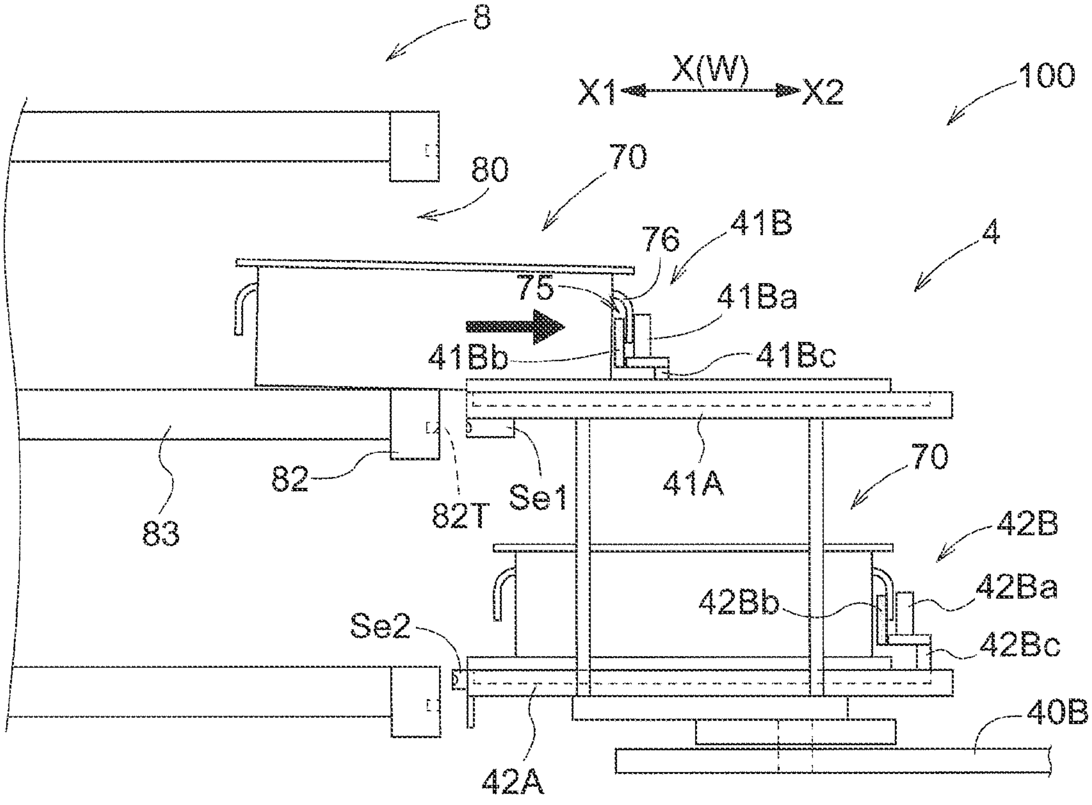
FIG. 16 is an illustrative diagram showing an operation of retrieving a container from a shelf.

Subsequently, as shown in FIG. 16, the control device C moves the first engagement section 41Bb, which is in the engaged orientation and in contact with the engagement wall 76, toward the retrieving side X2 in the transfer direction relative to the first holding section 41A. Accordingly, the first engagement section 41Bb pulls the container 70 from the shelf 80 to the first holding section 41A.

Figure 17:
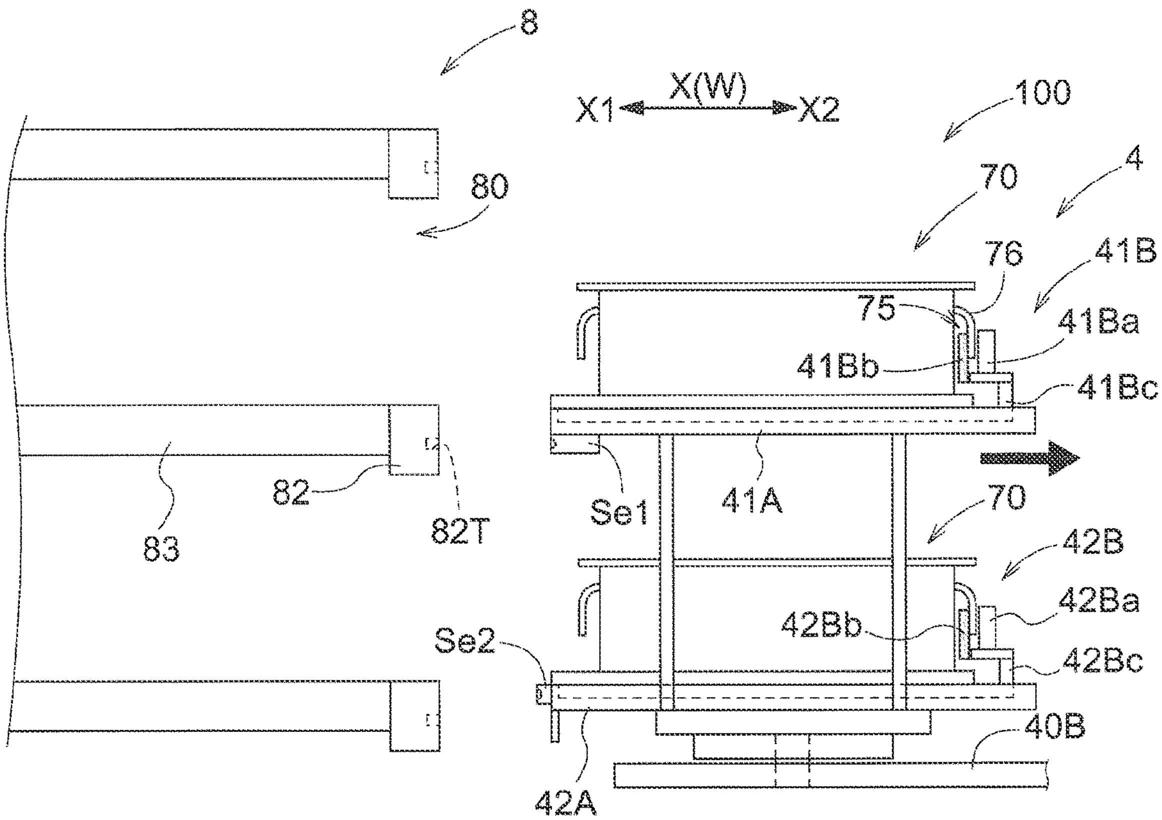
FIG. 17 is an illustrative diagram showing an operation of retrieving a container from a shelf.

As shown in FIG. 17, while the container 70 retrieved by the first transfer mechanism 41B is held on the first holding section 41A, the control device C then moves the first holding section 41A and the second holding section 42A toward the retrieving side X2 in the transfer direction relative to the transfer elevation body 40B so as to return to their original positions. Accordingly, the first holding section 41A, the second holding section 42A, the first transfer mechanism 41B, and the second transfer mechanism 42B move away from the shelf 80. Note that in this example, the control device C keeps the first engagement section 41Bb in the engaged orientation while the container 70 is held by the first holding section 41A. Similarly, the control device C keeps the second engagement section 42Bb in the engaged orientation while the second holding section 42A holds the container 70. Accordingly, the container 70 can be stably held so as not to move in the transfer direction X.

The retrieving operation for retrieving the container 70 from the shelf 80 is performed as described above. This retrieving operation is performed by the control device C controlling functional units of the transport vehicle 100 as described above.

Loading Operation For Loading Container To Shelf

Figure 18:
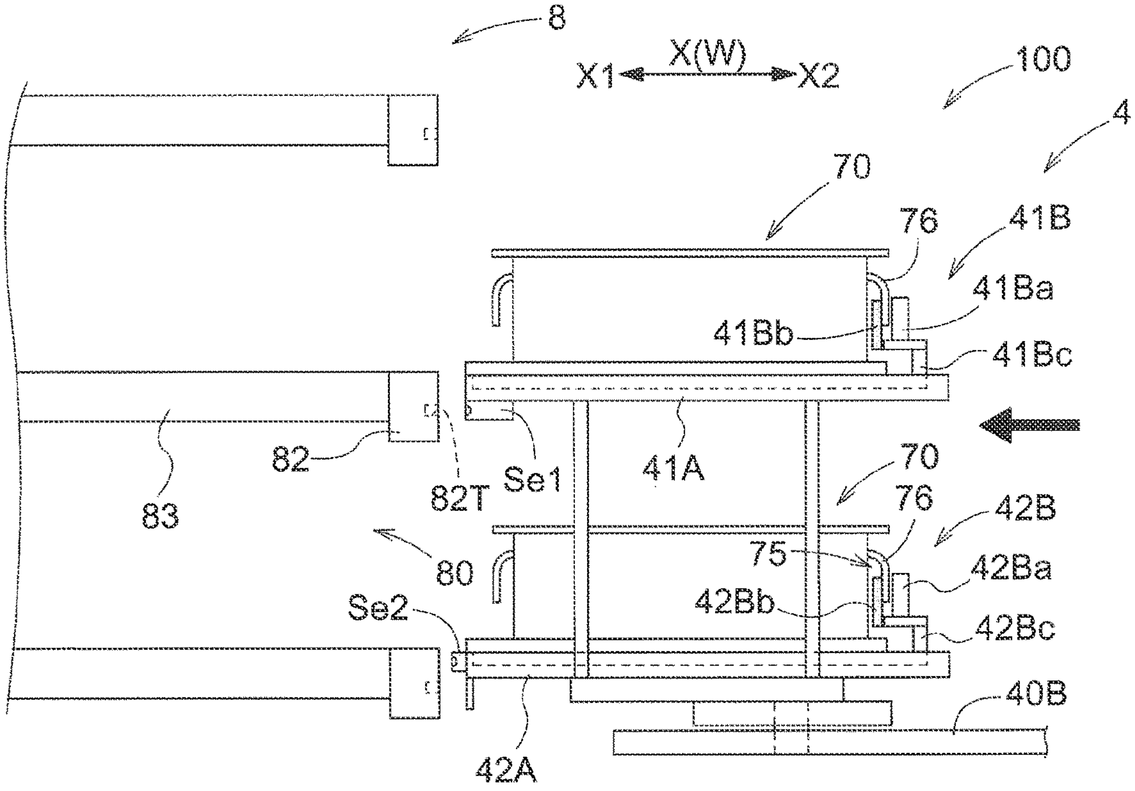
FIG. 18 is an illustrative diagram showing an operation of loading a container to a shelf.
Figure 19:
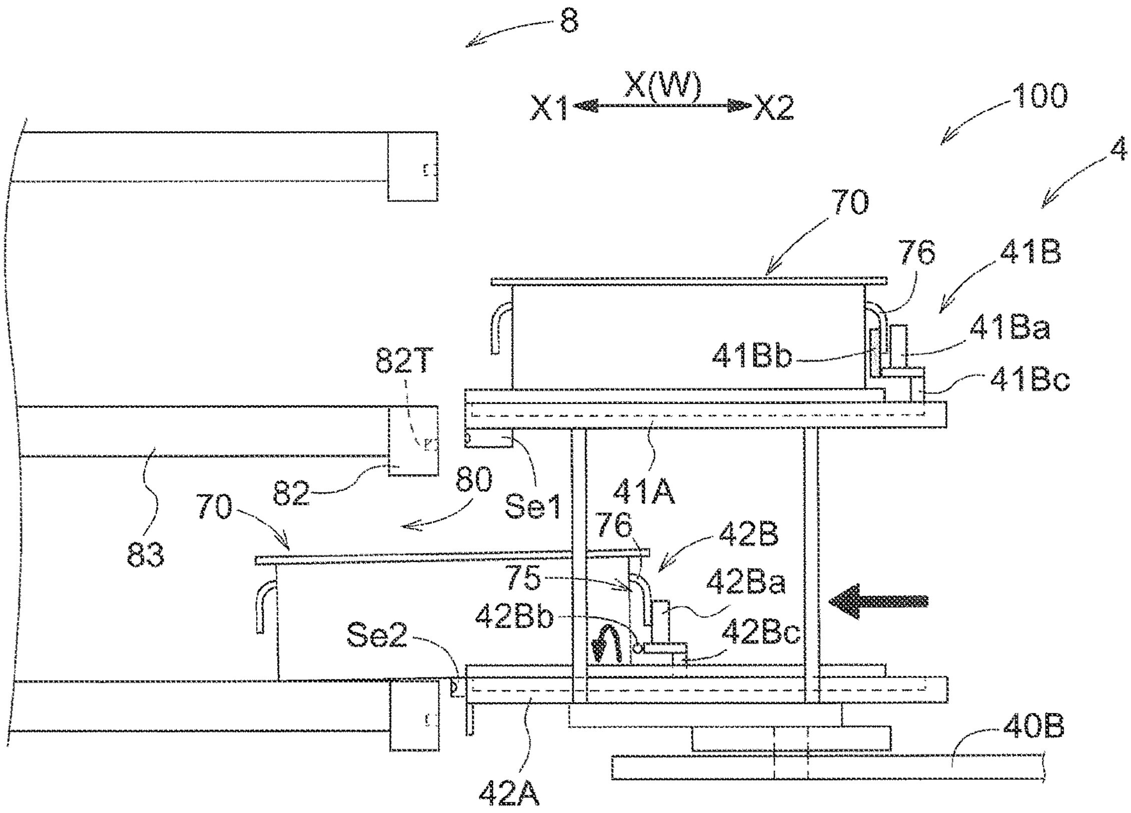
FIG. 19 is an illustrative diagram showing an operation of loading a container to a shelf.
Figure 20:
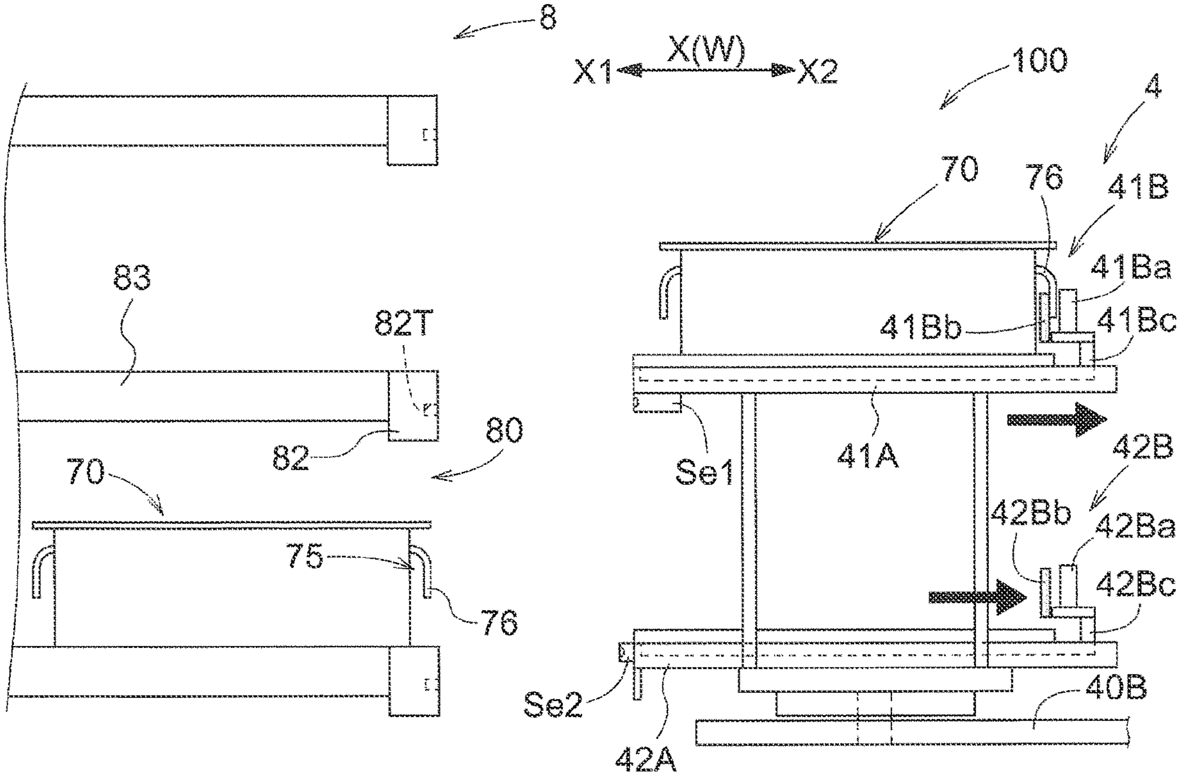
FIG. 20 is an illustrative diagram showing an operation of loading a container to a shelf.

In the present embodiment, the transfer device 4 can load a container 70 to a shelf 80 of a container rack 8. Operations for loading the container 70 to the shelf 80 will be described below with reference to FIGS. 18 to 20. In FIGS. 18 to 20, the first engagement section 41Bb and the second engagement section 42Bb are shown in gray when in the engaged orientation, and the first engagement section 41Bb and the second engagement section 42Bb are shown in white when in the disengaged orientation. Here, the case where the second transfer mechanism 42B loads the container 70 to the shelf 80 will be described as an example. Note that this description similarly applies to the loading operation performed by the first transfer mechanism 41B.

In the present embodiment, it is envisioned that immediately after the first transfer mechanism 41B retrieves a container 70 from the shelf 80 as described above, the second transfer mechanism 42B loads a container 70 to the shelf 80 immediately below the shelf 80 from which the container 70 was retrieved. Accordingly, the second transfer mechanism 42B is already in an appropriate positional relationship with the shelf 80. Note that, similarly to the operation for retrieving the container 70 from the shelf 80 described above, the control device C may perform control to adjust the position of the second transfer mechanism 42B so as to be in an appropriate positional relationship with the shelf 80 based on the result of detection of the target 82T by the reference position detection sensor Se1.

As shown in FIG. 18, the control device C (see FIG. 5) then moves the first holding section 41A and the second holding section 42A toward the loading side X1 in the transfer direction relative to the transfer elevation body 40B. Accordingly, the first holding section 41A, the second holding section 42A, the first transfer mechanism 41B, and the second transfer mechanism 42B approach the shelf 80.

Next, as shown in FIG. 19, the control device C moves the second pushing section 42Ba toward the loading side X1 in the transfer direction relative to the second holding section 42A so as to push the container 70 toward the loading side X1 the transfer direction. Accordingly, the loading target container 70 held by the second holding section 42A is moved from the second holding section 42A to the shelf 80. In this example, the second pushing section 42Ba pushes the container 70 toward the loading side X1 in the transfer direction while in contact with the engagement wall 76 of the container 70 from the retrieving side X2 in the transfer direction. Also, in this example, while the loading target container 70 is moving toward the loading side X1 in the transfer direction, the control device C changes the second engagement section 42Bb, which is moving toward the loading side X1 in the transfer direction together with the second pushing section 42Ba, from the engaged orientation to the disengaged orientation.

As shown in FIG. 20, after loading the loading target container 70 to the shelf 80, the control device C then moves the second pushing section 42Ba toward the retrieving side X2 in the transfer direction relative to the second holding section 42A, and moves the first holding section 41A and the second holding section 42A toward the retrieving side X2 in the transfer direction relative to the transfer elevation body 40B so as to return to their original positions. Accordingly, the first holding section 41A, the second holding section 42A, the first transfer mechanism 41B, and the second transfer mechanism 42B move away from the shelf 80.

The loading operation for loading the container 70 to the shelf 80 is performed as described above. This loading operation is performed by the control device C controlling functional units of the transport vehicle 100 as described above.

Parallel Operations for Retrieving and Loading of Containers in Stacking Region

In the present embodiment, the transfer device 4 can perform both the retrieving operation and the loading operation for containers 70 in the stacking region 2A. Specifically, the transfer device 4 can perform parallel operations in which containers 70 are retrieved from and loaded to the stacking region 2A in parallel. In the present embodiment, the transfer device 4 performs the parallel operations while the first lifting mechanism 31 and the second lifting mechanism 32 are lifting the containers 70 in the stacking region 2A. However, the transfer device 4 can also perform the retrieving operation and the loading operation independently in the stacking region 2A.

Parallel operations for retrieving and loading containers 70 in the stacking region 2A will be described below with reference to FIGS. 21 to 34. In FIGS. 21 to 34, the first engagement section 41Bb and the second engagement section 42Bb are shown in gray when in the engaged orientation, and the first engagement section 41Bb and the second engagement section 42Bb are shown in white when in the disengaged orientation. Also, the first lifting and holding section 31*a* of the first lifting mechanism 31 and the second lifting and holding section 32*a* of the second lifting mechanism 32 are shown in gray when in the holding orientation, and the first lifting and holding section 31*a* and the second lifting and holding section 32*a* are shown in white when in the non-holding orientation. The following describes the case where a container 70 is loaded to the stacking region 2A by the first transfer mechanism 41B, and a container 70 is retrieved from the stacking region 2A by the second transfer mechanism 42B.

FIGS. 21 to 34 show an example in which five containers 70 are stacked in a container group 7 in the stacking region 2A. In the figures, the stacked containers 70 are denoted by the numbers "1 to 5" in order from the bottom to the top. Also, the character "α" denotes the loading target container 70 held by the first holding section 41A (e.g., see FIG. 25).

Figure 21:
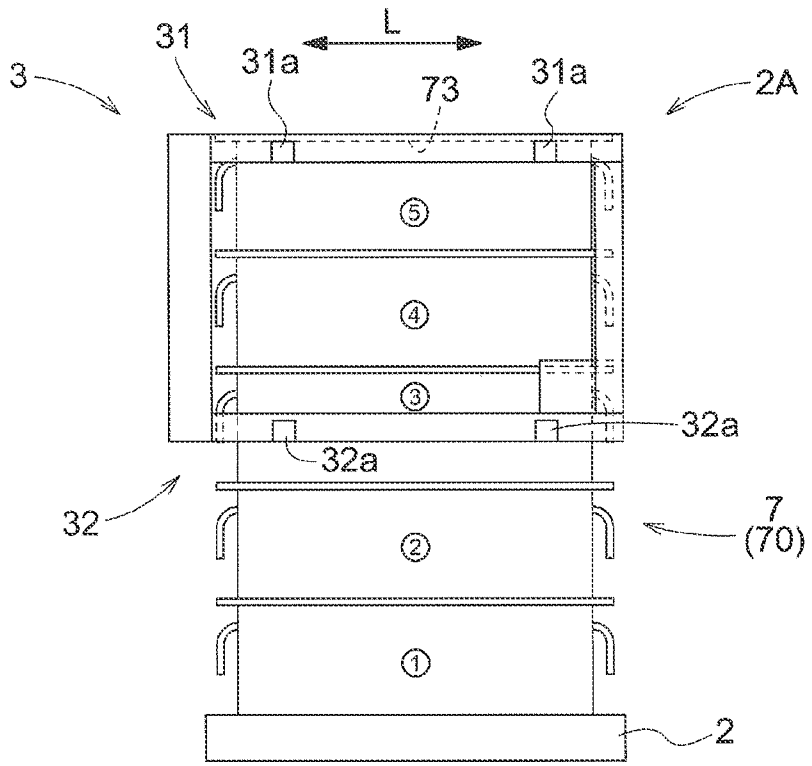
FIG. 21 is an illustrative diagram of a case where containers are retrieved from and loaded to a stacking region in parallel.

As shown in FIG. 21, the control device C (see FIG. 5) moves the first lifting and holding section 31*a* in the non-holding orientation to a lifting position for lifting the lifting target container 70 (container "5"). In this example, the control device C moves the first lifting and holding section 31*a* to a position below and adjacent to the lifting rib 73 of the lifting target container 70 (container "5").

Figure 22:
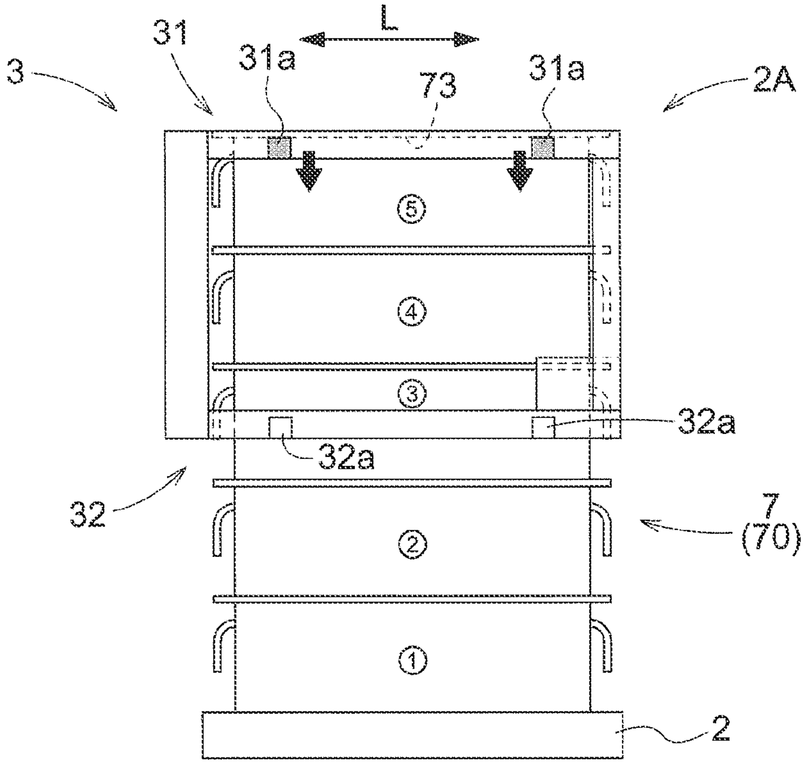
FIG. 22 is an illustrative diagram of a case where containers are retrieved from and loaded to a stacking region in parallel.
Figure 23:
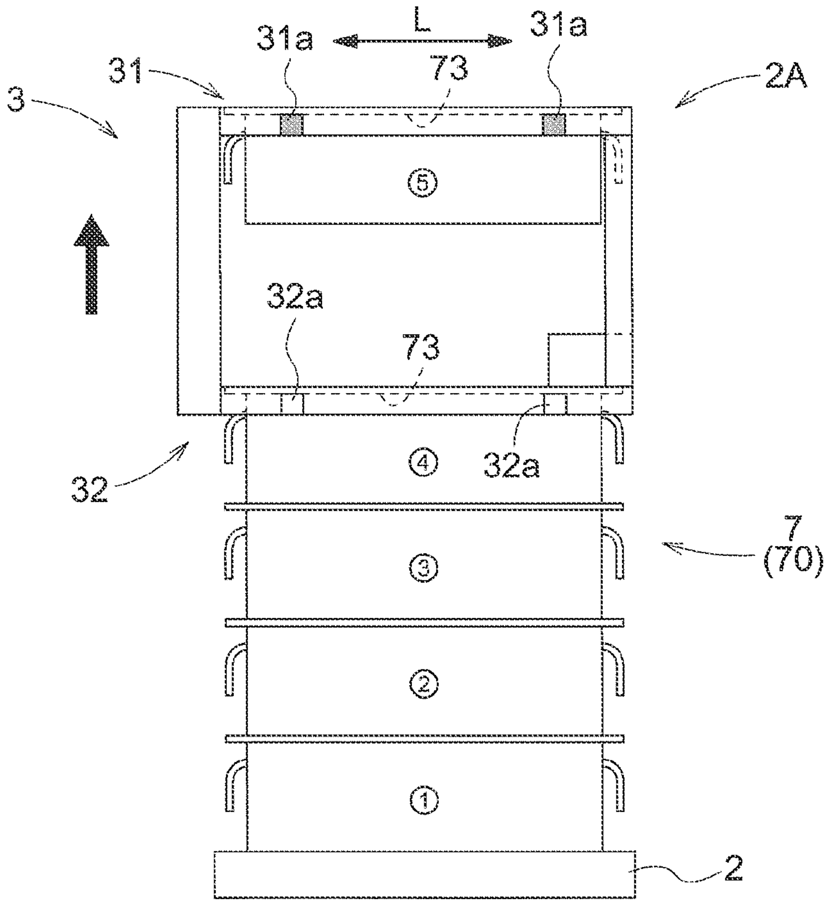
FIG. 23 is an illustrative diagram of a case where containers are retrieved from and loaded to a stacking region in parallel.

Next, as shown in FIGS. 22 and 23, the control device C changes the first lifting and holding section 31*a* to the holding orientation and raises the first lifting mechanism 31 and the second lifting mechanism 32, thereby lifting the first lifting target container 70 (container "5"). In parallel with this, the control device C moves the second lifting and holding section 32*a* in the non-holding orientation to a lifting position for lifting a second lifting target container 70 (container "4"). In this example, the control device C moves the second lifting and holding section 32*a* to a position below and adjacent to the lifting rib 73 of the second lifting target container 70 (container "4").

Figure 24:
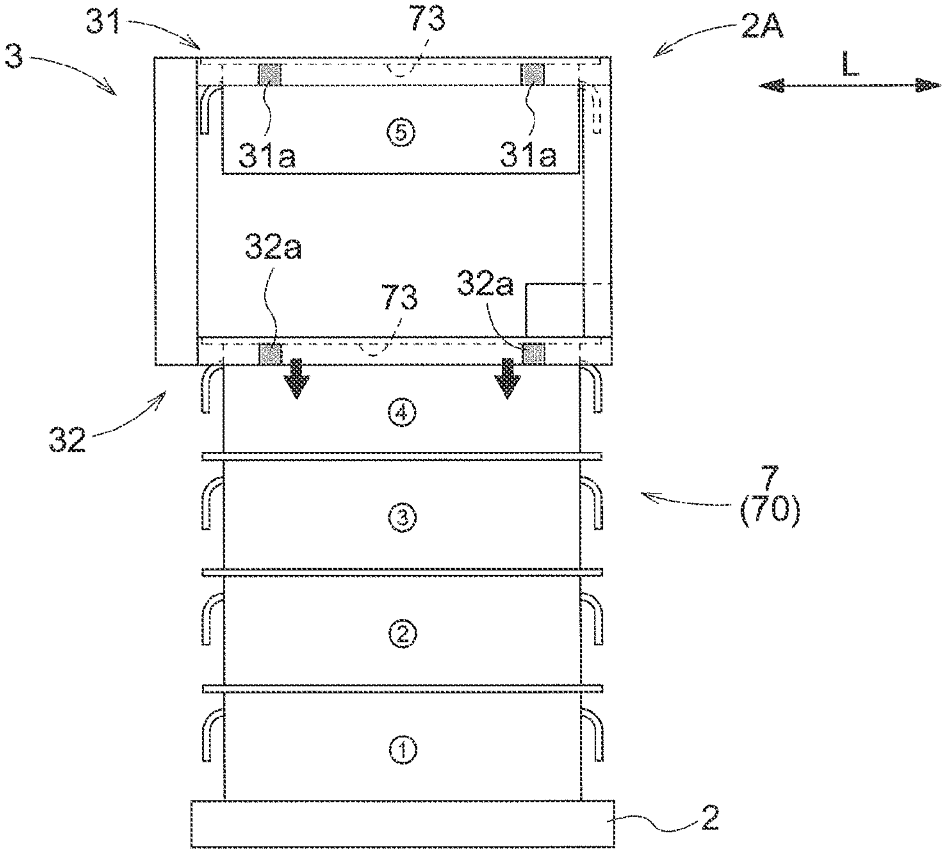
FIG. 24 is an illustrative diagram of a case where containers are retrieved from and loaded to a stacking region in parallel.

Next, as shown in FIGS. 24 and 25, the control device C changes the second lifting and holding section 32*a* to the holding orientation and further raises the first lifting mechanism 31 and the second lifting mechanism 32, thereby lifting the second lifting target container 70 (container "4"). Due to the above operations, as shown in FIG. 25, a vertical space is formed below the container 70 lifted by the first lifting and holding section 31*a* (container "5"), and a vertical space is formed below the container 70 lifted by the second lifting and holding section 32*a* (container "4").

In the present embodiment, the container 70 held by the first holding section 41A (container "α") is the loading target container 70, and the first transfer mechanism 41B transfers the loading target container 70 onto the container 70 (container "4") lifted by the second lifting and holding section 32*a* (second lifting mechanism 32). Also, the adjacent container 70 (container "3") below the container 70 (container "4") lifted by the second lifting and holding section 32*a* (second lifting mechanism 32) is the retrieving target container 70, and the second transfer mechanism 42B transfers the retrieving target container 70 to the second holding section 42A.

As shown in FIG. 25, the control device C moves the second holding section 42A to a position adjacent, on the retrieving side X2 in the transfer direction, to the retrieving target container 70 (container "3"), at a height corresponding to the retrieving target container 70 (container "3") that is adjacent below the container 70 (container "4") lifted by the second lifting and holding section 32*a*.

Figure 26:
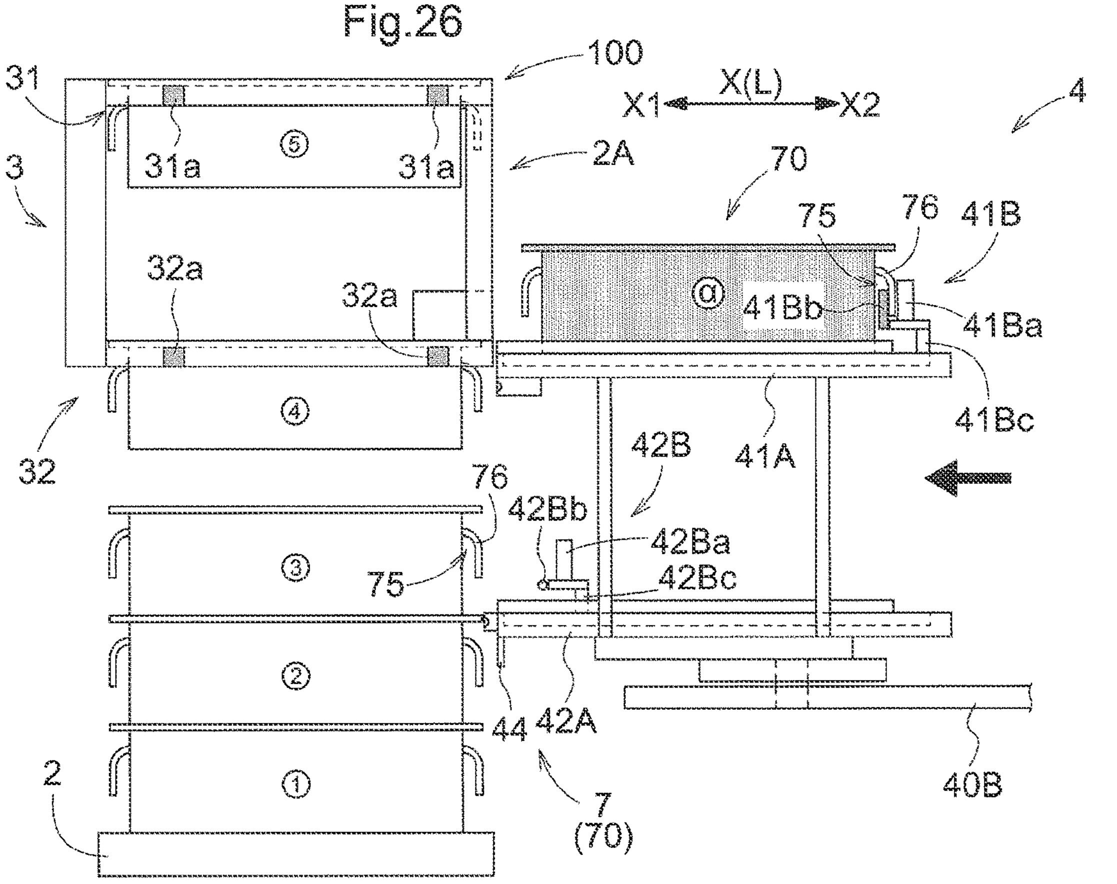
FIG. 26 is an illustrative diagram of a case where containers are retrieved from and loaded to a stacking region in parallel.

Next, as shown in FIG. 26, the control device C moves the first holding section 41A and the second holding section 42A toward the loading side X1 in the transfer direction relative to the transfer elevation body 40B. Accordingly, the first holding section 41A, the second holding section 42A, the first transfer mechanism 41B, and the second transfer mechanism 42B approach the stacking region 2A.

Figure 27:
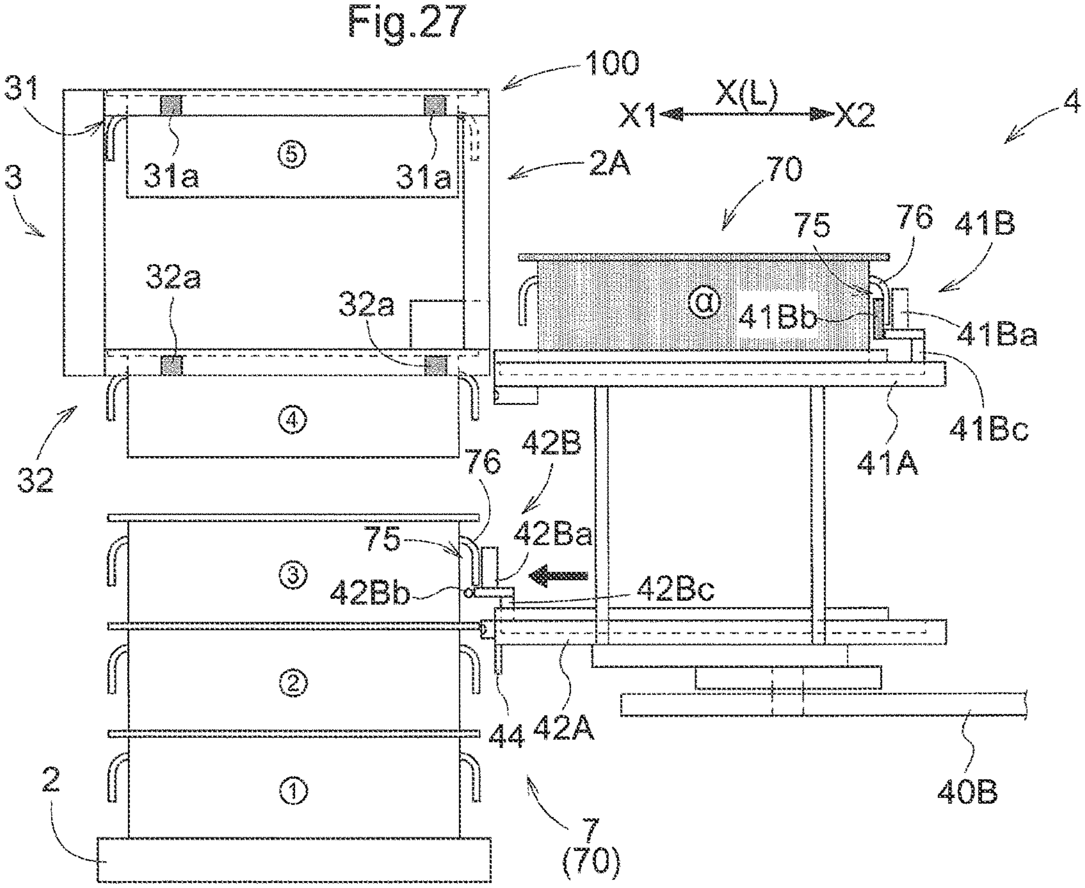
FIG. 27 is an illustrative diagram of a case where containers are retrieved from and loaded to a stacking region in parallel.

Then, as shown in FIG. 27, the control device C moves the second engagement section 42Bb toward the loading side X1 in the transfer direction relative to the second holding section 42A. Accordingly, the second engagement section 42Bb is arranged immediately below the recession 75 of the retrieving target container 70 (container "3"). At this time, the second engagement section 42Bb is in the disengaged orientation.

Figure 28:
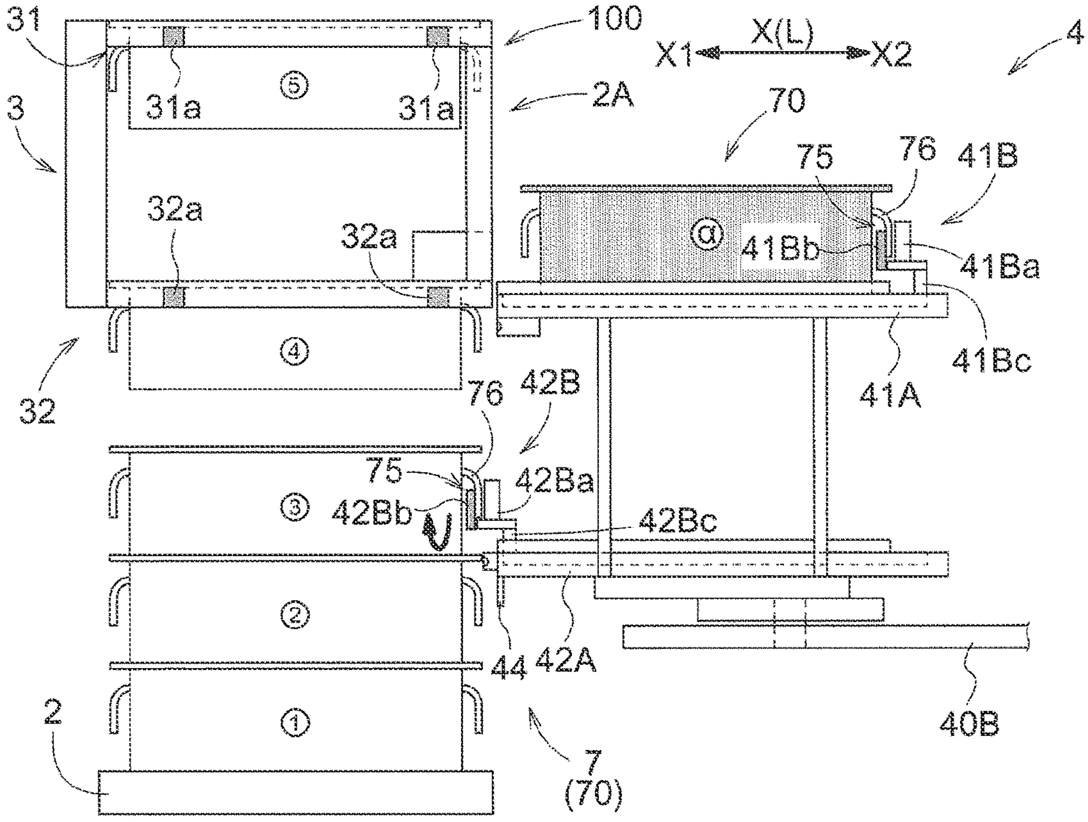
FIG. 28 is an illustrative diagram of a case where containers are retrieved from and loaded to a stacking region in parallel.

Subsequently, as shown in FIG. 28, the control device C changes the second engagement section 42Bb to the engaged orientation, and raises the first holding section 41A and the second holding section 42A as shown in FIG. 29. Accordingly, the retrieving target container 70 (container "3") becomes inclined upward toward the retrieving side X2 in the transfer direction, and the retrieving target container 70 (container "3") and the adjacent container 70 (container "2") therebelow become unfitted. Also, due to raising the first holding section 41A and the second holding section 42A in this way, the first holding section 41A becomes positioned higher than the container 70 (container "4") lifted by the second lifting and holding section 32*a*. In other words, the control device C moves the lower surface of the loading target container 70 (container "α") held by the first holding section 41A to a position higher than the upper surface of the loading destination container 70 (container "4"). Note that at this time, the amount by which the first holding section 41A and the second holding section 42A move upward is equivalent to the vertical movement amount Mv described above.

Next, as shown in FIG. 30, the control device C moves the second engagement section 42Bb toward the retrieving side X2 in the transfer direction relative to the second holding section 42A, and moves the first pushing section 41Ba toward the loading side X1 in the transfer direction relative to the first holding section 41A. Accordingly, the second engagement section 42Bb pulls the retrieving target container 70 (container "3") toward the retrieving side X2 in the transfer direction, and the first pushing section 41Ba pushes the loading target container 70 (container "α") toward the loading side X1 in the transfer direction. At this time, the loading target container 70 (container "α") pushed by the first pushing section 41Ba is appropriately guided toward the loading side X1 in the transfer direction by the guide section 3G. Also, in this example, while moving the second engagement section 42Bb toward the second holding section 42A, the control device C keeps the restriction section 44 at a position facing, from the second holding section 42A side, the adjacent container 70 (container "2") below the retrieving target container 70 (container "3"). For this reason, it is possible to appropriately retrieve the retrieving target container 70 (container "3") while also appropriately suppressing the case where the adjacent container 70 (container "2") below the retrieving target container 70 (container "3") and the container 70 (container "1") stacked therebelow fall or move toward the second holding section 42A. In this example, the control device C changes the first engagement section 41Bb from the engaged orientation to the disengaged orientation in parallel with causing the first pushing section 41Ba to push the loading target container 70 (container "α") toward the loading side X1 in the transfer direction.

Figure 32:
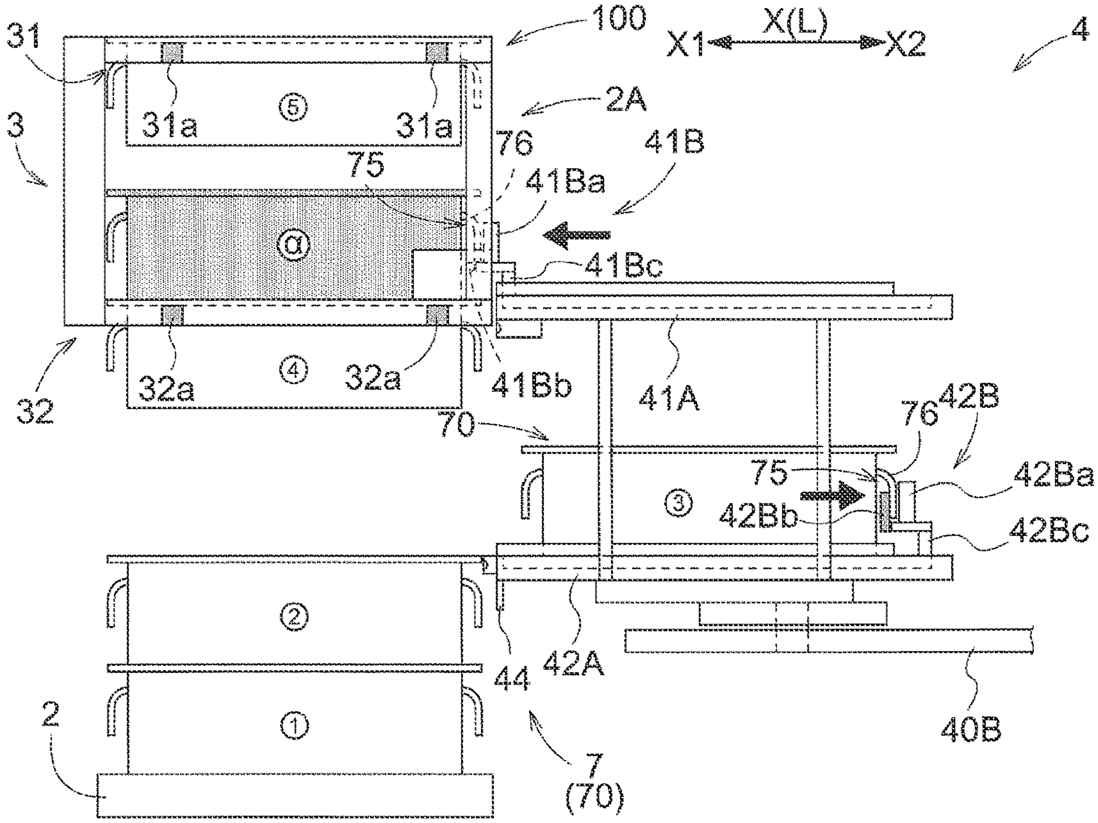
FIG. 32 is an illustrative diagram of a case where containers are retrieved from and loaded to a stacking region in parallel.

Then, as shown in FIG. 31, after the retrieving target container 70 (container "3") pulled by the second engagement section 42Bb is placed over the second holding section 42A, and the loading target container 70 (container "α") pushed by the first pushing section 41Ba is placed over the container 70 (container "4") lifted by the second lifting and holding section 32*a*, the control device C lowers the first holding section 41A and the second holding section 42A. Accordingly, as shown in FIG. 32, the loading target container 70 (container "α") pushed toward the loading side X1 in the transfer direction by the first pushing section 41Ba is moved downward and fitted into the container 70 (container "4") lifted by the second lifting and holding section 32*a*.

Figure 33:
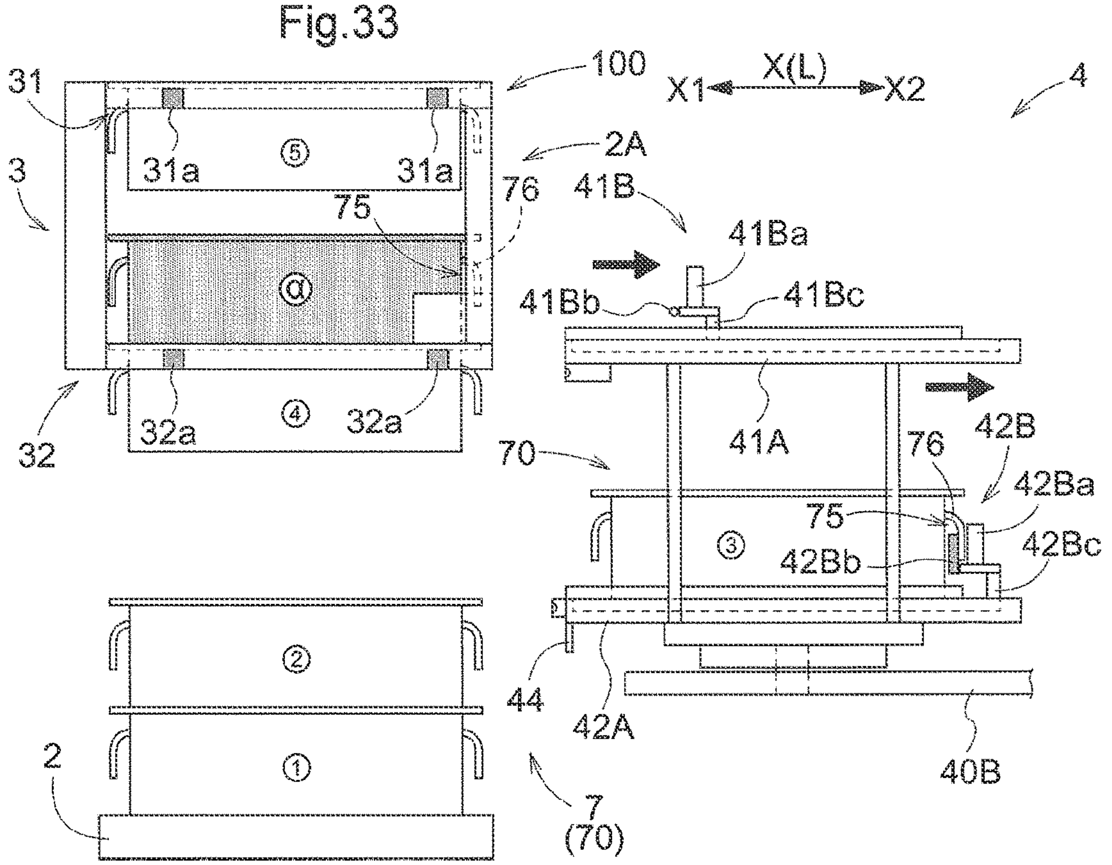
FIG. 33 is an illustrative diagram of a case where containers are retrieved from and loaded to a stacking region in parallel.

Subsequently, as shown in FIG. 33, the control device C moves the first pushing section 41Ba toward the retrieving side X2 in the transfer direction relative to the first holding section 41A, and moves the first holding section 41A and the second holding section 42A toward the retrieving side X2 in the transfer direction relative to the transfer elevation body 40B so as to return to their original positions. Accordingly, the first holding section 41A, the second holding section 42A, the first transfer mechanism 41B, and the second transfer mechanism 42B move away from the stacking region 2A.

Figure 34:
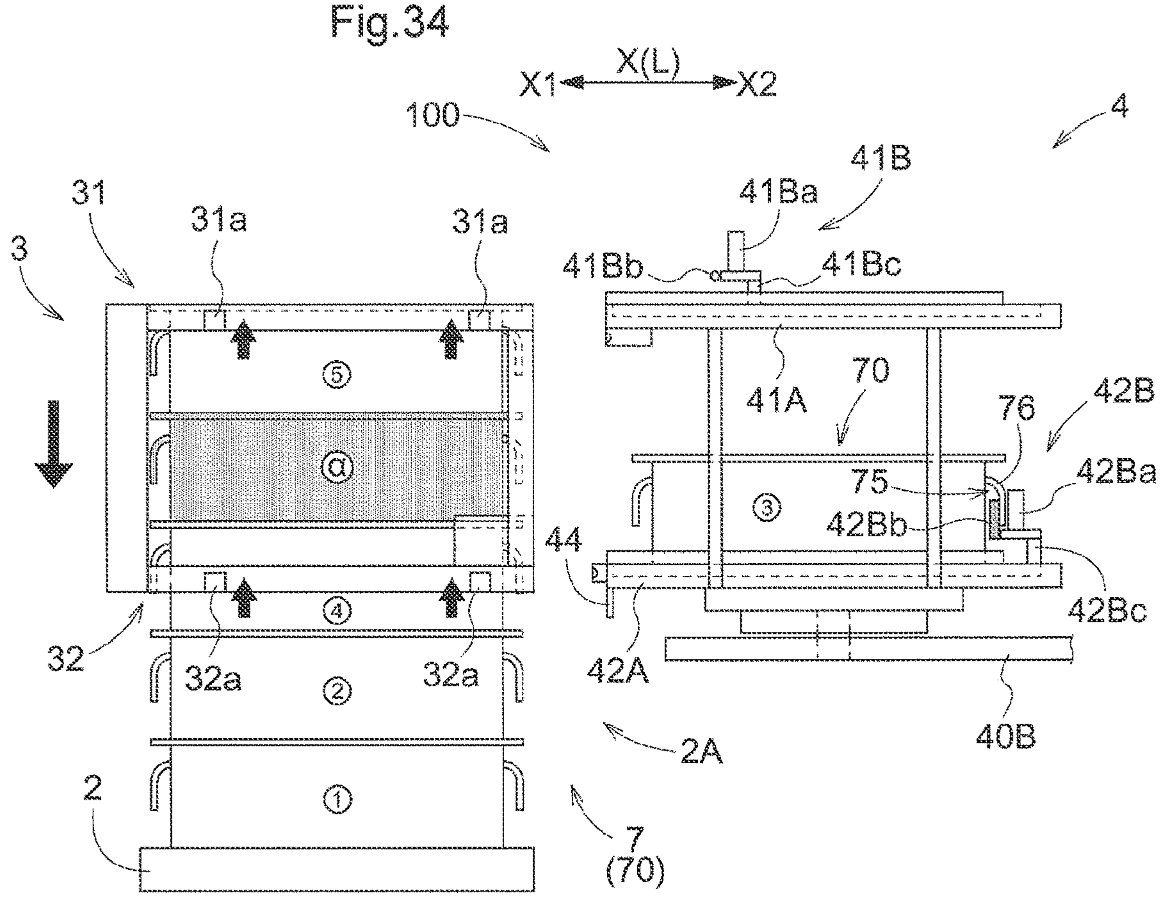
FIG. 34 is an illustrative diagram of a case where containers are retrieved from and loaded to a stacking region in parallel.

Next, as shown in FIG. 34, the control device C lowers the first lifting and holding section 31*a* and the second lifting and holding section 32*a*, and fits the container 70 (container "4") lifted by the second lifting and holding section 32*a* into the container 70 (container "2") located therebelow. Subsequently, the control device C changes the second lifting and holding section 32*a* from the holding orientation to the non-holding orientation. Then, the control device C further lowers the first lifting and holding section 31*a* and the second lifting and holding section 32*a*, and fits the container 70 (container "5") lifted by the first lifting and holding section 31*a* into the container 70 (container "α") located therebelow. Thereafter, the control device C changes the first lifting and holding section 31*a* from the holding orientation to the non-holding orientation.

The above-described parallel operations for retrieving and loading containers 70 in the stacking region 2A in parallel is thus complete. These parallel operations are performed by the control device C controlling functional units of the transport vehicle 100 as described above.

Replacing Operation for Replacing Container on Shelf

In the present embodiment, the transfer device 4 can perform a replacing operation for replacing a container 70 on a specified shelf 80. Specifically, in the replacing operation, the transfer device 4 retrieves a stored container 70 from a shelf 80 and loads another container 70 to the resulting empty space in shelf 80. Accordingly, it is possible to replace containers 70 on the shelves 80 and maintain a state in which containers 70 are always stored on the shelves 80. For this reason, in the container rack 8 overall, the ratio of shelves 80 storing containers 70 can be kept higher than the ratio of empty shelves 80 not storing containers 70, that is to say, it is possible to maintain a high storage ratio for the container rack 8.

In the present embodiment, the transfer device 4 performs the container 70 replacing operation while a container 70 is held by either the first holding section 41A or the second holding section 42A. Specifically, in the case where a container 70 is stored on a shelf 80, the transfer device 4 performs the retrieving operation to transfer a container 70 from the shelf 80 to either the first holding section 41A or the second holding section 42A, specifically whichever one is not holding a container 70, and performs the loading operation for transferring a container 70 from either the first holding section 41A or the second holding section 42A, specifically whichever one is holding the container 70 in advance, to the shelf 80 that became empty due to the retrieving operation.

In this example, the transfer device 4 performs the container 70 replacing operation in a state in which the first holding section 41A is not holding a container 70 and the second holding section 42A is holding a container 70. Also, the transfer device 4 performs the retrieving operation to transfer a container 70 from the shelf 80 to the first holding section 41A, and thereafter performs the loading operation to transfer a container 70 from the second holding section 42A to the shelf 80.

Replacing operations for replacing a container 70 on a shelf 80 will be described below with reference to FIGS. 35 to 42. In FIGS. 35 to 42, the first engagement section 41Bb and the second engagement section 42Bb are shown in gray when in the engaged orientation, and the first engagement section 41Bb and the second engagement section 42Bb are shown in white when in the disengaged orientation.

Figure 35:
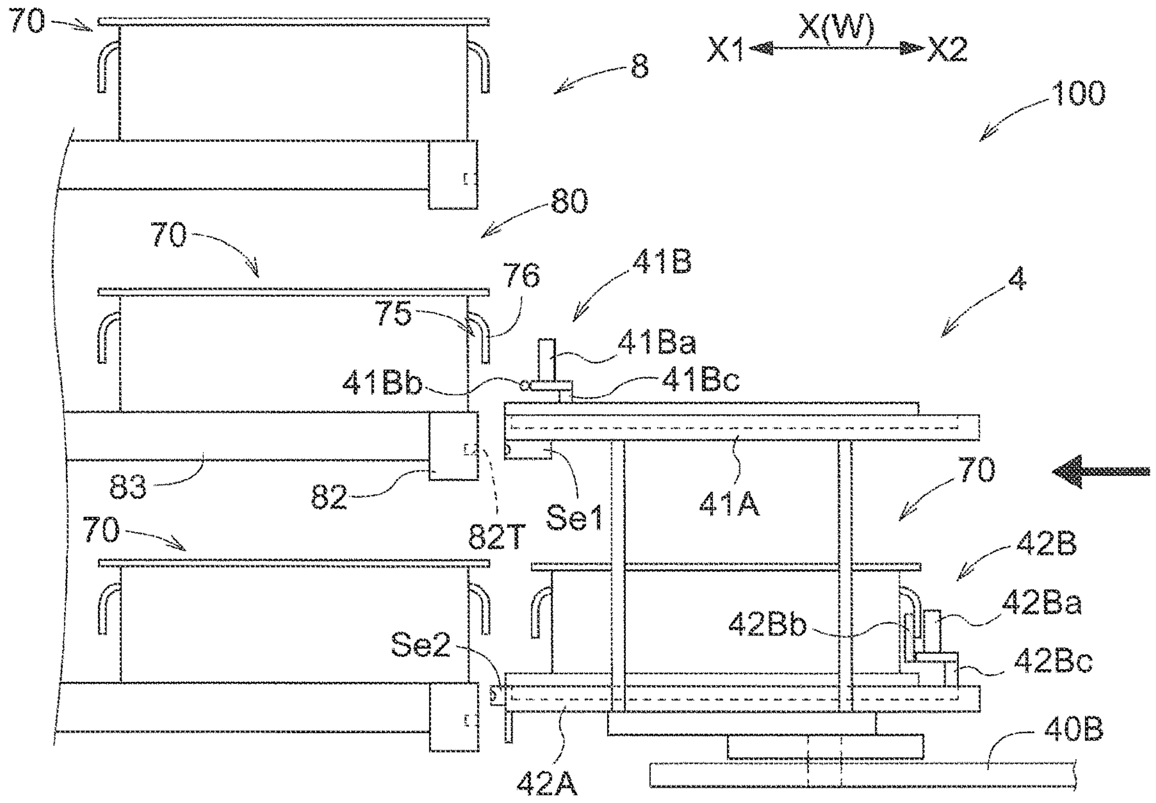
FIG. 35 is an illustrative diagram of a case of performing replacement of a container on a shelf.

As shown in FIG. 35, the control device C (see FIG. 5) moves the first holding section 41A and the second holding section 42A toward the loading side X1 in the transfer direction relative to the transfer elevation body 40B. Accordingly, the first holding section 41A, the second holding section 42A, the first transfer mechanism 41B, and the second transfer mechanism 42B approach the shelf 80.

Figure 36:
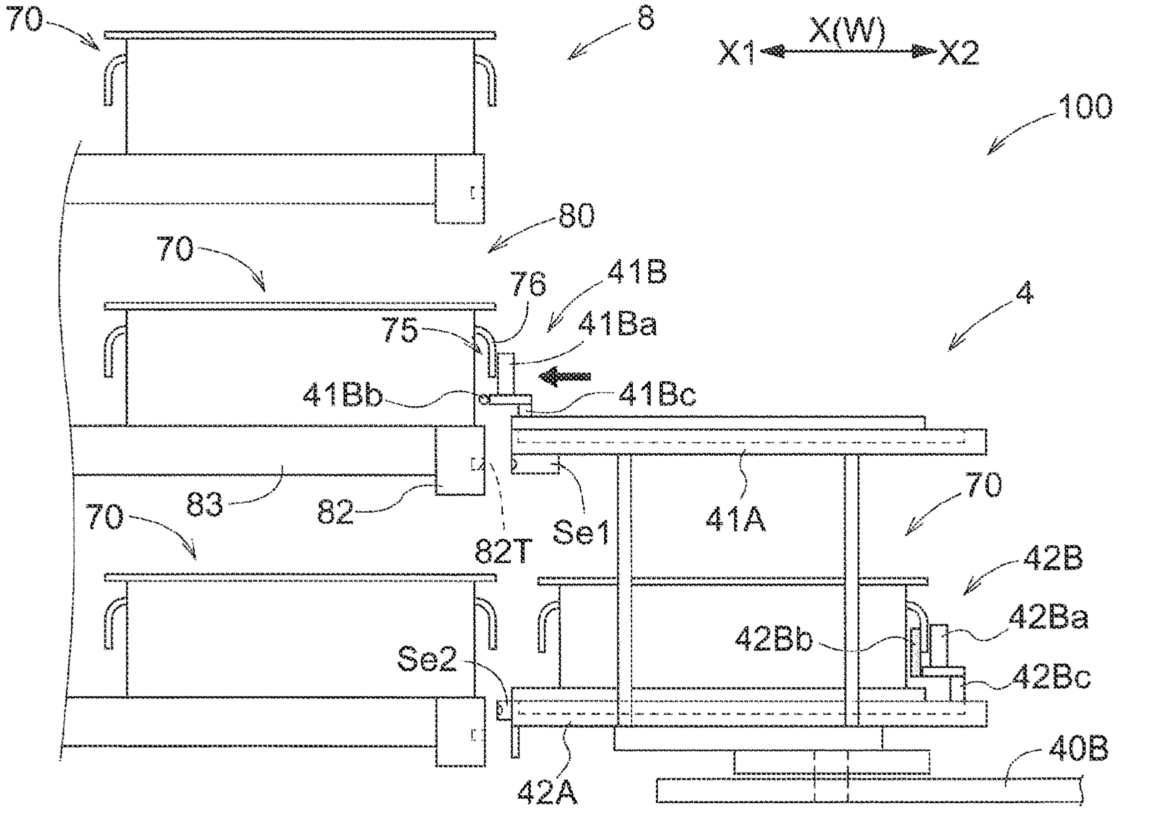
FIG. 36 is an illustrative diagram of a case of performing replacement of a container on a shelf.

Next, as shown in FIG. 36, the control device C moves the first engagement section 41Bb toward the loading side X1 in the transfer direction relative to the first holding section 41A. Accordingly, the first engagement section 41Bb is located immediately below the recession 75 in the container 70. At this time, the first engagement section 41Bb is in the disengaged orientation.

Figure 37:
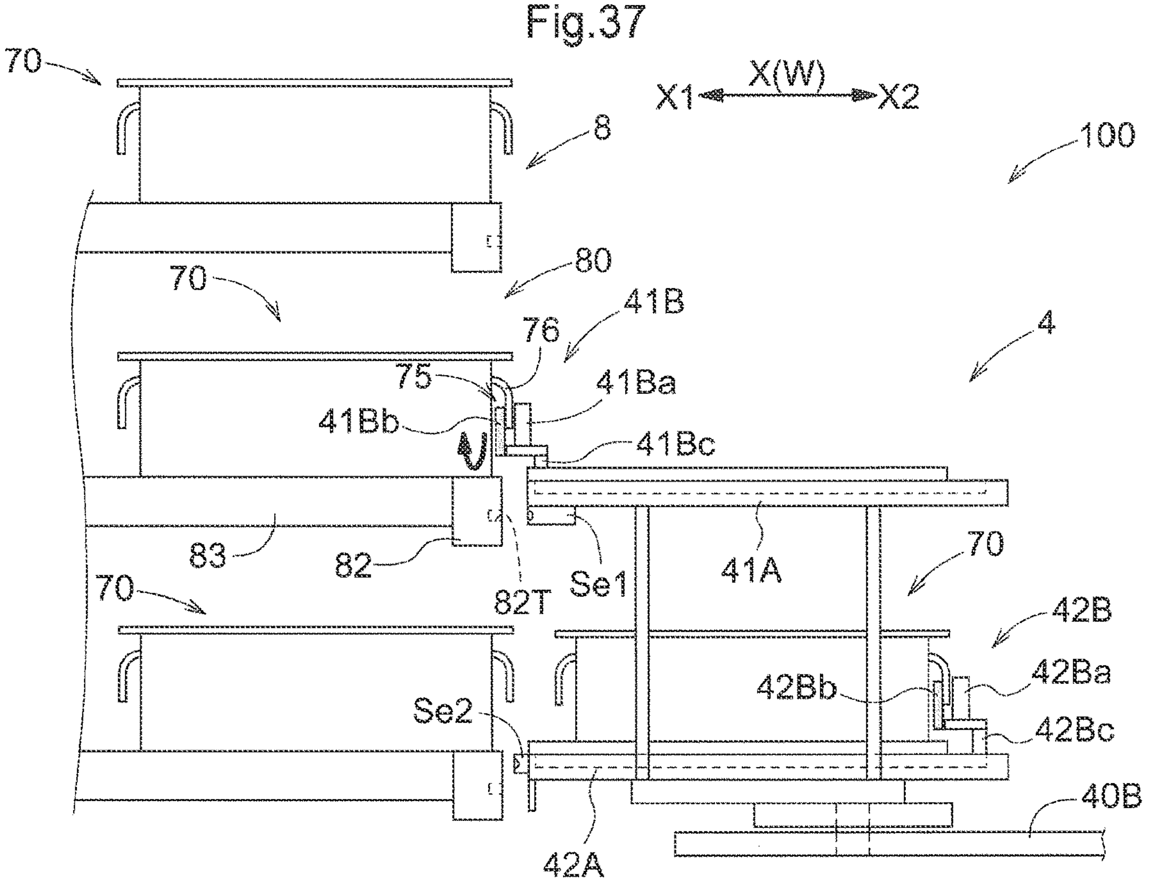
FIG. 37 is an illustrative diagram of a case of performing replacement of a container on a shelf.

Then, as shown in FIG. 37, the control device C places the first engagement section 41Bb in the engaged orientation while the first engagement section 41Bb is located immediately below the recession 75. Accordingly, the first engagement section 41Bb is inserted into the recession 75, and the first engagement section 41Bb is arranged facing the engagement wall 76 from the loading side X1 in the transfer direction.

Figure 38:
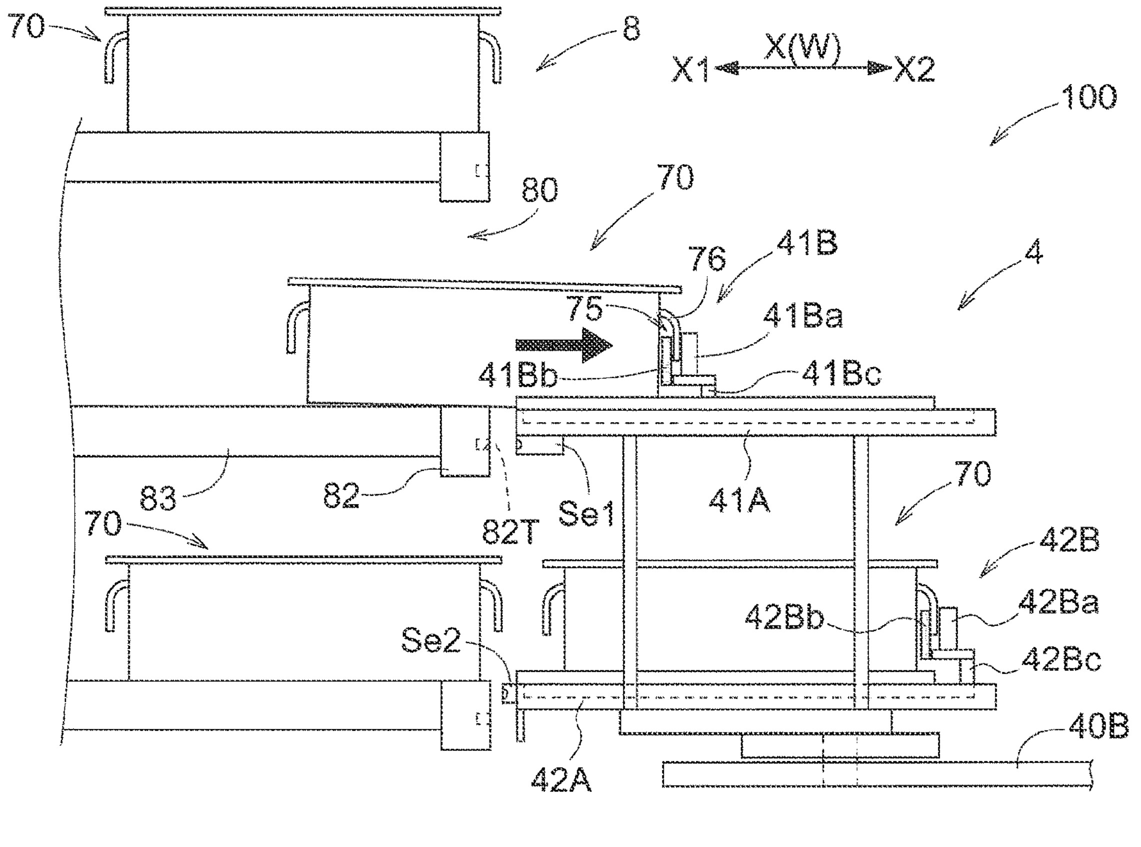
FIG. 38 is an illustrative diagram of a case of performing replacement of a container on a shelf.

Subsequently, as shown in FIG. 38, the control device C moves the first engagement section 41Bb, which is in the engaged orientation and in contact with the engagement wall 76, toward the retrieving side X2 in the transfer direction relative to the first holding section 41A. Accordingly, the first engagement section 41Bb pulls the container 70 from the shelf 80 to the first holding section 41A.

Figure 39:
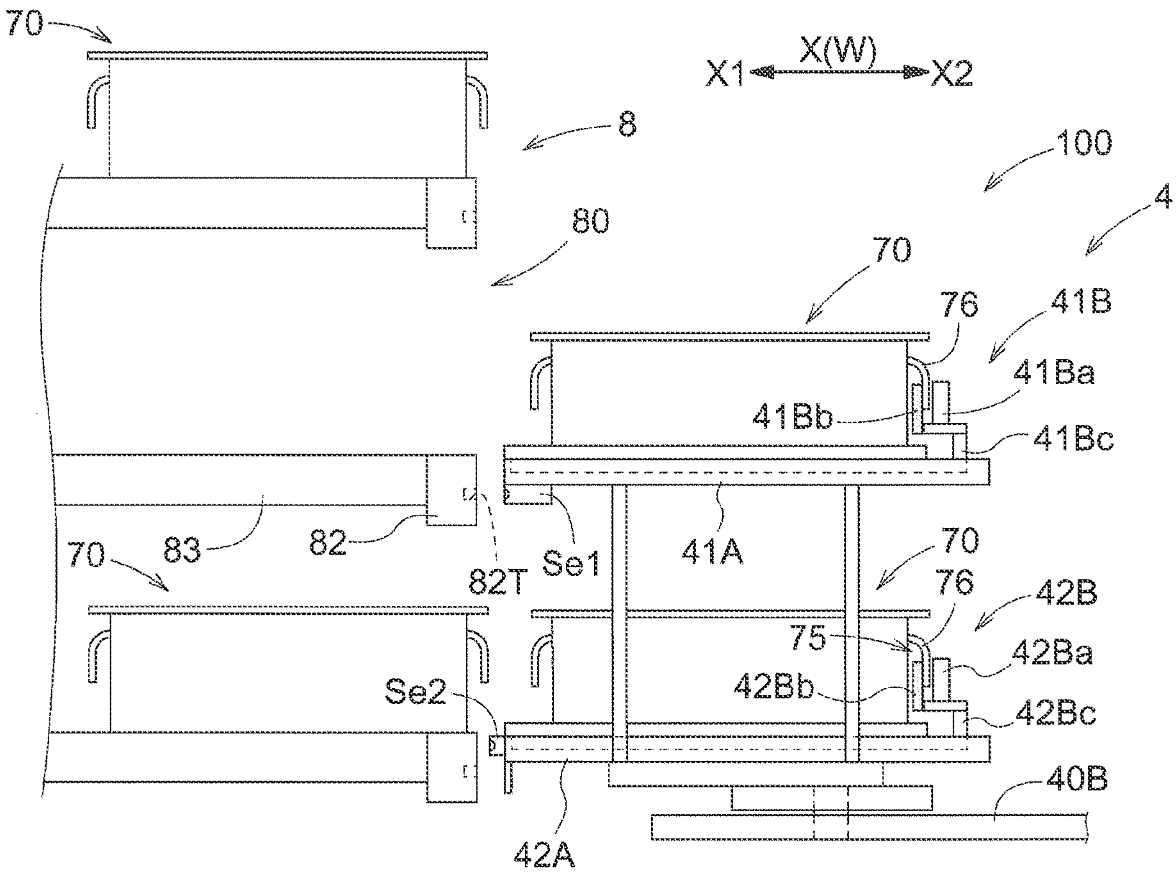
FIG. 39 is an illustrative diagram of a case of performing replacement of a container on a shelf.

As a result, as shown in FIG. 39, the shelf 80 becomes empty due to the retrieval of the container 70, and the first holding section 41A and the second holding section 42A each hold a container 70.

Figure 40:
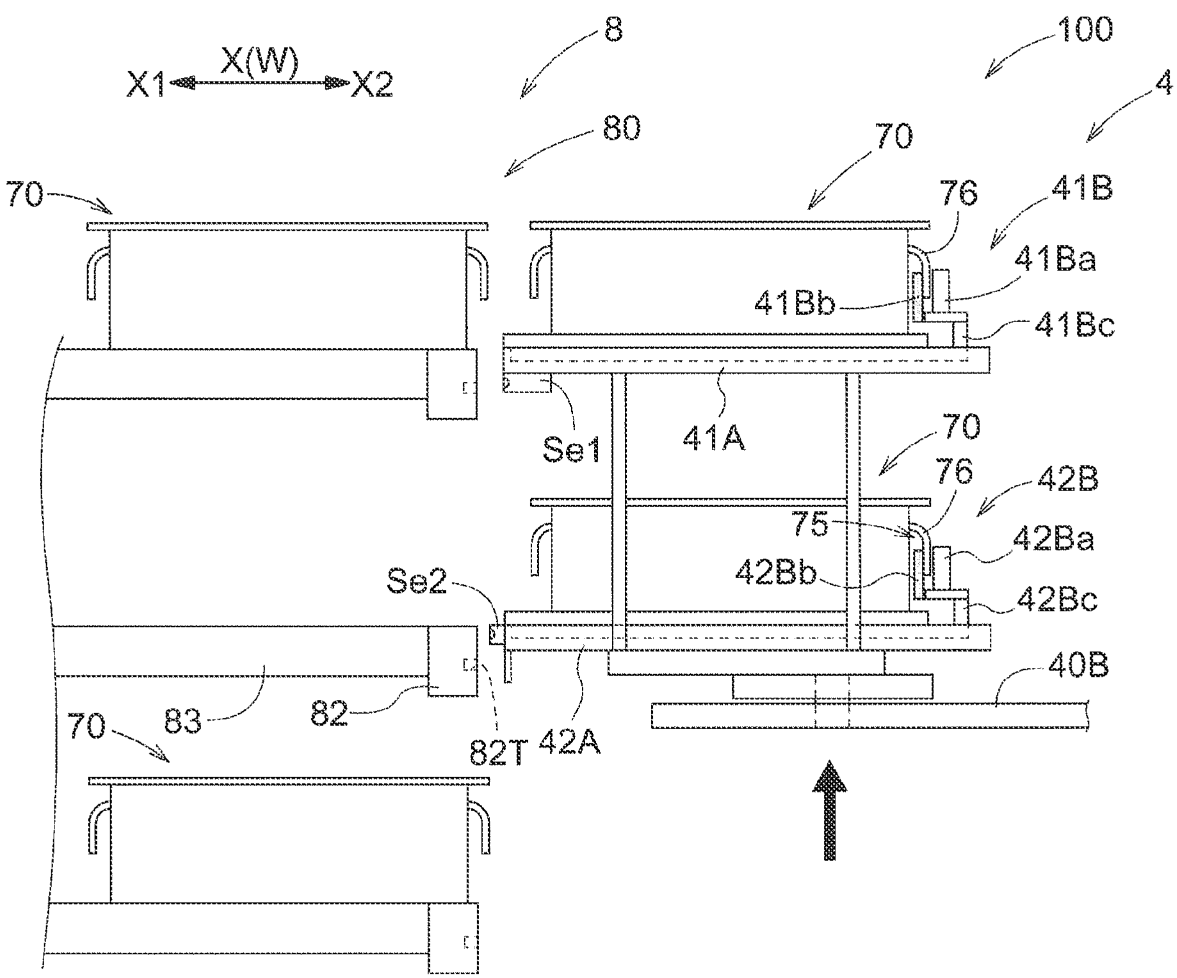
FIG. 40 is an illustrative diagram of a case of performing replacement of a container on a shelf.

Then, as shown in FIG. 40, the control device C raises the first holding section 41A and the second holding section 42A while maintaining the positions of the first holding section 41A and the second holding section 42A in the transfer direction X, so as to align the vertical position of the second holding section 42A with the shelf 80 that became empty due to the retrieving operation. Note that at this time, the position of the travel body 1 and the orientation of the transfer device 4 realized by the turning device 5 are also maintained. Then, for confirmation, the storage container detection sensor Se2 attached to the second holding section 42A detects whether or not a container 70 is stored on the shelf 80 where the retrieving operation was performed. If it is confirmed by the detection result of the storage container detection sensor Se2 that a container 70 is not stored on the shelf 80, the second transfer mechanism 42B starts the transfer of the container 70 held by the second holding section 42A to the shelf 80.

Figure 41:
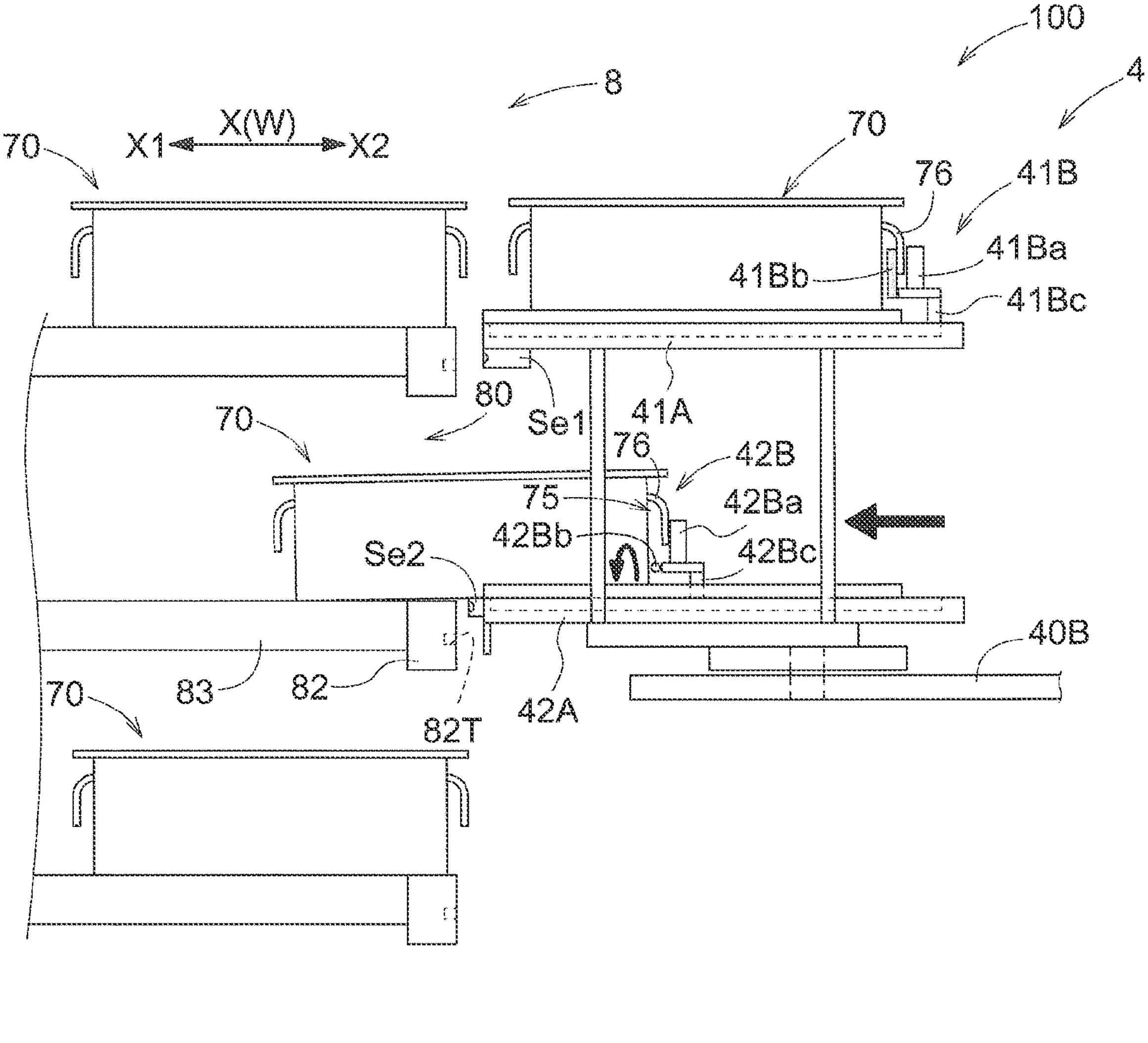
FIG. 41 is an illustrative diagram of a case of performing replacement of a container on a shelf.

As shown in FIG. 41, the control device C moves the second pushing section 42Ba toward the loading side X1 in the transfer direction relative to the second holding section 42A so as to push the container 70 toward the loading side X1 in the transfer direction. Accordingly, the loading target container 70 held by the second holding section 42A moves from the second holding section 42A to the shelf 80. In this example, the second pushing section 42Ba pushes the container 70 toward the loading side X1 in the transfer direction while in contact with the engagement wall 76 of the container 70 from the retrieving side X2 in the transfer direction. Also, in this example, while the loading target container 70 is moving toward the loading side X1 in the transfer direction, the control device C changes the second engagement section 42Bb, which is moving toward the loading side X1 in the transfer direction together with the second pushing section 42Ba, from the engaged orientation to the disengaged orientation.

Figure 42:
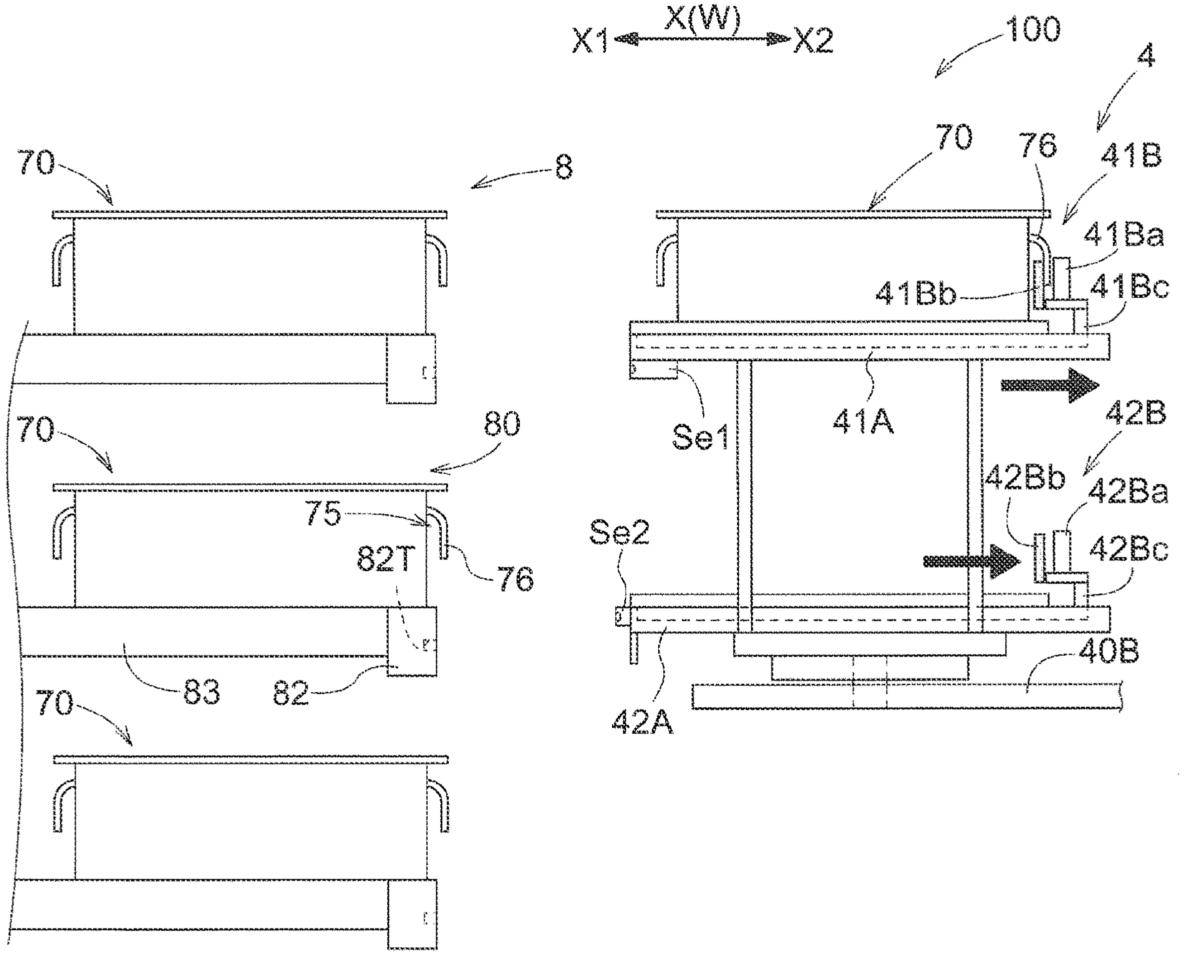
FIG. 42 is an illustrative diagram of a case of performing replacement of a container on a shelf.

As shown in FIG. 42, after loading the loading target container 70 to the shelf 80, the control device C then moves the second pushing section 42Ba toward the retrieving side X2 in the transfer direction relative to the second holding section 42A, and moves the first holding section 41A and the second holding section 42A toward the retrieving side X2 in the transfer direction relative to the transfer elevation body 40B so as to return to their original positions. Accordingly, the first holding section 41A, the second holding section 42A, the first transfer mechanism 41B, and the second transfer mechanism 42B move away from the shelf 80.

The replacing operation for replacing a container 70 on a shelf 80 is performed as described above. The replacing operation is performed by the control device C controlling functional units of the transport vehicle 100 as described above.

Note that, in the above example, the first transfer mechanism 41B does not load a container 70. For this reason, the storage container detection sensor Se2 for detecting whether or not a container 70 is on the shelf 80 that is the loading transfer destination is not required to be provided for the set of the first transfer mechanism 41B and the first holding section 41A that do not perform the loading operation. However, this is not intended to exclude the case where the storage container detection sensor Se2 is provided for the set of the first transfer mechanism 41B and the first holding section 41A.

Other Embodiments

Next, other embodiments of the transport vehicle will be described.

(1) In the above embodiment, the interval 3H between the first lifting and holding section 31*a* and the second lifting and holding section 32*a* in the up-down direction is set based on the height of N containers 70, and N is set to 2 in the described example. However, the present invention is not limited to such an example, and "N" may be set to an integer of 2 or more.

(2) In the above embodiment, an example is described in which the interval 4H between the first holding section 41A and the second holding section 42A in the up-down direction is set based on the height of two containers 70 (70H×2). However, the present invention is not limited to such an example, and the interval 4H between the first holding section 41A and the second holding section 42A in the up-down direction may be set based on the height of N containers 70 (N is an integer of 2 or more).

(3) In the above embodiment, an example is described in which the transport vehicle 100 includes the turning device 5 that turns the transfer device 4 around the axis along the up-down direction, but the turning device 5 is not an essential component. Accordingly, the transport vehicle 100 does not need to include the turning device 5. In this case, the transfer direction X is a fixed direction relative to the transport vehicle 100.

(4) In the above embodiment, an example is described in which the reference position detection sensor Se1 is provided for the set of the first holding section 41A and the first transfer mechanism 41B, and the storage container detection sensor Se2 is provided for the set of the second holding section 42A and the second transfer mechanism 42B. However, the set provided with the reference position detection sensor Se1 and the set provided with the storage container detection sensor Se2 may be reversed. Alternatively, either one of the sets may be provided with both the reference position detection sensor Se1 and the storage container detection sensor Se2. Furthermore, a configuration is possible in which the reference position detection sensor Se1 is provided for one of the sets, and the storage container detection sensor Se2 is provided for both sets.

(5) In the above embodiment, an example is described in which the first holder drive section 41MA that moves the first holding section 41A along the transfer direction X and the second holder drive section 42MA that moves the second holding section 42A along the transfer direction X are configured by the same drive source. However, the first holder drive section 41MA and the second holder drive section 42MA may be configured to be driven by independent drive sources.

(6) In the above-described embodiment, an example is described in which the restriction section 44 is attached to the second holding section 42A, and when the second transfer mechanism 42B performs the container 70 retrieving operation, the restriction section 44 is arranged facing, on the second holding section 42A side, the adjacent container 70 below the retrieving target container 70. However, the present invention is not limited to such an example, and the restriction section 44 may also be provided in the first holding section 41A. It is preferable that when a stack of containers 70 are lifted by the first lifting mechanism 31 and the first transfer mechanism 41B is to retrieve the uppermost container 70, the restriction section 44 provided in the first holding section 41A is arranged facing, on the first holding section 41A side, the adjacent container 70 below the uppermost container 70.

(7) In the above embodiment, an example is described in which the second lifting mechanism 32 is provided with the guide section 3G for guiding the container 70 transferred by the transfer device 4. However, the present invention is not limited to such an example, and the guide section 3G may be provided in at least either the first lifting mechanism or the second lifting mechanism. In other words, the guide section 3G may be provided in the first lifting mechanism 31 and not provided in the second lifting mechanism 32. This configuration is suitable for transferring (stacking) one container 70 onto another container 70 lifted by the first lifting mechanism 31. Alternatively, the guide section 3G may be provided in both the first lifting mechanism 31 and the second lifting mechanism 32. This configuration is suitable for transferring (stacking) containers 70 onto the container 70 lifted by the first lifting mechanism 31 and the container 70 lifted by the second lifting mechanism 32.

(8) In the above embodiment, an example is described in which the first transfer mechanism 41B can move in the transfer direction X relative to the first holding section 41A, and the second transfer mechanism 42B can move in the transfer direction X relative to the second holding section 42A. However, the present invention is not limited to such an example, and a configuration is possible in which the first transfer mechanism 41B and the first holding section 41A can move integrally in the transfer direction X, and the second transfer mechanism 42B and the second holding section 42A can move integrally in the transfer direction X.

(9) In the above embodiment, regarding the configuration of the container 70, an example is described in which the lifting rib 73 lifted by the lifting device 3 is formed on the upper section of the peripheral wall portion 72. However, the lifting rib 73 may be formed at any location on the peripheral wall portion 72, and may be formed on the central section or the lower section in the up-down direction, for example. Furthermore, the portion of the container 70 that is lifted by the lifting device 3 is not limited to being the lifting rib 73. The lifting device 3 may lift any portion of the container 70. For example, the lifting device 3 may be configured to lift the container 70 by clamping a portion of the peripheral wall portion 72 of the container 70 that does not have protrusions or recessions.

(10) In the above embodiment, specific situations are given as examples to describe the transfer of a container 70 by the first transfer mechanism 41B and the transfer of a container 70 by the second transfer mechanism 42B. Depending on the situation, a container 70 may be transferred using only the first transfer mechanism 41B, or a container 70 may be transferred using only the second transfer mechanism 42B. For example, when replacing a container 70 stored on the lowermost shelf 80 of the container rack 8 with a container 70 in the stacking region 2A, it is possible to use only the second transfer mechanism 42B on the lower side, and not use the first transfer mechanism 41B. In this case, specifically, the second transfer mechanism 42B retrieves the container 70 stored on the lowermost shelf 80 of the container rack 8, and loads that container 70 to the stacking region 2A (the space formed below the container 70 lifted by the first lifting mechanism 31). Subsequently, the second transfer mechanism 42B retrieves another container 70 from the stacking region 2A (the container 70 below the container 70 lifted by the second lifting mechanism 32), and loads the other container 70 to the empty lowermost shelf 80. As an example of another situation, when replacing a container 70 stored on the uppermost shelf 80 of the container rack 8 with a container 70 in the stacking region 2A, it is possible to use only the first transfer mechanism 41B on the upper side, and not use the second transfer mechanism 42B. In this case, specifically, the first transfer mechanism 41B retrieves the container 70 stored on the uppermost shelf 80 of the container rack 8, and loads that container 70 to the stacking region 2A (the space formed below the container 70 lifted by the first lifting mechanism 31). Subsequently, the first transfer mechanism 41B retrieves another container 70 from the stacking region 2A (the container 70 below the container 70 lifted by the second lifting mechanism 32), and loads the other container 70 to the empty uppermost shelf 80.

(11) In the above embodiment, an example is described in which the travel body 1 is configured to travel on the floor surface. However, the present invention is not limited to such an example, and the travel body 1 may be configured to travel on rails installed on the floor surface or near the ceiling. In other words, the transport vehicle 100 may be configured as a ground transport vehicle that travels along rails set on the floor surface, or an overhead transport vehicle that travels along rails suspended from the ceiling, for example. Also, the transport vehicle 100 may be configured as a stacker crane, for example.

(12) It should be noted that the configurations disclosed in the above-described embodiments can be applied in combination with configurations disclosed in other embodiments as long as no contradiction arises. Regarding such other configurations as well, the embodiments disclosed in this specification are merely examples in all respects. Accordingly, various modifications can be made as appropriate without departing from the scope of the present disclosure.

Overview of Embodiments

The following describes the transport vehicle described above.

A transport vehicle is configured to transport containers configured to be stackable in an up-down direction, the transport vehicle including:

- a travel body configured to travel;
- a container group support section provided in the travel body and configured to support a container group, which includes a plurality of containers in a stacked state, in a predetermined stacking region;
- a lifting device provided in the travel body and configured to lift a container in the container group supported by the container group support section; and
- a transfer device provided in the travel body and configured to transfer a container, wherein the transfer device includes:

- a first holding section configured to hold a container;
- a second holding section disposed below the first holding section and configured to hold a container;
- a first transfer mechanism configured to transfer a container between the first holding section and the stacking region; and
- a second transfer mechanism configured to transfer a container between the second holding section and the stacking region, and the lifting device includes:

- a first lifting mechanism configured to lift a container, which is at a desired height in the container group stacked in the stacking region, relative to an adjacent container below the container lifted by the first lifting mechanism; and
- a second lifting mechanism configured to lift a container, which is below the container lifted by the first lifting mechanism, relative to an adjacent container below the container lifted by the second lifting mechanism.

According to this configuration, a container can be transferred to the stacking region by the first transfer mechanism, and a container can be transferred to the stacking region by the second transfer mechanism. Also, space in the up-down direction can be provided in the stacked container group both below the container lifted by the first lifting mechanism and below the container lifted by the second lifting mechanism. Accordingly, these two regions of space can be used in order for the transfer of a container by the first transfer mechanism and the transfer of a container by the second transfer mechanism in the stacked container group to be performed in parallel. In this manner, according to this configuration, a plurality of transfer operations can be performed on a plurality of stacked containers in parallel.

Here, it is preferable that the first lifting mechanism includes a first lifting and holding section configured to hold a container, the second lifting mechanism includes a second lifting and holding section disposed below the first lifting and holding section and configured to hold a container, and the first lifting and holding section and the second lifting and holding section are spaced apart in the up-down direction by an interval set according to a height that is a sum of a height of N containers (N is an integer of 2 or more) and a vertical movement amount of the container transferred by the second transfer mechanism.

According to this configuration, even in the case where the first transfer mechanism and the second transfer mechanism move up and down integrally, the first transfer mechanism can be appropriately transfer a container between the first lifting and holding section and the second lifting and holding section in the up-down direction without being affected by the transfer operation performed by the second transfer mechanism that involves movement in the up-down direction. Accordingly, the transferred container can be appropriately stacked on the container lifted and held by the second lifting and holding section.

Also, it is preferable that the first holding section and the second holding section are spaced apart in the up-down direction by an interval greater than or equal to a height that is a sum of a height of two of the containers and a vertical movement amount of the container transferred by the second transfer mechanism.

According to this configuration, when the container (adjacent container) adjacent below the container (lifted container) lifted and held by the second lifting and holding section is to be retrieved by the second transfer mechanism through a transfer operation that involves movement in the up-down direction, the adjacent container that is the retrieving target can be appropriately retrieved without the adjacent container interfering with the lifted container. Also, in the case where another container is to be loaded by the second transfer mechanism into the space formed below the lifted container through a transfer operation that involves movement in the up-down direction, the other loading target container can be appropriately loaded without interfering with the lifted container.

Also, it is preferable that the first holding section and the second holding section are spaced apart in the up-down direction by an interval set in such a manner that while the second holding section is disposed at a height at which the adjacent container below the container lifted by the second lifting mechanism is to be transferred by the second transfer mechanism to the second holding section, the first holding section is disposed at a height at which the container held by the first holding section is to be transferred by the first transfer mechanism onto the container lifted by the second lifting mechanism.

According to this configuration, it is possible to appropriately realize a configuration in which the transfer of a container from the stacking region to the second holding section by the second transfer mechanism can be performed in parallel with the transfer of a container from the first holding section to the stacking region by the first transfer mechanism.

Also, it is preferable that the travel body is configured to travel along a container rack in which a plurality of shelves configured to store the containers are arranged at respective levels in the up-down direction, the transport vehicle further includes a turning device configured to turn the transfer device about an axis along the up-down direction to change an orientation of

- the transfer device between a first orientation, in which a transfer direction of transfer of the transfer target container by the transfer device is directed toward the stacking region, and a second orientation, in which the transfer direction is directed toward the container rack,
- the first transfer mechanism performs container transfer between the first holding section and the stacking region while the transfer device is in the first orientation, and performs container transfer between the first holding section and a shelf among the plurality of shelves while the transfer device is in the second orientation, and
- the second transfer mechanism performs container transfer between the second holding section and the stacking region while the transfer device is in the first orientation, and performs container transfer between the second holding section and a shelf among the plurality of shelves while the transfer device is in the second orientation.

According to this configuration, the transfer device can transfer a container to a shelf of the container rack and also transfer a container to the stacking region. Also, while the transfer device is in the second orientation in which the transfer direction is directed toward the container rack, the transfer of a container to the container rack by first transfer mechanism can be performed in parallel with the transfer of a container to the container rack by the second transfer mechanism.

Also, it is preferable that the transfer device further includes:

- a reference position detection sensor configured to detect a reference position for storage of a container on a shelf among the plurality of shelves; and
- a storage container detection sensor configured to detect a container stored on a shelf among the plurality of shelves,
- the reference position detection sensor is provided for one set out of a set of the first holding section and the first transfer mechanism and a set of the second holding section and the second transfer mechanism, and
- the storage container detection sensor is provided for another set out of the set of the first holding section and the first transfer mechanism and the set of the second holding section and the second transfer mechanism, the other set being the set for which the reference position detection sensor is not provided.

According to this configuration, the reference position detection sensor can be used in order for a container to be transferred at an appropriate transfer position relative to a shelf. Also, the storage container detection sensor can be used to detect a container already stored on a shelf, thus making it possible to prevent a container from being stored on a shelf on which a container is already stored. The reference position detection sensor is provided for either the set of the first holding section and the first transfer mechanism or the set of the second holding section and the second transfer mechanism, and the storage container detection sensor is provided for the other set, that is to say the set for which the reference position detection sensor is not provided, and therefore the total number of sensors provided in the transfer device can be suppressed to a low number.

Also, it is preferable that the transfer device further includes:

- a first holder drive section configured to move the first holding section along a transfer direction of container transfer performed by the transfer device; and
- a second holder drive section configured to move the second holding section along the transfer direction.

According to this configuration, the first holding section and the second holding section can be brought close to the stacking region, and a container can be transferred by the transfer device in that state. Container transfer can thus be performed in a stable manner.

Also, it is preferable that the second transfer mechanism performs a retrieving operation including transferring a retrieving target container, which is the adjacent container below the container lifted by the second lifting mechanism, to the second holding section, and

- the transfer device further includes a restriction section disposed facing, on a side corresponding to the second holding section, an adjacent container below the retrieving target container while the second transfer mechanism performs the retrieving operation, and configured to restrict movement of the adjacent container below the retrieving target container toward the second holding section.

According to this configuration, when the retrieving operation is performed, if the retrieving target container moving toward the second holding section interferes with the adjacent container therebelow, and the adjacent container is subjected to force acting toward the second holding section, it is possible to suppress the case where the adjacent container and the containers stacked below the adjacent container fall toward the second holding section.

Also, it is preferable that the second transfer mechanism includes a second engagement section configured to engage with a container, the restriction section is attached to the second holding section and disposed below the second engagement section, and the second engagement section and the restriction section are configured to move relative to each other along a transfer direction of container transfer performed by the transfer device.

According to this configuration, when the retrieving operation is performed, the restriction section can be held at a position facing the container from the second holding section side while the second engagement section is moved toward the second holding section. For this reason, it is possible to appropriately retrieve the retrieving target container while also appropriately keep the container adjacent below the retrieving target container and the containers stacked therebelow from falling toward the second holding section.

Also, it is preferable that at least either the first lifting mechanism or the second lifting mechanism is provided with a guide section configured to guide the container transferred by the transfer device.

According to this configuration, a container transferred to the stacking region by the transfer device can be appropriately guided by the guide section.

INDUSTRIAL APPLICABILITY

The technology according to the present disclosure is applicable to a transport vehicle that transports containers that can be stacked in the up-down direction.

Description of Reference Signs

100 Transport vehicle
1 Travel body
2 Container group support section
2A Stacking region
3 Lifting device
3G Guide section
31 First lifting mechanism
31*a* First lifting and holding section
32 Second lifting mechanism
32*a* Second lifting and holding section
4 Transfer device
41A First holding section
41B First transfer mechanism
41MA First holder drive section
42A Second holding section
42B Second transfer mechanism
42Bb Second engagement section
42MA Second holder drive section
44 Restriction section
5 Turning device
7 Container group
70 Container
8 Container rack
80 Shelf
80P Reference position
Mv Vertical movement amount
P1 First orientation
P2 Second orientation
Se1 Reference position detection sensor
Se2 Storage container detection sensor
X Transfer direction

The invention claimed is:

1. A transport vehicle configured to transport containers configured to be stackable in an up-down direction, the transport vehicle comprising:

a travel body configured to travel;

a container group support section provided in the travel body and configured to support a container group, which comprises a plurality of containers in a stacked state, in a predetermined stacking region;

a lifting device provided in the travel body and configured to lift a container in the container group supported by the container group support section; and a transfer device provided in the travel body and configured to transfer a container, wherein the transfer device comprises:

a first holding section configured to hold a container;

a second holding section disposed below the first holding section and configured to hold a container;

a first transfer mechanism configured to transfer a container between the first holding section and the stacking region; and a second transfer mechanism configured to transfer a container between the second holding section and the stacking region, and wherein the lifting device comprises:

a first lifting mechanism configured to lift a container, which is at a desired height in the container group stacked in the stacking region, relative to an adjacent container below the container lifted by the first lifting mechanism; and a second lifting mechanism configured to lift a container, which is below the container lifted by the first lifting mechanism, relative to an adjacent container below the container lifted by the second lifting mechanism.

2. The transport vehicle according to claim 1, wherein:

the first lifting mechanism comprises a first lifting and holding section configured to hold a container, the second lifting mechanism comprises a second lifting and holding section disposed below the first lifting and holding section and configured to hold a container, and the first lifting and holding section and the second lifting and holding section are spaced apart in the up-down direction by an interval set according to a height that is a sum of a height of N containers (N is an integer of 2 or more) and a vertical movement amount of the container transferred by the second transfer mechanism.

3. The transport vehicle according to claim 1, wherein the first holding section and the second holding section are spaced apart in the up-down direction by an interval greater than or equal to a height that is a sum of a height of two of the containers and a vertical movement amount of the container transferred by the second transfer mechanism.

4. The transport vehicle according to claim 1, wherein the first holding section and the second holding section are spaced apart in the up-down direction by an interval set in such a manner that while the second holding section is disposed at a height at which the adjacent container below the container lifted by the second lifting mechanism is to be transferred by the second transfer mechanism to the second holding section, the first holding section is disposed at a height at which the container held by the first holding section is to be transferred by the first transfer mechanism onto the container lifted by the second lifting mechanism.

5. The transport vehicle according to claim 1, wherein:

the travel body is configured to travel along a container rack in which a plurality of shelves configured to store the containers are arranged at respective levels in the up-down direction, the transport vehicle further comprises a turning device configured to turn the transfer device about an axis along the up-down direction to change an orientation of the transfer device between a first orientation, in which a transfer direction of transfer of the transfer target container by the transfer device is directed toward the stacking region, and a second orientation, in which the transfer direction is directed toward the container rack, the first transfer mechanism performs container transfer between the first holding section and the stacking region while the transfer device is in the first orientation, and performs container transfer between the first holding section and a shelf among the plurality of shelves while the transfer device is in the second orientation, and the second transfer mechanism performs container transfer between the second holding section and the stacking region while the transfer device is in the first orientation, and performs container transfer between the second holding section and a shelf among the plurality of shelves while the transfer device is in the second orientation.

6. The transport vehicle according to claim 5, wherein the transfer device further comprises:

a reference position detection sensor configured to detect a reference position for storage of a container on a shelf among the plurality of shelves; and a storage container detection sensor configured to detect a container stored on a shelf among the plurality of shelves, the reference position detection sensor is provided for one set out of a set of the first holding section and the first transfer mechanism and a set of the second holding section and the second transfer mechanism, and the storage container detection sensor is provided for another set out of the set of the first holding section and the first transfer mechanism and the set of the second holding section and the second transfer mechanism, the other set being the set for which the reference position detection sensor is not provided.

7. The transport vehicle according to claim 1, wherein the transfer device further comprises:

a first holder drive section configured to move the first holding section along a transfer direction of container transfer performed by the transfer device; and a second holder drive section configured to move the second holding section along the transfer direction.

8. The transport vehicle according to claim 1, wherein the second transfer mechanism performs a retrieving operation comprising transferring a retrieving target container, which is the adjacent container below the container lifted by the second lifting mechanism, to the second holding section, and wherein the transfer device further comprises a restriction section disposed facing, on a side corresponding to the second holding section, an adjacent container below the retrieving target container while the second transfer mechanism performs the retrieving operation, and configured to restrict movement of the adjacent container below the retrieving target container toward the second holding section.

9. The transport vehicle according to claim 8, wherein the second transfer mechanism comprises a second engagement section configured to engage with a container, the restriction section is attached to the second holding section and disposed below the second engagement section, and the second engagement section and the restriction section are configured to move relative to each other along a transfer direction of container transfer performed by the transfer device.

10. The transport vehicle according to claim 1, wherein at least either the first lifting mechanism or the second lifting mechanism is provided with a guide section configured to guide the container transferred by the transfer device.

* * * * *